United States Patent
Wu et al.

(10) Patent No.: US 12,411,061 B2
(45) Date of Patent: Sep. 9, 2025

(54) DEVICE AND METHOD FOR DETERMINING LIQUID CONTACT AND LIQUID VOLUME IN A LIQUID DISPENSER BASED ON SOUND

(71) Applicant: MESO SCALE TECHNOLOGIES, LLC, Rockville, MD (US)

(72) Inventors: Pei-ming Wu, Gaithersburg, MD (US); Sandor Kovacs, Middletown, DE (US)

(73) Assignee: MESO SCALE TECHNOLOGIES, LLC., Rockville, MD (US)

( * ) Notice: Subject to any disclaimer, the term of this patent is extended or adjusted under 35 U.S.C. 154(b) by 531 days.

(21) Appl. No.: 16/918,308

(22) Filed: Jul. 1, 2020

(65) Prior Publication Data

US 2021/0003484 A1 Jan. 7, 2021

Related U.S. Application Data

(60) Provisional application No. 62/869,725, filed on Jul. 2, 2019.

(51) Int. Cl.
*G01N 1/14* (2006.01)
*G01N 35/00* (2006.01)
(Continued)

(52) U.S. Cl.
CPC ......... *G01N 1/14* (2013.01); *G01N 35/00584* (2013.01); *G01V 1/02* (2013.01); *G01V 1/164* (2013.01); *G01N 2001/1427* (2013.01)

(58) Field of Classification Search
CPC .............. G01N 1/14; G01N 35/00584; G01N 2001/1427; G01N 2035/1013;
(Continued)

(56) References Cited

U.S. PATENT DOCUMENTS 4,320,659 A 3/1982 Lynnworth et al.
4,790,183 A 12/1988 Pfost et al.
(Continued)

FOREIGN PATENT DOCUMENTS

CA 2773801 * 10/2012
EP 3014283 A1 5/2016
(Continued)

OTHER PUBLICATIONS

International Search Report and Written Opinion dated Oct. 28, 2020, in International Appl. No. PCT/US2020/040492.

*Primary Examiner* — Robert R Raevis
(74) *Attorney, Agent, or Firm* — MEDLER FERRO WOODHOUSE & MILLS PLLC

(57) ABSTRACT

Devices and methods for determining whether a contact of a liquid dispenser with a liquid based on sound and/or for determining a liquid volume in the liquid dispenser are provided. According to an embodiment, the liquid dispenser includes a sound generator and an acoustic sensor, and at least one of the sound generator or the acoustic sensor is disposed within the dispense chamber portion. According to an embodiment, the liquid dispenser includes a sound generator and an acoustic sensor, and further includes one or more side conduits, where at least one of the sound generator or the acoustic sensor is disposed within a cavity of a respective one of the one or more side conduits, wherein the cavity and a connector of each of the one or more side conduits are free from resonance within a frequency range of the sound sensed by the acoustic sensor.

35 Claims, 35 Drawing Sheets

(51) Int. Cl.
*G01V 1/02* (2006.01)
*G01V 1/16* (2006.01)

(58) Field of Classification Search
CPC ..... G01N 2035/102; G01N 2035/1025; G01N 35/1011; G01V 1/02; G01V 1/164; B01L 3/0275; B01L 3/0237; B01L 2200/143; B01L 2300/0663
USPC ....... 422/501, 509, 517, 518, 521, 522, 525; 73/864.01, 864.11–864.13, 73/864.15–864.25, 61.56, 61.59, 290 R, 73/291, 290 V
See application file for complete search history.

(56) References Cited

U.S. PATENT DOCUMENTS

| | | | |
|---|---|---|---|
| 4,846,003 | A | 7/1989 | Marquiss |
| 4,850,213 | A | 7/1989 | Steinebrunner et al. |
| 5,465,629 | A | 11/1995 | Waylett, Jr. et al. |
| 6,824,024 | B2 | 11/2004 | Ingenhoven et al. |
| 6,869,571 | B2 | 3/2005 | Ingenhoven et al. |
| 6,898,981 | B1 | 5/2005 | Boillat et al. |
| 7,314,598 | B2 | 1/2008 | Nishino |
| 7,640,787 | B2 | 1/2010 | Curtis et al. |
| 7,727,476 | B2 | 6/2010 | Ingenhoven et al. |
| 7,964,160 | B2 | 6/2011 | Zuppiger et al. |
| 8,287,806 | B2 | 10/2012 | Bjornson et al. |
| 8,435,464 | B2 | 5/2013 | Zuppiger |
| 8,551,788 | B2 | 10/2013 | Ingenhoven et al. |
| 8,726,746 | B2 | 5/2014 | Wassermeier et al. |
| 8,850,903 | B2 | 10/2014 | Curtis et al. |
| 8,858,718 | B2 | 10/2014 | Gifford et al. |
| 8,900,878 | B2 | 12/2014 | Haack et al. |
| 8,959,998 | B2 | 2/2015 | Birtcher et al. |
| 9,278,349 | B2 | 3/2016 | Haack et al. |
| 2004/0159675 | A1 | 8/2004 | Nishino |
| 2007/0025882 | A1 | 2/2007 | Zuppiger et al. |
| 2008/0291435 | A1 | 11/2008 | Murakami |
| 2011/0000276 | A1 | 1/2011 | Wassermeier et al. |
| 2013/0099929 | A1 | 4/2013 | Ophardt et al. |
| 2014/0338423 | A1 | 11/2014 | Buckland et al. |
| 2016/0273951 | A1 | 9/2016 | Van Der Schoot et al. |
| 2019/0078927 | A1 | 3/2019 | Takayama et al. |

FOREIGN PATENT DOCUMENTS

| | | | |
|---|---|---|---|
| FR | 2761153 | * | 9/1998 |
| FR | 2761153 | A1 | 9/1998 |
| JP | H11125638 | A | 5/1999 |
| WO | 8801928 | A | 3/1988 |
| WO | 89/10193 | A1 | 11/1989 |
| WO | 03/100442 | A1 | 12/2003 |
| WO | 2005/085775 | A1 | 9/2005 |
| WO | 2008/064421 | A1 | 6/2008 |
| WO | 2008/092607 | A1 | 8/2008 |
| WO | 2009/103392 | A1 | 8/2009 |
| WO | 2012/156492 | A1 | 11/2012 |
| WO | 2014/206588 | A1 | 12/2014 |

\* cited by examiner

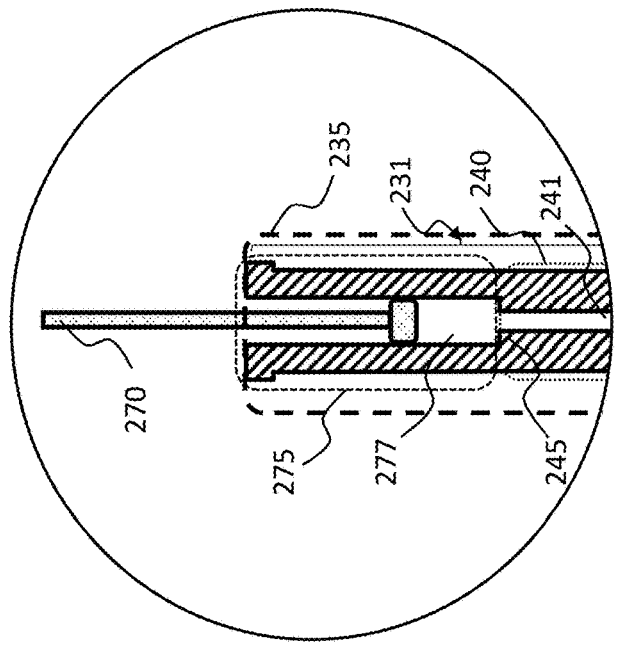
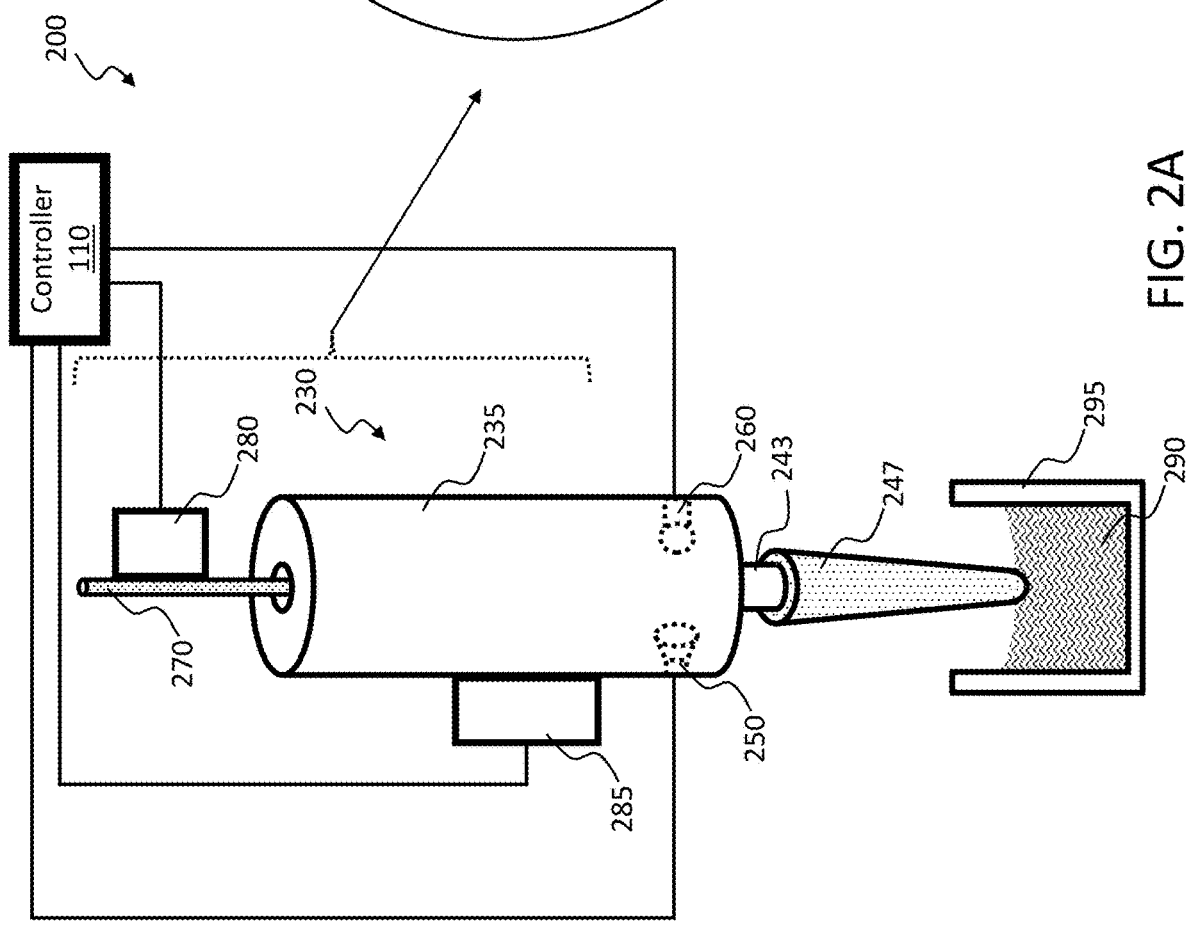
FIG. 2B
FIG. 2A

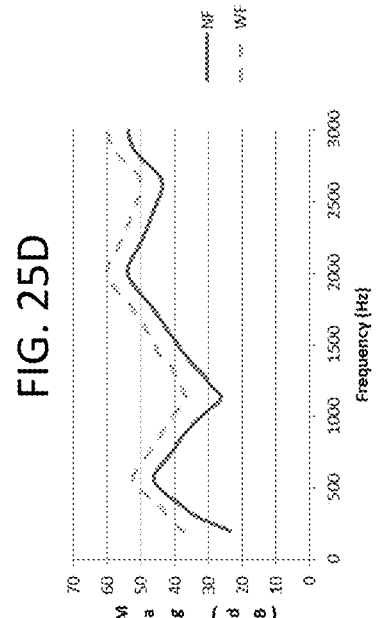
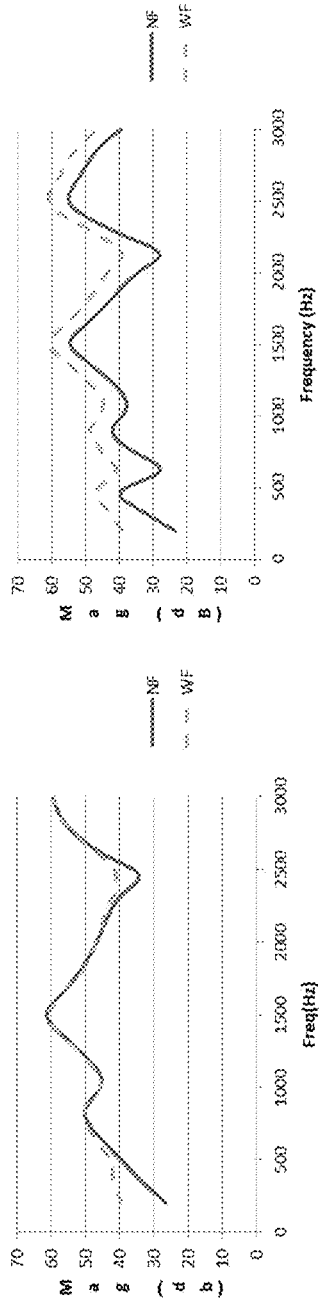
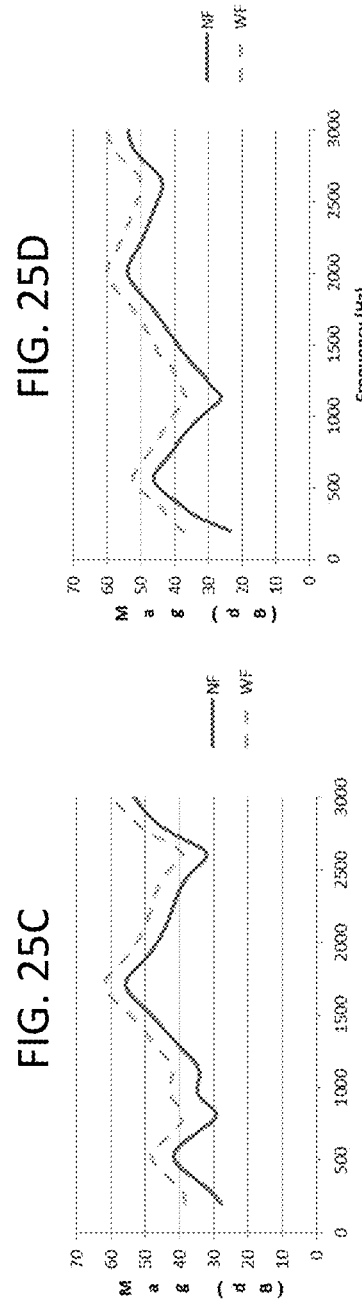
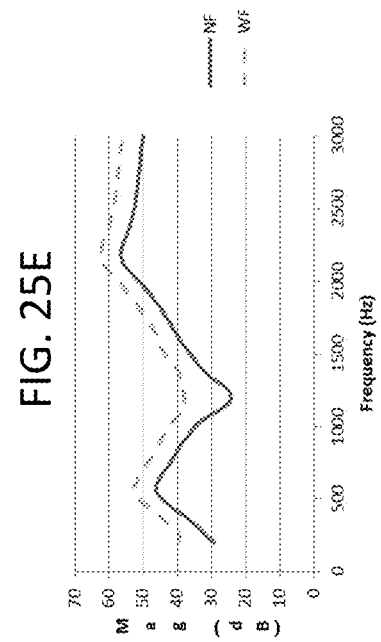

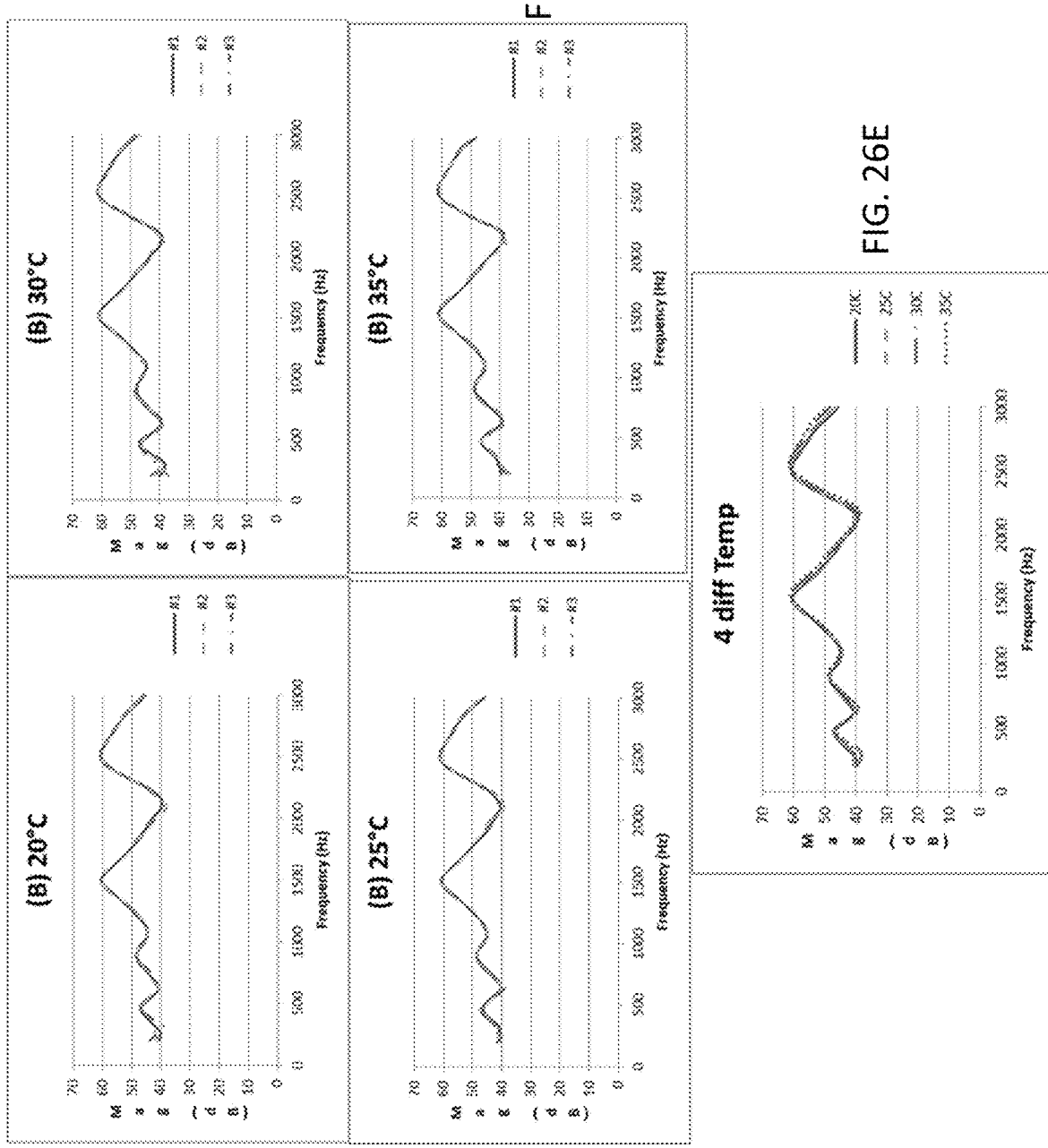

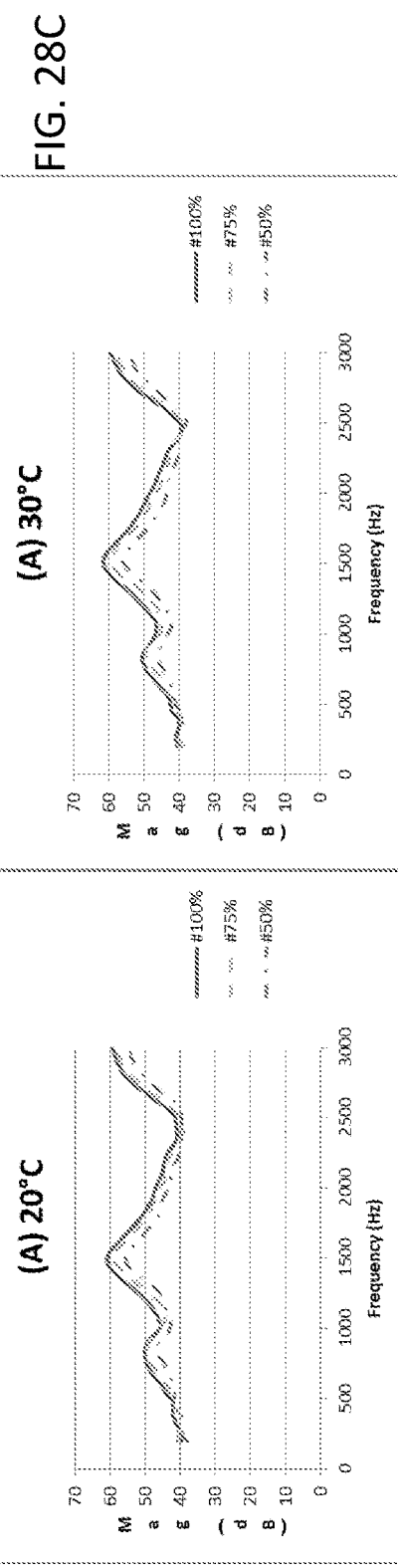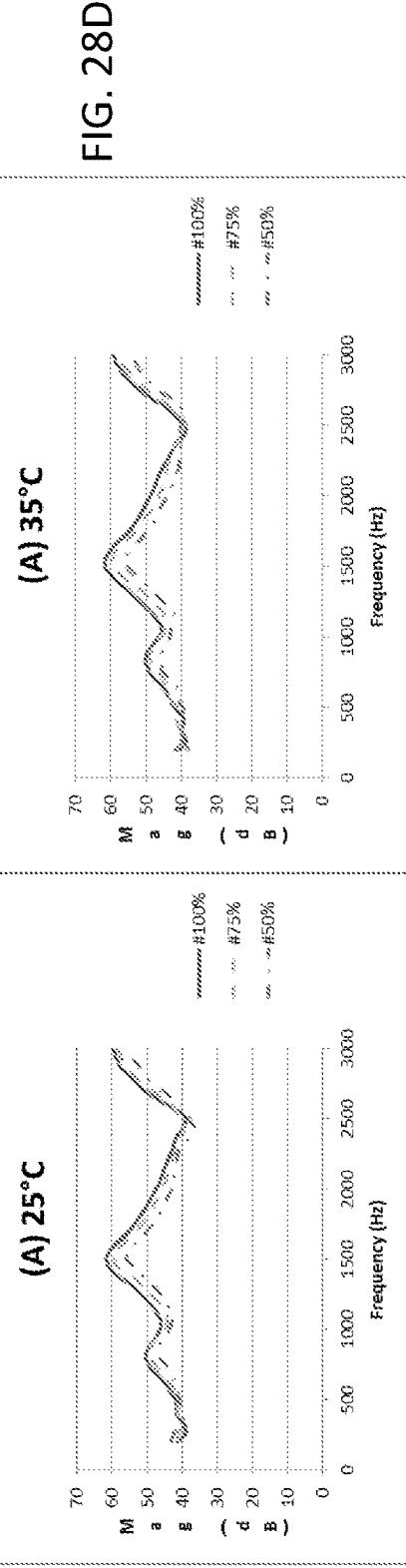
FIG. 28A (A) 20°C
FIG. 28B (A) 25°C
FIG. 28C (A) 30°C
FIG. 28D (A) 35°C

DEVICE AND METHOD FOR DETERMINING LIQUID CONTACT AND LIQUID VOLUME IN A LIQUID DISPENSER BASED ON SOUND

RELATED MATTERS

This application claims the benefit of prior U.S. Application No. 62/869,725, filed on Jul. 2, 2019, the entire contents of which are incorporated by reference herein.

FIELD OF THE INVENTION

The present invention is directed to a device and method for detecting liquid contact and liquid volume in a liquid dispenser based on sound.

BACKGROUND

A liquid dispenser may be used to transport a specified amount of liquid from a reservoir that stores liquid to a target site. Use of a liquid dispenser may be automated using an automated liquid dispenser system capable of moving the liquid dispenser and a piston of the liquid dispenser. For example, an automated dispenser system may control the liquid dispenser to draw a specified amount of liquid from a liquid reservoir and to dispense the specified amount of liquid at a target location, with no or little human intervention. To draw the liquid, the automated dispenser system may lower the liquid dispenser until a dispensing tip of the liquid dispenser sufficiently contacts the liquid and may then draw liquid into the liquid dispenser until the specified amount is reached. To accurately draw a specified amount of liquid, the automated dispenser system should be capable of sufficiently lowering the liquid dispenser until the dispensing tip of the liquid dispenser is contacting the liquid. Further, the automated dispenser system should ensure that the dispensing tip of the liquid dispenser is not excessively lowered into the liquid because the dispensing tip being lowered excessively into the liquid may cause liquid adhering to the outer wall of the dispensing tip of liquid dispenser and thus may cause errors in the amount of liquid carried by the dispensing tip. Thus, various approaches have been developed to accurately detect an air-liquid boundary by determining whether a contact of the dispensing tip of the liquid dispenser with the liquid has occurred.

SUMMARY

One aspect of the embodiments herein relates to a liquid dispenser. The liquid dispenser includes a dispenser body including: a dispense chamber portion including a dispense chamber therein, the dispense chamber having a first opening at a first portion of the dispense chamber portion and a second opening at a second portion of the dispense chamber portion, wherein the first portion is configured to couple with a dispensing tip, and a piston chamber portion including a piston chamber therein, the piston chamber being connected to the dispense chamber via the second opening and configured to guide a piston in a linear motion within the piston chamber to draw liquid into the liquid dispenser and to dispense liquid out of the liquid dispenser. The liquid dispenser further includes a sound generator configured to generate a sound to induce acoustic resonance within the dispense chamber. The liquid dispenser further includes an acoustic sensor configured to sense a sound within the dispense chamber, where at least one of the sound generator or the acoustic sensor is disposed within the dispense chamber portion. The liquid dispenser may further include a control circuit to determine whether a contact of the dispensing tip with liquid has occurred based on the sensed sound.

One aspect of the embodiments herein relates to a liquid dispenser. The liquid dispenser includes a dispenser body including: a dispense chamber portion including a dispense chamber therein, the dispense chamber having a first opening at a first portion of the dispense chamber portion and a second opening at a second portion of the dispense chamber portion, wherein the first portion is configured to couple with a dispensing tip, one or more side conduits, each of the one or more side conduits having a cavity and a connector channel connecting the cavity to the dispense chamber, and a piston chamber portion including a piston chamber therein, the piston chamber being connected to the dispense chamber via the second opening and configured to guide a piston in a linear motion within the piston chamber to draw liquid into the liquid dispenser and to dispense liquid out of the liquid dispenser. The liquid dispenser further includes a sound generator configured to generate a sound to induce acoustic resonance within the dispense chamber. The liquid dispenser further includes an acoustic sensor configured to sense a sound within the dispense chamber, wherein at least one of the sound generator or the acoustic sensor is disposed within the cavity of a respective one of the one or more side conduits, wherein the cavity and the connector of each of the one or more side conduits are free from resonance within a frequency range of the sound sensed by the acoustic sensor. The liquid dispenser may further include a control circuit configured to determine whether a contact of the dispensing tip with liquid has occurred based on the sensed sound.

One aspect of the embodiments herein relates to a liquid dispenser. The liquid dispenser includes a dispenser body including a dispense chamber portion including a dispense chamber therein, the dispense chamber having a first opening at a first portion of the dispense chamber portion and a second opening at a second portion of the dispense chamber portion, wherein the first portion is configured to couple with a dispensing tip, a piston chamber portion including a piston chamber therein, the piston chamber being connected to the dispense chamber via the second opening and configured to guide a piston in a linear motion within the piston chamber to draw liquid into the liquid dispenser and to dispense liquid out of the liquid dispenser, and an acoustic filter disposed between the dispense chamber and the piston chamber, wherein the acoustic filter is configured to acoustically decouple the dispense chamber from the piston chamber. The liquid dispenser further includes a sound generator configured to generate a sound to the dispense chamber. The liquid dispenser further includes an acoustic sensor configured to sense an acoustic signal resulting from the generated sound. The liquid dispenser may further include a control circuit configured to determine at least one of: whether contact of the dispensing tip with a liquid has occurred based on the sensed sound, or a volume of the liquid in the dispensing tip based on the sensed sound.

One aspect of the embodiments herein relates to a method of detecting contact of a liquid dispenser with a liquid. The method includes acquiring, via an acoustic sensor, a plurality of voltage values associated with sound sensed by the acoustic sensor within a time window. The method further includes squaring each of the plurality of voltage values to obtain a plurality of squared voltage values for the time window. The method further includes calculating an average value of the plurality of squared voltage values for the time window. The method further includes determining whether a contact of a dispenser tip of the liquid dispenser with liquid has occurred during the time window based on the average value of the plurality of squared voltage values.

BRIEF DESCRIPTION OF THE DRAWINGS

The foregoing and other features, objects and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 2A is an example diagram illustrating a liquid dispenser system configured to detect detecting tip-liquid contact.

FIG. 2B is an example diagram illustrating a cross-section view of a portion of the liquid dispenser illustrated in FIG. 2A.

FIG. 5AA is an example diagram illustrating calculation of a resonant frequency of sound based on a geometry of a side conduit including a connecting channel and a cavity, for the embodiment illustrated in FIG. 5A.

FIG. 9AA is an example diagram illustrating calculation of a resonant frequency of sound at a connecting channel between a cavity and a dispense chamber, for the embodiment illustrated in FIG. 9A.

FIG. 10AA is an example diagram illustrating calculation of a resonant frequency of sound at a connecting channel between a cavity and a dispense chamber, for the embodiment illustrated in FIG. 10A.

FIG. 11AA is an example diagram illustrating calculation of a resonant frequency of sound at a connecting channel between a cavity and a dispense chamber, for the embodiment illustrated in FIG. 11A.

FIGS. 25A-E are example diagrams illustrating experimentally acquired acoustic spectra for multiple dispensing tip types.

FIGS. 26A-E are example diagrams illustrating experimentally acquired acoustic spectra for a dispensing tip at multiple temperatures.

FIGS. 28A-D are example diagrams illustrating experimentally acquired acoustic spectra for a dispensing tip at multiple temperatures and multiple volume levels.

DETAILED DESCRIPTION

Figure 1A:
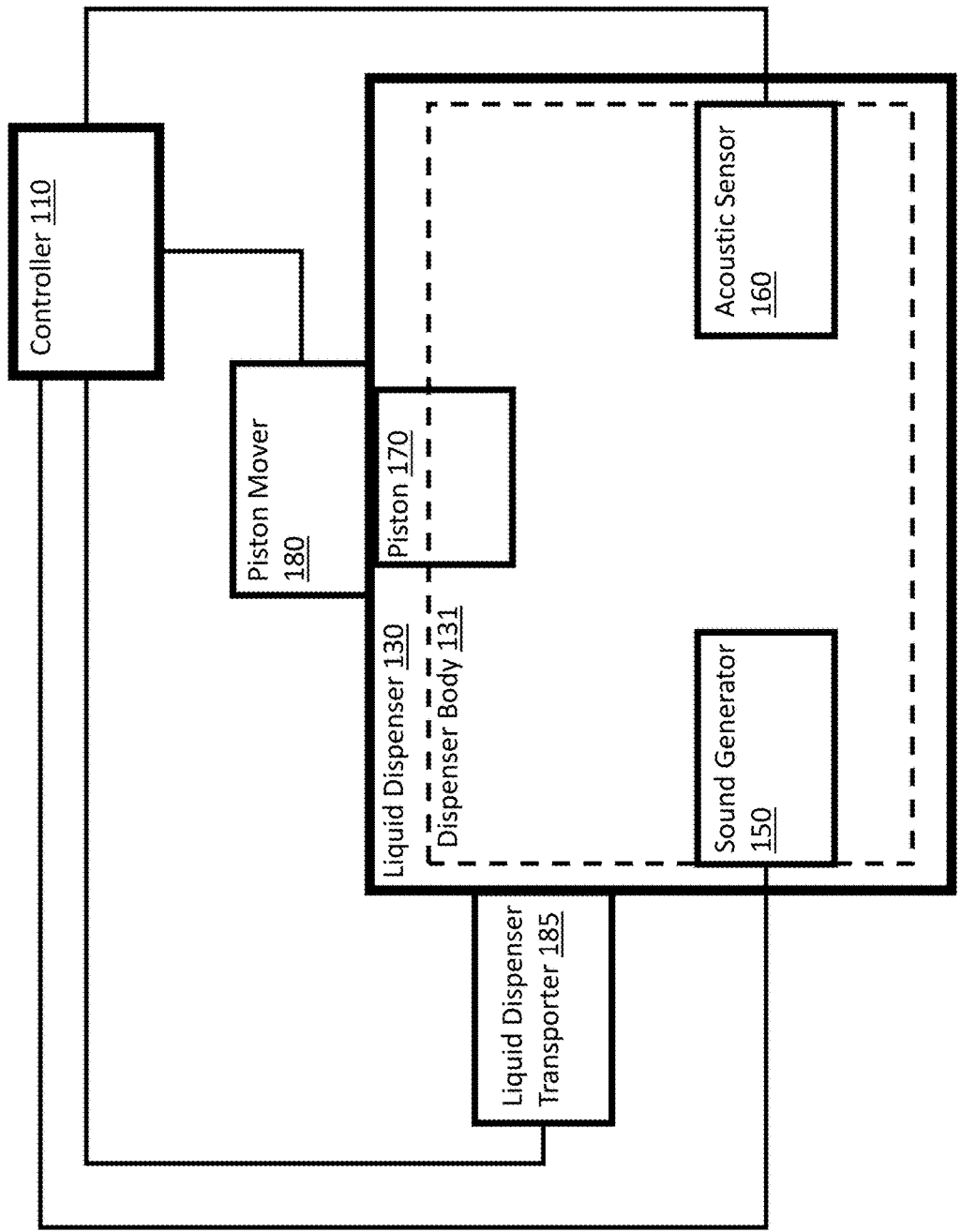
FIG. 1A illustrates a block diagram of a liquid dispenser system for transporting and dispensing liquid, where the liquid dispenser system is configured to detect tip-liquid contact.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments described herein relate to a device and a method for detecting liquid contact by a liquid dispenser, such as a pipette. Other embodiments described herein relate to a device and a method for determining a liquid volume within the liquid dispenser. To provide an effective way to draw liquid into a liquid dispenser, an automated liquid dispenser system may be configured to detect when the contact of the dispensing tip with liquid (e.g., tip-liquid contact) has occurred. One approach may detect when the tip of the liquid dispenser contacts the liquid by detecting changes in sound properties sensed by an acoustic sensor. In particular, a liquid dispenser may include a dispense chamber connected to a dispensing tip, where the dispense chamber may provide particular sound properties. When the dispensing tip contacts liquid, the sound properties within the dispense chamber may change, at least due to the liquid blocking the dispensing tip. Therefore, a sound generator and an acoustic sensor may be implemented with the liquid dispenser, such that the sound generator may generate sound that travels within the dispense chamber of the liquid dispenser and the acoustic sensor may sense an acoustic signal resulting from the generated sound within the dispense chamber of the liquid dispenser. The automated liquid dispenser system may determine that the tip of the liquid dispenser has contacted the liquid when the automated liquid dispenser system detects a noticeable change in the acoustic signal sensed by the acoustic sensor. Further, the embodiments described herein improve the accuracy of the detection of the tip-liquid contact and minimize errors based on the structure of the automated liquid dispenser system and/or a method of detection based on the sensed sound signal.

The acoustic sensor and the sound generator may be implemented within a structure of a liquid dispenser. For instance, the acoustic sensor that senses a sound signal within the liquid dispenser and the sound generator to provide sound to the inside of the liquid dispenser may be disposed within respective protruding side structures connected to a dispense chamber of the liquid dispenser. Such protruding structures may be referred to as side conduits and may extend outward from the dispense chamber to provide a sufficient room to house the acoustic sensor and the sound generator, respectively. The embodiments described herein prevent the side conduits from extending out to form structures that could introduce undesirable sound resonance causing errors in detection of the tip-liquid contact. For example, if the sound resonances formed by the side conduits fall into the vicinity of the sound resonance associated with the tip-liquid contact detection, the threshold for determining the tip-liquid contact may become sensitive to the dimensional changes in the side conduits. In one example, the dimensional changes may include a change in the cavity volume inside a side conduit due to a change in a location of a sensor and/or a generator inside the side conduit. Further, the embodiments described herein prevent hampering the implementation of liquid volume sensing in a similar manner. For example, the resonances formed by the side conduits may otherwise introduce substantial distortions into the sound spectrum sensed by the acoustic sensor, which may make it difficult to build a clear relationship between a peak frequency and a desired liquid volume. Thus, the inventions described herein provide improvements to the structures housing the acoustic sensor and the sound generator to reduce or avoid these unwanted sound resonances.

One aspect of the embodiments herein relates to improving accuracy of the detection of the tip-liquid contact by improvements in the structures that contain the sound generator and the acoustic sensor. In one embodiment, the dispense chamber of the liquid dispenser may be configured such that the sound generator and the acoustic sensor may be disposed within the dispense chamber portion, instead of using side conduits. In this embodiment, because there are no side conduits protruding from the dispense chamber and connected to the dispense chamber, any undesirable sound resonance caused by protruding side conduits may be reduced or avoided. According to another embodiment, side conduits protruding from the dispense chamber of the liquid dispenser may be used to contain the sound generator and the acoustic sensor, and structures of the side conduits may be configured such that the undesirable sound resonance may be avoided. In particular, a length of each side conduit may be limited to a particular length compared to an opening and an inside space of the side conduit, to maintain a resonant frequency caused by the side conduit to a specified range.

In some embodiments, the liquid dispenser may also have a piston chamber connected to the dispense chamber of the liquid dispenser. The piston chamber may receive a piston and guide the movement of the piston, such that liquid may be drawn or dispensed due to the pressure induced by the movement of the piston. The movement of the piston may cause additional noise that may be sensed by the acoustic sensor. Other changes in the acoustic properties caused by the movement of the piston may introduce errors in the sound signal sensed by the acoustic sensor. Therefore, the present disclosure provides an approach to reduce or eliminate the adverse effects of the movement of the piston, as described in more detail infra.

One aspect of the embodiments herein relates to improving accuracy of the detection of the tip-liquid contact and/or substantially improving accuracy of sensing of liquid in the tip (liquid volume sensing) by implementing an acoustic filter disposed between the dispense chamber and the piston chamber of the liquid dispenser. More specifically, the acoustic filter may be selected and positioned such that the acoustic filter may acoustically decouple the dispense chamber from the piston chamber. As such, the movement of the piston in the piston chamber may have a reduced effect or no effect on the sound signal sensed by the acoustic sensor.

In addition, several approaches may be developed to detect the tip-liquid contact using the sound signal sensed by the acoustic sensor. For example, the tip-liquid contact may be detected by measuring changes in the amplitude/phase or the acoustic impedance, based on the sound signal sensed by the acoustic sensor. However, such approaches may experience an increased rate of false detection of the tip-liquid contact as background noise increases. Because the liquid dispenser may be operating in an environment with constant noise, the background noise is an important factor to consider in detecting the tip-liquid contact. Therefore, the present disclosure provides an approach to detect the tip-liquid contact that is less affected by the background noise, as described in more detail infra One aspect of the embodiments herein relates to improving accuracy of the detection of the tip-liquid contact by using an improved approach to process the sound signal sensed by the acoustic sensor to detect the tip-liquid contact. Instead of solely relying on the amplitude/phase or the acoustic impedance, sound power or sound intensity of the sound sensed by the acoustic sensor may be monitored. In particular, the tip-liquid contact may be detected based on a change detected in a value associated with the sound power or sound intensity.

FIG. 1A illustrates a block diagram of a liquid dispenser system 100 (e.g., automated pipetting system) for transporting and dispensing liquid. The liquid dispenser system 100 may include a controller 110 configured to control various components of the liquid dispenser system 100, a liquid dispenser 130 to transport liquid, a piston mover 180 to move a piston 170 of the liquid dispenser 130, and a liquid dispenser transporter 185 to move the liquid dispenser 130. In an embodiment, the controller 110 may be a part of the liquid dispenser 130 or may be a separate device from the liquid dispenser 130. In an embodiment, the liquid dispenser 130 may be a pipette, and the liquid dispenser system 100 may be an automated pipette system. The piston mover 180 may include one or more motors controlled by the controller 110 to move the piston 170 and may be coupled with the piston 170. The liquid dispenser transporter 185 may include one or more motors controlled by the controller 110 to move the liquid dispenser 130 and may be coupled with the liquid dispenser 130. The liquid dispenser 130 may include a sound generator 150 configured to generate sound and an acoustic sensor 160 configured to sense a sound signal. The piston 170 of the liquid dispenser 130 may be configured to move within the liquid dispenser 130 to create a pressure in the liquid dispenser 130 to draw liquid into the liquid dispenser 130 or to dispense liquid out of the liquid dispenser 130. The liquid dispenser 130 may include a dispenser body 131 that includes the sound generator 150 and the acoustic sensor 160. The dispenser body 131 may be structured to receive the piston 170 and to guide a movement of the piston 170.

The controller 110 may be configured to receive and process the sound signal sensed by the acoustic sensor 160 and to detect whether a contact of the liquid dispenser 130 (e.g., via a dispensing tip) with liquid has occurred, as discussed in more detail below. The controller 110 may be configured to control the sound generator 150 to generate sound. For example, the controller 110 may set various settings for generating sound by the sound generator 150, such as a frequency of the sound, a type of the sound, a duration of the sound, intensity/volume of the sound, etc. The controller 110 may be further configured to control the piston mover 180 to move the piston 170. For example, the controller 110 may control the piston mover 180 to move the piston 170 based on whether the controller 110 determines to draw liquid into the liquid dispenser 130 or to dispense liquid out of the liquid dispenser 130. The controller 110 may be further configured to control the liquid dispenser transporter 185 to move the liquid dispenser 130. For example, the controller 110 may control the liquid dispenser transporter 185 such that the liquid dispenser transporter 185 may move the liquid dispenser 130 to a liquid reservoir to draw liquid from the liquid reservoir and may move the liquid dispenser 130 to a target location for dispensing the liquid.

In an embodiment, the controller 110 may be configured to communicate via a wired or wireless communication with the liquid dispenser 130 (e.g., with the sound generator 150 and the acoustic sensor 160), the piston mover 180, and the liquid dispenser transporter 185. For instance, the controller 110 may be configured to communicate with the liquid dispenser 130, the piston mover 180, and/or the liquid dispenser transporter 185 via a serial peripheral interface (SPI), an I²C (Inter-Integrated Circuit) bus, an RS-232 interface, a universal serial bus (USB) interface, an Ethernet interface, a Bluetooth® interface, an IEEE 802.11 interface, or any combination thereof. In an embodiment, the controller 110 may be configured to communicate with the liquid dispenser 130, the piston mover 180, and/or the liquid dispenser transporter 185 via a local computer bus, such as a peripheral component interconnect (PCI) bus. In an embodiment, the controller 110 may be separate from the liquid dispenser 130 and may communicate with the liquid dispenser 130 via the wireless or wired connection discussed above. In an embodiment, the controller 110 may be an integral component of the liquid dispenser 130, and may communicate with other components of the liquid dispenser 130 and/or the piston mover 180, and/or the liquid dispenser transporter 185 via the local computer bus discussed above. In some cases, the controller 110 may be a dedicated controller that controls only liquid dispenser 130. In other cases, the controller 110 may be configured to control multiple liquid dispensers, including the liquid dispenser 130. In an embodiment, the controller 110 and the liquid dispenser 130 are located at the same premises (e.g., research laboratory). In another embodiment, the controller 110 may be remote from the liquid dispenser 130, the piston mover 180, and the liquid dispenser transporter 185, and may be configured to communicate with the liquid dispenser 130, the piston mover 180, and the liquid dispenser transporter 185 via a network connection (e.g., local area network (LAN) connection).

Figure 1B:
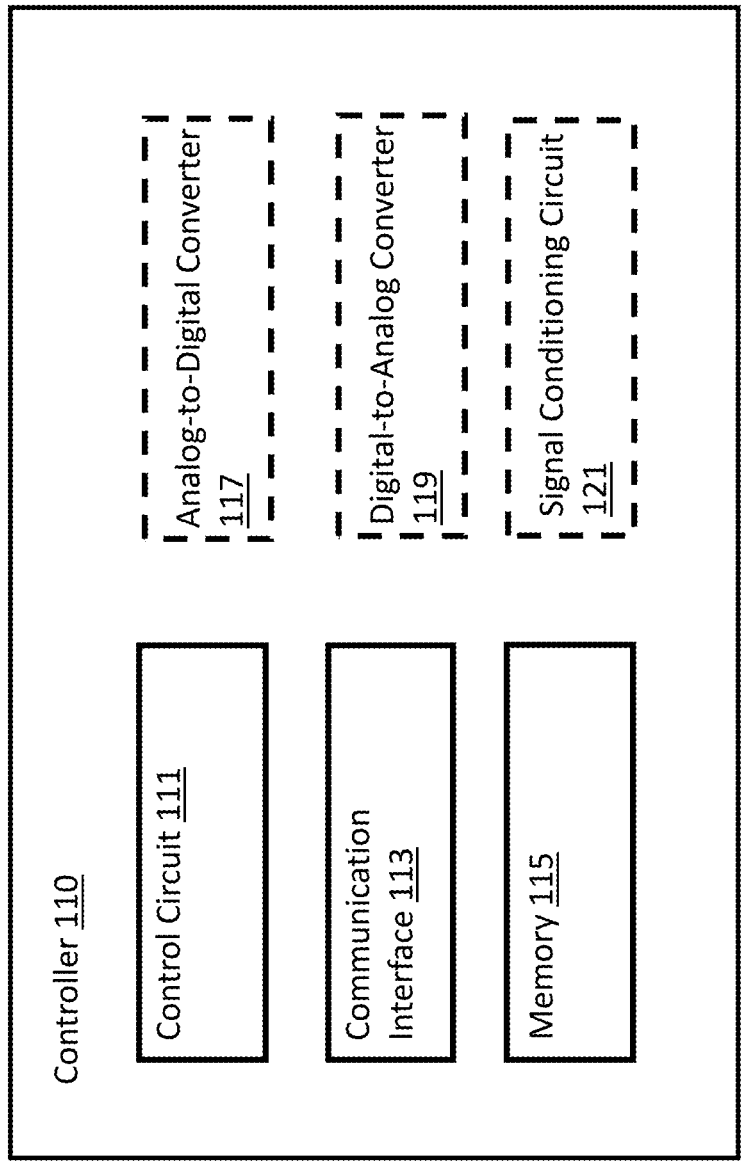
FIG. 1B illustrates a block diagram of a controller for the liquid dispenser system.

FIG. 1B illustrates a block diagram of the controller 110 for the liquid dispenser system 100. As illustrated in the block diagram, the controller 110 includes a control circuit 111, a communication interface 113, and a non-transitory computer-readable medium 115 (e.g., memory or other computer-readable storage medium). In an embodiment, the control circuit 111 may include one or more processors, a programmable logic circuit (PLC) or a programmable logic array (PLA), a field programmable gate array (FPGA), an application specific integrated circuit (ASIC), or any other control circuit.

In an embodiment, the communication interface 113 may include one or more components that are configured to communicate with the liquid dispenser 130 (e.g., with the sound generator 150 and the acoustic sensor 160), the piston mover 180, and the liquid dispenser transporter 185. For instance, the communication interface 113 may include a communication circuit configured to perform communication over a wired or wireless protocol. As an example, the communication circuit may include a SPI controller, an I²C controller, an RS-232 port controller, a USB controller, an Ethernet controller, a Bluetooth® controller, a PCI bus controller, any other communication circuit, or a combination thereof.

In an embodiment, the non-transitory computer-readable medium 115 may include computer memory. The computer memory may comprise, e.g., Flash, electrically erasable programmable read-only memory (EEPROM), dynamic random access memory (DRAM), solid state integrated memory, and/or a hard disk drive (HDD). In some cases, various methods described herein may be implemented through computer-executable instructions (e.g., computer code) stored on the non-transitory computer-readable medium 115. In such cases, the control circuit 111 may include one or more processors configured to perform the computer-executable instructions (e.g., the steps illustrated in FIG. 18).

The controller 110 may further include an analog-to-digital converter 117 that converts an analog signal to a digital signal. The analog-to-digital converter 117 may be an optional component. In an embodiment, the output signals from the acoustic sensor 160 are analog signals, and thus may be converted to digital signals using the analog-to-digital converter 117, allowing them to be further processed by the control circuit 111. The controller 110 may further include a digital-to-analog converter 119 that converts a digital signal to an analog signal. The digital-to-analog converter 119 may be an optional component. In an embodiment, the input signals for the sound generator 150 are analog signals, and thus may be derived from the digital signals generated from the control circuit 111 using the digital-to-analog converter 119.

The controller 110 may further include a signal conditioning circuit 121. The signal conditioning circuit 121 may manipulate various analog signals so that the analog signals can meet requirements of their next stages for further processing. The signal conditioning circuit 121 may include an amplifier that receives an input signal, amplifies the input signal, and outputs the amplified input signal as an output signal. In one aspect, an amplifier may be used to amplify an input signal so that the output sound from the sound generator 150 can reach a desired volume range based on the input signal originated from the control circuit 111. In an embodiment, an analog amplifier may be used to amplify an input signal associated with the sound sensed by the acoustic sensor 160 so that the output signal of the acoustic sensor 160 can reach the desired level to match the input range of the analog-to-digital converter 117. The signal conditioning circuit 121 may further include an active/passive filter for the signals. For example, the filter may be a low pass filter configured to pass signals with a frequency lower than a cutoff frequency and to discard signals with the cutoff frequency or a frequency higher than the cutoff frequency.

The low pass filter may be used to output a smoother form of an input signal. Hence, the low pass filter may be used to reduce noise. In an embodiment, the output signals from the acoustic sensor 160 may be passed through the low pass filter, e.g., to perform initial smoothing of the output signals from the acoustic sensor 160.

FIG. 2A is an example diagram illustrating a liquid dispenser system 200 configured to detect tip-liquid contact. FIG. 2B is an example diagram illustrating a cross-section view of a portion of a liquid dispenser 230 of the liquid dispenser system 200. The liquid dispenser system 200 may be an example embodiment of the liquid dispenser system 100 of FIG. 1, and thus components of the liquid dispenser system 200 may correspond to the components of the liquid dispenser system 100. The liquid dispenser system 200 includes the liquid dispenser 230 controlled by the controller 110. The liquid dispenser 230 may include a dispenser body 231 that includes a dispense chamber portion 240 and a piston chamber portion 275. The dispenser body 231 of the liquid dispenser 230 may be included within a housing 235, which may be an optional structure.

The dispense chamber portion 240 includes a dispense chamber 241 having a first opening at a first portion 243 of the dispense chamber 241 and a second opening at a second portion 245 of the dispense chamber 241 connected to a piston chamber 277. The first portion 243 may be at a first end of the dispense chamber 241, and the second portion 245 may be at a second end of the dispense chamber 241. The liquid dispenser 230 further includes a piston 270 that is received and guided by the piston chamber 277 in the piston chamber portion 275 of the dispenser body 231. The first portion 243 of the dispense chamber 241 is configured to couple with a dispensing tip, such as a dispensing tip 247. The dispensing tip 247 may be permanently attached to the first portion 243 or may be removably attached to the first portion 243. In one example, the dispensing tip 247 may be a part of the dispense chamber portion 240. Because a cavity of the dispensing tip 247, the dispense chamber 241, and the piston chamber 277 are connected to one another, the piston 270 may be moved to change a pressure within the dispense chamber 241 to draw liquid into the dispensing tip 247. The liquid dispenser system 200 includes a liquid dispenser transporter 285 configured to move the liquid dispenser 230 and includes a piston mover 280 configured to move the piston 270 within the piston chamber 277. Dispensing tip 247 can be configured to dispense a volume ranging from between 5 μl to 1000 μl, although other volumes are contemplated as well. In an exemplary embodiment, dispensing tip 247 is a 350 μl volume tip. Further, dispensing tip 247 can include an off-the-shelf automation tip, such as TECAN- or RAININ-brand tips, or a conductive-type tip adapted to employ capacitive sensing. Further, dispensing tip 247 can dispense at varying dispensation rates, ranging from between 5 μl/s to 700 μl/s, although other rates are contemplated as well. For example, in a non-limiting, exemplary embodiment, dispensing tip 247 is adapted to dispense at approximately 600 μl/s.

In one example, the liquid dispenser transporter 285 may move the liquid dispenser 230 above a liquid reservoir 295 containing a liquid 290 and lower the liquid dispenser 230 toward the liquid 290 until the dispensing tip 247 contacts the liquid 290. When the controller 110 detects that the dispensing tip 247 has contacted the liquid 290, the controller 110 may control the liquid dispenser transporter 285 to stop the motion of the liquid dispenser 230. Then the controller 110 may further control the piston mover 280 to move the piston 270 upward to draw a specified amount of the liquid 290 into the dispensing tip 247. After the specified amount of the liquid 290 is drawn, the controller 110 may control the piston mover 280 to stop moving the piston 270, and may control the liquid dispenser transporter 285 to move the liquid dispenser 230 to a target location. When the target location is reached, the controller 110 may control the piston mover 280 to move the piston 270 downward to dispense the liquid from the dispensing tip 247.

The dispenser body 231 of the liquid dispenser 230 may include a sound generator 250 that generates a sound to the dispense chamber 241 to induce acoustic resonance within the dispense chamber 241. The dispenser body 231 of the liquid dispenser 230 may include an acoustic sensor 260 that may sense sound from the dispense chamber 241. The non-limiting, illustrative embodiment illustrated in FIG. 2A shows that the sound generator 250 and the acoustic sensor 260 are disposed to face each other and are spaced apart from each other. However, the arrangements and the relative locations of the sound generator 250 and the acoustic sensor 260 are not limited to the example of FIG. 2A. For instance, in another example, the sound generator 250 and the acoustic sensor 260 may not face each other and/or may be disposed next to each other.

Figure 2D:
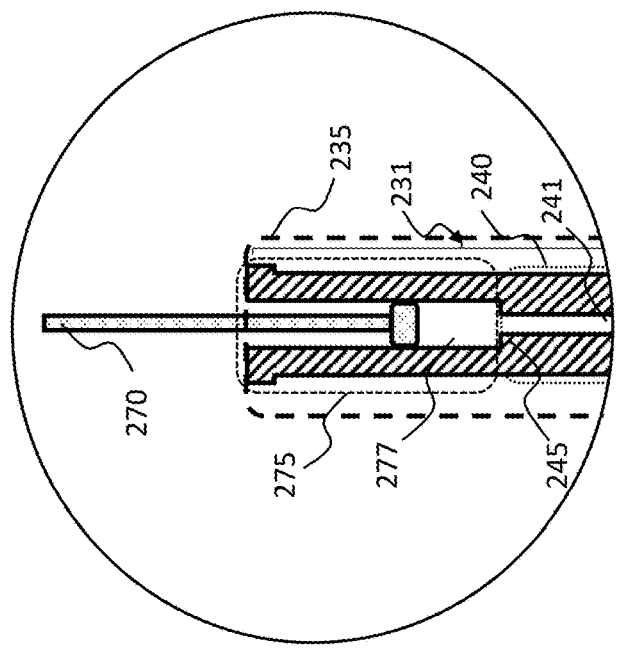
FIG. 2D is an example diagram illustrating a cross-section view of a portion of the liquid dispenser illustrated in FIG. 2C.
Figure 2C:
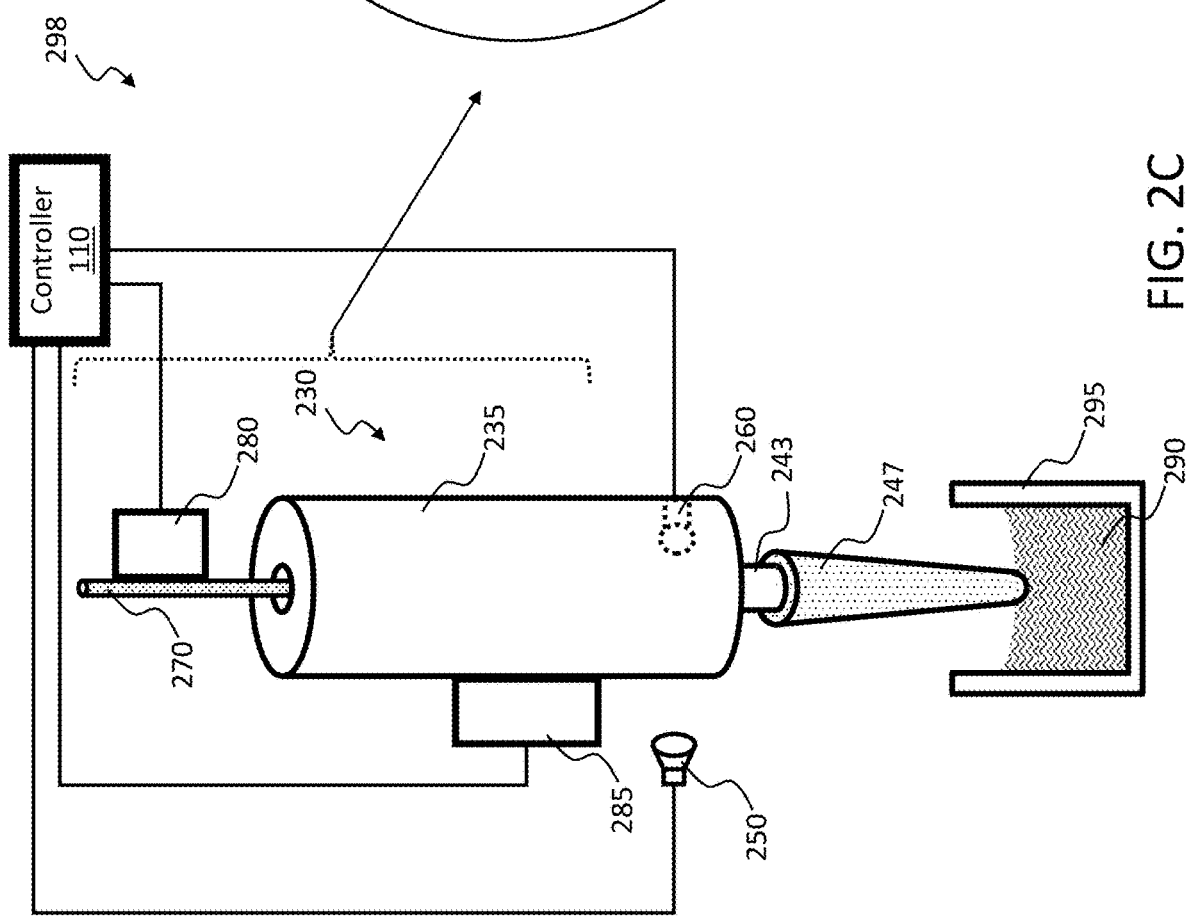
FIG. 2C is another example diagram illustrating a liquid dispenser system 298 configured to detect tip-liquid contact.

FIG. 2C is another example diagram illustrating a liquid dispenser system 298 configured to detect tip-liquid contact. The liquid dispenser system 298 of FIG. 2C may be the same as the liquid dispenser system 200 of FIG. 2A, except for a location of the sound generator 250. In particular, the sound generator 250 in liquid dispenser system 298 may be located outside the liquid dispenser 230. In one aspect, there may be an opening or a gap at the liquid dispenser system 298 to allow sound generated by the sound generator 250 to travel to the acoustic sensor 260. FIG. 2D is an example diagram illustrating a cross-section view of a portion of a liquid dispenser 230 of the liquid dispenser system 298. As discussed above, the liquid dispenser system 298 of FIG. 2C may be the same as the liquid dispenser system 200 of FIG. 2A, except for a location of the sound generator 250. Hence, FIG. 2D shows the same features as FIG. 2B.

Figure 3:
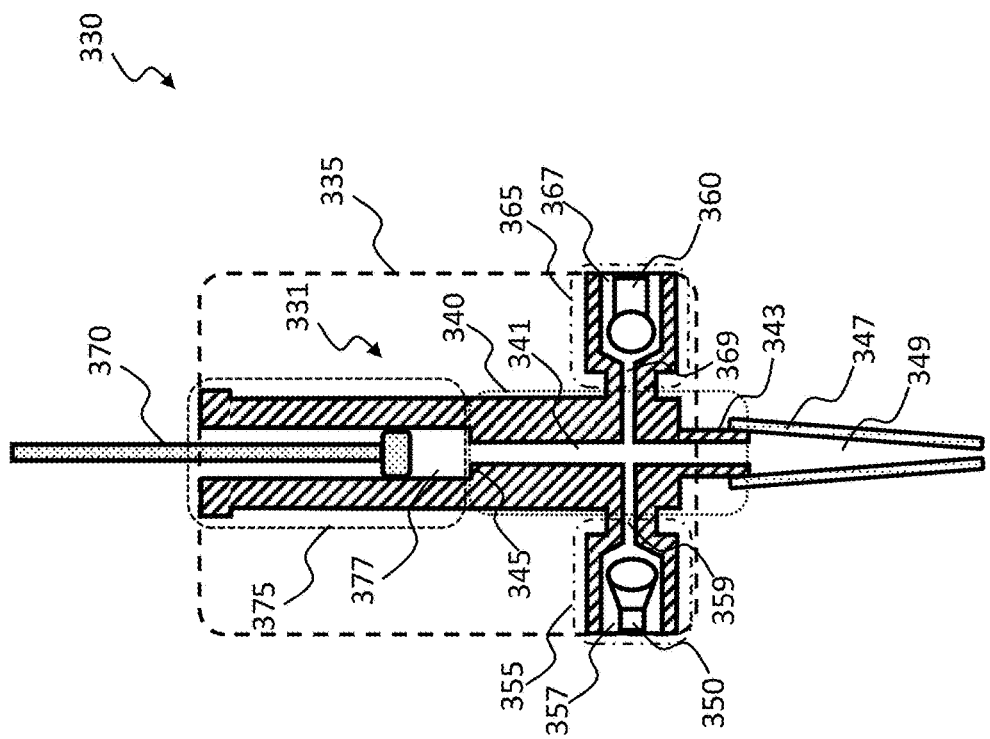
FIG. 3 is an example diagram illustrating a cross-section view of an example liquid dispenser.

FIG. 3 is an example diagram illustrating a cross-section view of a liquid dispenser 330. In an embodiment, the liquid dispenser 330 may be an embodiment of the liquid dispenser 230. For the embodiment illustrated by FIG. 3, the liquid dispenser includes a dispenser body 331 including a dispense chamber portion 340 and a piston chamber portion 375. The dispense chamber portion 340 has a dispense chamber 341 therein. The dispense chamber 340 may have a first opening at a first portion 343 of the dispense chamber 340 and a second opening at a second portion 345 of the dispense chamber 340. The first portion 343 of the dispense chamber 340 is coupled with a dispensing tip 347. The dispense chamber 341 is connected to a piston chamber 377 of the piston chamber portion 375 via the second opening at the second portion 345. The piston chamber 377 is configured to guide a piston 370 in a linear motion within the piston chamber 377 to draw liquid into the liquid dispenser 330 and to dispense liquid out of the liquid dispenser 330 (e.g., via a dispenser tip 347). The liquid may be drawn into a tip cavity 349 of the dispenser tip 347 and may be dispensed out of the tip cavity 349 based on the movement of the piston 370.

The dispenser body 331 further includes a first side conduit 355 having a first cavity 357 and a first connector channel 359 connecting the first cavity 357 to the dispense chamber 341. The sound generator 350 may be disposed within the first cavity 357 and may generate a sound to induce acoustic resonance within the dispense chamber 341.

The dispenser body 331 further includes a second side conduit 365 having a second cavity 367 and a second connector channel 369 connecting the second cavity 367 to the dispense chamber 341. An acoustic sensor 360 may be disposed within the second cavity 367 and may sense sound from the dispense chamber 341.

For the embodiment illustrated by FIG. 3, the first conduit 355 and the second conduit 365 protrude out from the dispense chamber portion 340. Further, the first conduit 355 and the second conduit 365 with a large size are implemented to accommodate large sizes of the sound generator 350 and the acoustic sensor 360, respectively. The structures of the first conduit 355 and the second conduit 365 may contribute to errors in detecting whether the dispensing tip 347 has contacted liquid, as described in more detail below. For example, to avoid undesirable errors, the acoustic resonance caused by the first conduit 355 and/or the second conduit 365 should be outside the frequency range used to detect the tip-liquid contact. In one example, the desired frequency range for detecting the tip-liquid contact may be 200 Hz-1 kHz, or preferably 100 Hz-4 kHz. Therefore, the acoustic resonance caused by the first conduit and/or the second conduit should be outside of the noted frequency range.

Figure 4:
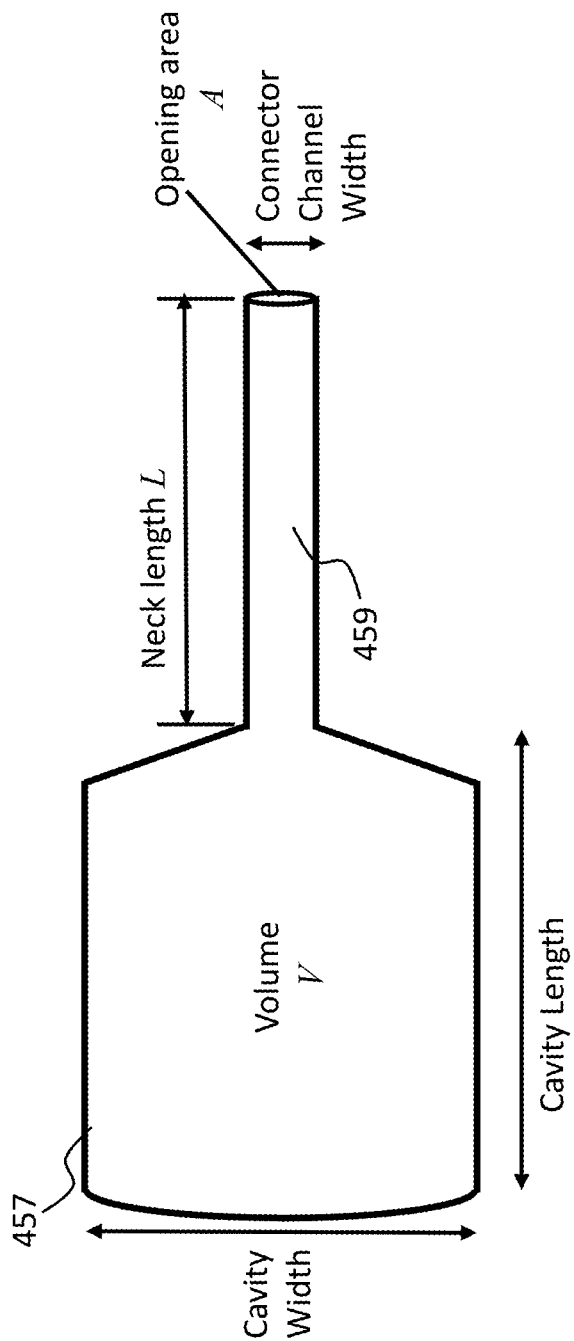
FIG. 4 illustrates calculation of a resonant frequency of sound based on a geometry of the side conduit including a connecting channel and a cavity.

FIG. 4 illustrates calculation of a resonant frequency of sound at a connecting channel of a side conduit based on a geometry of the side conduit. A structure with a cavity such as the cavity 457 having a small opening such as the opening provided by the connecting channel 459 may form a Helmholtz resonator. In an embodiment, the first cavity 357 and the first connecting channel 359 of the first side conduit 355 of FIG. 3 may have similar structures to the cavity 457 and the connecting channel 459, respectively. In an embodiment, the second cavity 367 and the second connecting channel 369 of the second side conduit 365 of FIG. 3 may have similar structures to the cavity 457 and the connecting channel 459.

For the embodiment illustrated by FIG. 4, a side conduit may have a cavity 457 with a known volume V and a connecting channel 459 having a neck length L, where the connecting channel 459 has an opening area A. Where c represents the speed of sound, the resonant frequency f may be calculated based on the following equation.

$$f = \frac{c}{2\pi}\sqrt{\frac{A}{Vl}}$$

The Helmholtz resonator formed by the cavity 457 and the connecting channel 459 may act as a notch filter that may add distortions to the acoustic spectrum. In particular, the resonant frequency f introduce by the Helmholtz resonator may interfere with a frequency range of the sound that is used to detect a tip-liquid contact. In one example, the cavity width, the cavity length, and the neck length L each may be 15 mm and the connector channel width may be 4 mm. In such an example, the volume V may be approximately 2649 mm$^3$ and the opening area A may be 12.56 mm$^2$, and the speed of sound is 343 m/s (or 343000 mm/s). In this example, resonant frequency f may be approximately 971 Hz, according to the above equation. If the frequency range of the sound that is used to detect the tip-liquid contact is 200 Hz-1 kHz, or preferably 100 Hz-4 kHz, then the resonant frequency of 971 Hz falls within the frequency range and thus may interfere with the detection of the tip-liquid contact. Therefore, structures to house the sound generator and the acoustic sensor should be designed to avoid the acoustic resonance that falls within the frequency range used to detect the tip-liquid contact.

According to one embodiment, a side conduit may be designed such that the resonant frequency f is outside of the frequency range of the sound that is used to detect the tip-liquid contact. Thus, a cavity and a connector of a side conduit may be structured to be free from sound resonance within a frequency range of the sound sensed by the acoustic sensor to detect the tip-liquid contact. In an embodiment, the volume V of the cavity and the opening area A and the neck length L of the connector for the side conduit may be determined such that the resonant frequency f is outside of the frequency range of the sound used to detect the tip-liquid contact. For example, the preferred frequency range for detecting the tip-liquid contact may be 100 Hz-4 kHz. Hence, in such an example, the opening area A, the volume V, and the neck length L may be selected to ensure a frequency that is less than 100 Hz or greater than 4 kHz. Based on the above equation, the resonant frequency may be increased beyond the frequency range used to detect the tip-liquid contact by increasing the opening area A and/or decreasing the volume V and/or decreasing the neck length L. For example, selecting a sound generator and an acoustic sensor that are small may allow decreasing the volume V and/or decreasing the neck length L. As such, because the structure with the resonant frequency f outside of the frequency range of the sound may reduce or eliminate the errors caused by the resonant frequency f, such a structure may allow improved accuracy in detection of the tip-liquid contact as well as the detection of the tip presence (e.g., detecting whether a tip has been ejected or not) or a type of a dispensing tip.

Figure 5A:
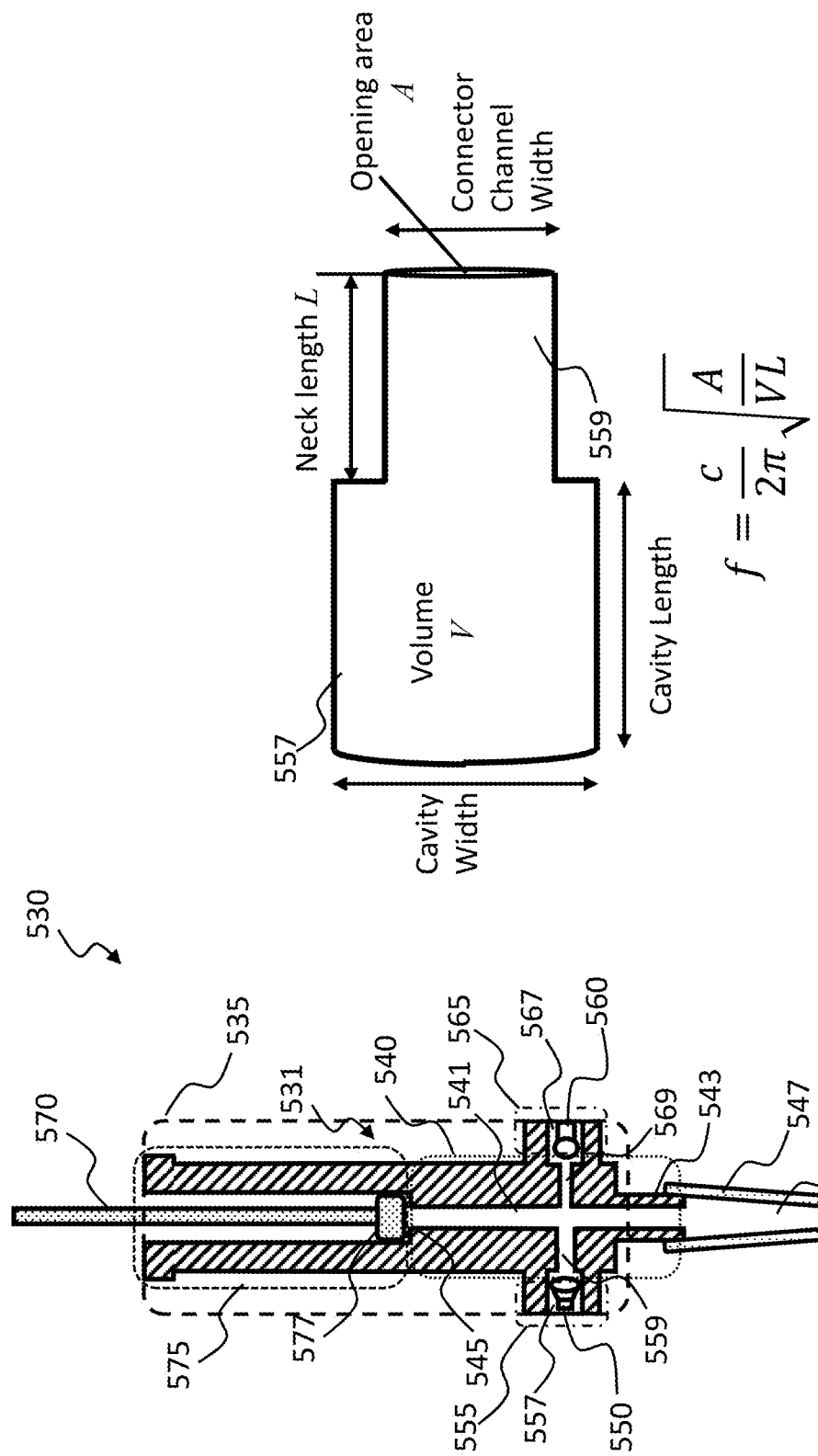
FIG. 5A is an example diagram illustrating a cross-section view of an example liquid dispenser with short side conduits that are structured to avoid sound resonance within a frequency range for sensing sound, according to an embodiment herein.

FIG. 5A is an example diagram illustrating a cross-section view of an example liquid dispenser 530 with side conduits that are structured to avoid sound resonance within a frequency range of sound sensed by an acoustic sensor of the liquid dispenser 530, according to an embodiment herein. FIG. 5AA is an example diagram illustrating calculation of a resonant frequency of sound based on a geometry of the side conduit including a connecting channel and a cavity, for the embodiment illustrated in FIG. 5A. In FIG. 5A, the portions represented by reference numbers 535, 540, 541, 543, 545, 547, 549, 570, 575, and 577 have similar features to the portions represented by the reference numbers 340, 341, 343, 345, 347, 349, 370, 375, and 377, respectively, as discussed above in reference to FIG. 3. Hence, detailed discussions of reference numbers 535, 540, 541, 543, 545, 545, 549, 570, 575, and 577 are omitted.

For the embodiment illustrated by FIG. 5A, the liquid dispenser 530 has a dispenser body 531 including a first side conduit 555 having a first cavity 557 and a first connector channel 559 connecting the first cavity 557 to the dispense chamber 541. The sound generator 550 may be disposed within the first cavity 557 and may generate a sound to induce acoustic resonance within the dispense chamber 541. The dispenser body 531 includes a second side conduit 565 having a second cavity 567 and a second connector channel 569 connecting the second cavity 567 to the dispense chamber 541. The acoustic sensor 560 may be disposed within the second cavity 567 and may sense a sound within the dispense chamber 541. The arrangements of the sound generator 550 and the acoustic sensor 560 and the number of side conduits implemented may not be limited to the example shown in FIG. 5A. For instance, in another example, the sound generator and/or the acoustic sensor may be disposed within a single side conduit.

For the embodiment illustrated by FIG. 5A, the sound generator 550 of the liquid dispenser 530 is smaller than the sound generator 350 of the liquid dispenser 330 of FIG. 3. Further, as for the embodiment illustrated by FIG. 5A, the acoustic sensor 560 of the liquid dispenser 530 is smaller than the acoustic sensor 360 of the liquid dispenser 330 of FIG. 3. As such, when compared with the liquid dispenser 330 of FIG. 3, the volume V of the cavity of each side conduit has been reduced. Further, when compared with the liquid dispenser 330 of FIG. 3, the neck length L that corresponds to the length of the connecting channel of each side conduit has also been reduced. The reduction in the volume V of the cavity and the neck length L as illustrated in FIG. 5A may be achieved by implementing a smaller sound generator and a smaller acoustic sensor. For the embodiment illustrated by FIG. 5A, the sound generator 550 of the liquid dispenser 530 is smaller than the sound generator 350 of the liquid dispenser 330 of FIG. 3. Further, for the embodiment illustrated by FIG. 5A, the acoustic sensor 560 of the liquid dispenser 530 is smaller than the acoustic sensor 360 of the liquid dispenser 330 of FIG. 3. By reducing the volume V of the cavity and the neck length L, the resonant frequency f is increased to a frequency beyond the frequency range of the sound used for detection of the tip-liquid contact.

In the example above in reference to FIGS. 3 and 4, if the volume V is 2649 mm$^3$, the neck length L is 15 mm, the opening area A may be 12.56 mm$^2$, and the speed of sound is 343 m/s, then the resonant frequency f is approximately 971 Hz. In FIG. 5A, in one example, the cavity width may be reduced to 5 mm, and the cavity length and the neck length L each may be reduced to 4 mm, while the connector channel width may be 4 mm. In this example, the volume V of a cavity of each side conduit may be reduced to 78.5 mm$^3$, while the opening area A of a connector channel may be 12.56 m$^2$ and the speed of sound may be 343 m/s (or 343000 mm/s). Then, the resonant frequency f is approximately 10.9 kHz. If the preferred frequency range for detecting the tip-liquid contact is 100 Hz-4 kHz, the resonant frequency f of 10.9 kHz is outside of the frequency range for detecting the tip-liquid contact and thus does not adversely affect the detection of the tip-liquid contact. This example illustrates that reducing the volume V and the neck length L may increase the resonant frequency f to be beyond or otherwise outside the frequency range for detecting the tip-liquid contact.

Figure 5C:
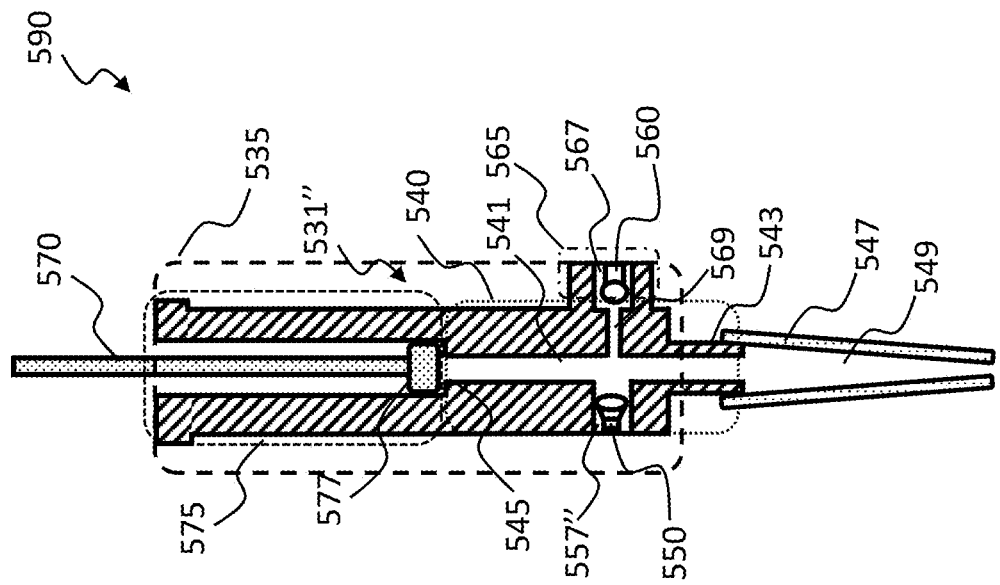
FIG. 5C is an example diagram illustrating a cross-section view of an example liquid dispenser with a single short side conduit that is structured to avoid sound resonance within a frequency range for sensing sound, according to an embodiment herein.
Figure 5B:
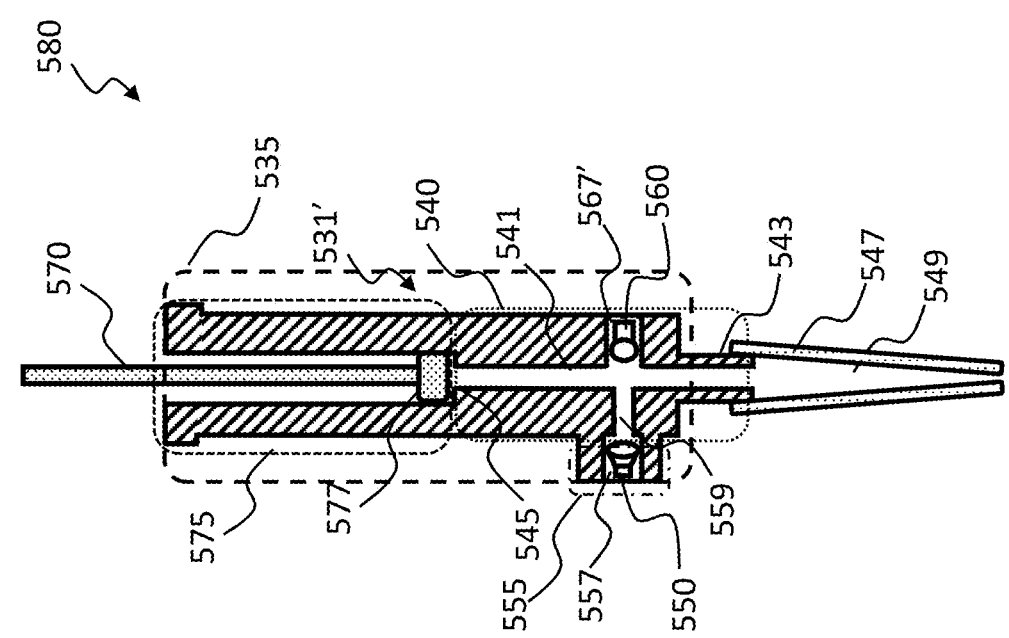
FIG. 5B is an example diagram illustrating a cross-section view of an example liquid dispenser with a single short side conduit that is structured to avoid sound resonance within a frequency range for sensing sound, according to an embodiment herein.

FIG. 5B is an example diagram illustrating a cross-section view of an example liquid dispenser 580 with a single short side conduit that is structured to avoid sound resonance within a frequency range for sensing sound, according to an embodiment herein. The embodiment illustrated in FIG. 5B may be considered as a modification of the embodiment illustrated in FIG. 5A. In the embodiment of FIG. 5B, instead of having two side conduits as illustrated FIG. 5A, a single side conduit is implemented. For the embodiment illustrated by FIG. 5B, the liquid dispenser 580 has the dispenser body 531' including the first side conduit 555 having a first cavity 557 and a first connector channel 559 connecting the first cavity 557 to the dispense chamber 541. The sound generator 550 may be disposed within the first cavity 557 and may generate a sound to induce acoustic resonance within the dispense chamber 541. The dispenser body 531' does not have a second side conduit. Thus, the acoustic sensor 560 may be disposed within a second cavity 567' in the dispense chamber portion 540 and may sense a sound within the dispense chamber 541.

FIG. 5C is an example diagram illustrating a cross-section view of an example liquid dispenser 590 with a single short side conduit that is structured to avoid sound resonance within a frequency range for sensing sound, according to an embodiment herein. The embodiment illustrated in FIG. 5C may be considered as a modification of the embodiment illustrated in FIG. 5A. In the embodiment of FIG. 5C, instead of having two side conduits as illustrated FIG. 5A, a single side conduit is implemented. For the embodiment illustrated by FIG. 5C, the dispenser body 531" includes a second side conduit 565 having a second cavity 567 and a second connector channel 569 connecting the second cavity 567 to the dispense chamber 541. The acoustic sensor 560 may be disposed within the second cavity 567 and may sense a sound within the dispense chamber 541. The dispenser body 531" does not have a first side conduit. Thus, the sound generator 550 may be disposed within a first cavity 557" in the dispense chamber portion 540 and may generate a sound to induce acoustic resonance within the dispense chamber 541.

According to one embodiment, a liquid dispenser may be designed to avoid the Helmholtz resonance caused by a structure of a cavity for housing a sound generator and/or acoustic sensor and a connecting channel. In one aspect, the width of the cavity and the width of the connector channel width may be maintained substantially the same, so as to avoid the Helmholtz resonator structure. In one aspect, implementation of side conduit(s) may be avoided to avoid the Helmholtz resonance caused by a side conduit. In one example, a sound generator and an acoustic sensor may be disposed within the dispense chamber portion of the liquid dispenser. For example, by selecting a sound generator and an acoustic sensor that are small enough to fit within the dispense chamber of the liquid dispenser, no side conduit protruding from the dispense chamber portion is necessary and thus the Helmholtz resonance that may be caused by a structure of a side conduit may be avoided. By avoiding the Helmholtz resonance, distortions experienced in detecting the tip-liquid contact may be reduced. Further, by avoiding the Helmholtz resonance, the accuracy in liquid volume sensing and/or tip presence detection may be improved.

Figure 6:
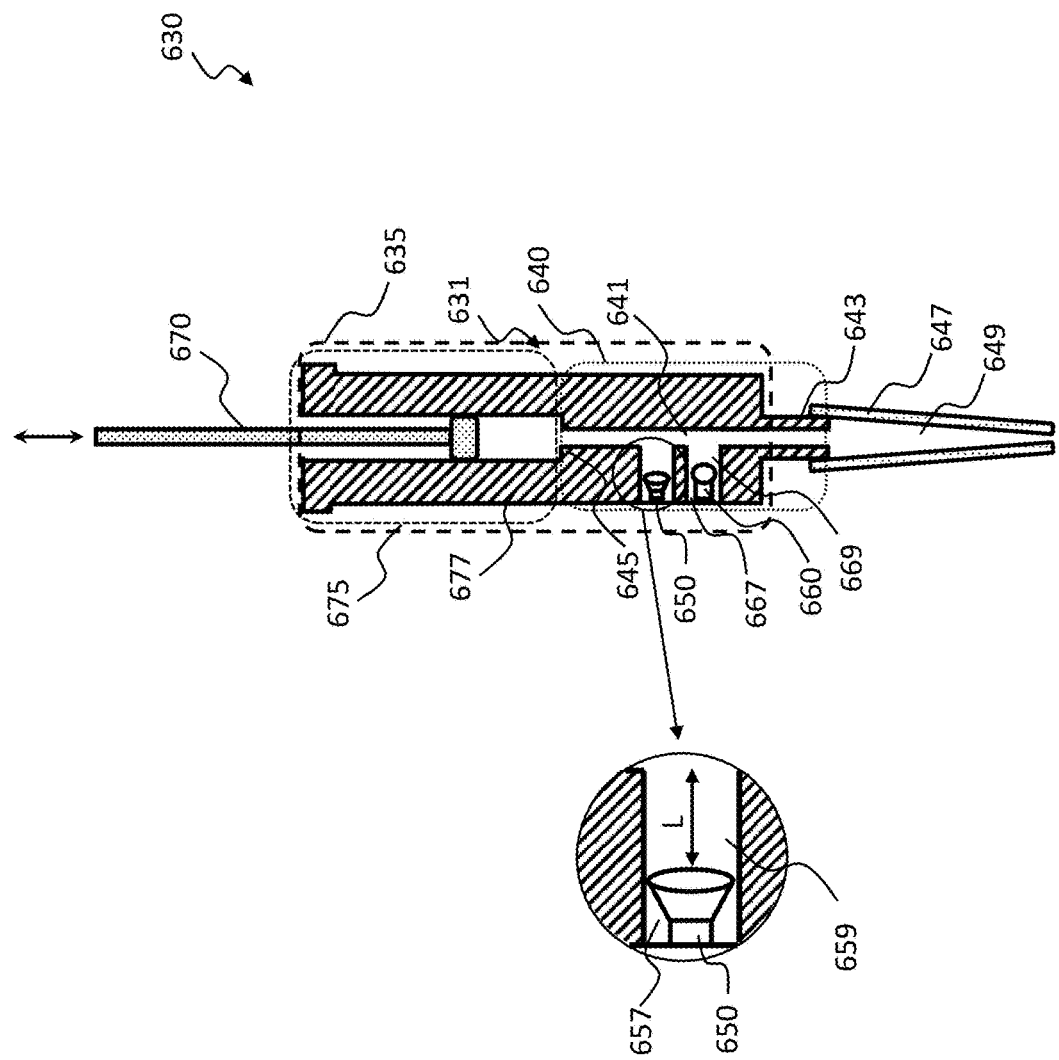
FIG. 6 is an example diagram illustrating a cross-section view of an example liquid dispenser to avoid sound resonance within a frequency range for sensing sound, according to an embodiment herein.

FIG. 6 is an example diagram illustrating a cross-section view of an example liquid dispenser 630 to avoid sound resonance within a frequency range of sound sensed by an acoustic sensor of the liquid dispenser 630, according to an embodiment herein. The example liquid dispenser 630 of FIG. 6 is structured to avoid a Helmholtz resonator structure that may generate the undesirable sound resonance and may not have side conduits. In an embodiment, the liquid dispenser 630 may be an embodiment of the liquid dispenser 330. For the embodiment illustrated by FIG. 6, the liquid dispenser 630 includes a dispenser body 631 including a dispense chamber portion 640 and a piston chamber portion 675. The dispense chamber portion 640 has a dispense chamber 641 therein. The dispense chamber 641 may have a first opening at a first portion 643 of the dispense chamber 640 and a second opening at a second portion 645 of the dispense chamber 640. The first portion 643 of the dispense chamber 641 is coupled with a dispensing tip 647. The dispense chamber 641 is connected to a piston chamber 677 of the piston chamber portion 675 via the second opening at the second portion 645. The piston chamber 677 is configured to guide a piston 670 in a linear motion within the piston chamber 677 to draw liquid into the liquid dispenser 630 and to dispense liquid out of the liquid dispenser 630 (e.g., via a dispenser tip 647). The liquid may be drawn into a tip cavity 649 of the dispenser tip 647 and may be dispensed out of the tip cavity 649 based on the movement of the piston 670.

As shown in FIG. 6, the dispense chamber 641 may have a longitudinal path that extends longitudinally between the first opening of first portion 643 and the second opening of the second portion 645. A sound generator 650 may be positioned within the dispense chamber 641 to provide sound to the longitudinal path of the dispense chamber 641. In an embodiment, an acoustic sensor 660 may be positioned within the dispense chamber 641 to sense a sound directly from the longitudinal path of the dispense chamber 641. In the example shown in FIG. 6, the sound generator 650 and the acoustic sensor 660 are located on the same side of the dispenser body 631. However, the location of the sound generator 650 with respect to the location of the acoustic sensor 660 is not limited to the example shown in FIG. 6. In an embodiment, the sound generator 650 and/or the acoustic sensor 660 may not protrude out from the dispense chamber portion 641.

As shown in FIG. 6, the dispenser body 631 of the liquid dispenser 630 has a first cavity including a first cavity portion 657 and a first connector channel portion 659 connecting the first cavity portion 657 to the dispense chamber 641. The sound generator 650 may be disposed within the first cavity 657 and may generate a sound to induce acoustic resonance within the dispense chamber 641. The dispenser body 631 includes a second cavity having a second cavity portion 667 and a second connector channel portion 669 connecting the second cavity portion 667 and the dispense chamber 647. The acoustic sensor 660 may be disposed within the second cavity portion 667 and may sense a sound within the dispense chamber 641. Because a width of the first cavity portion 657 and the width of the first connector channel portion 659 are substantially the same, the first cavity portion 657 and the first connector channel portion 659 do not form a Helmholtz resonator. Therefore, Helmholtz resonance does not exist in the liquid dispenser 630 and thus errors caused by such acoustic resonance may be reduced or eliminated. The resonance based on the length L of the first connector channel portion 659 may be computed differently, as discussed in detail below. Similarly, when a width of the second cavity portion 667 and the width of the first connector channel portion 669 are substantially the same, the second cavity portion 667 and the second connector channel portion 669 also do not form a Helmholtz resonator.

Figure 7:
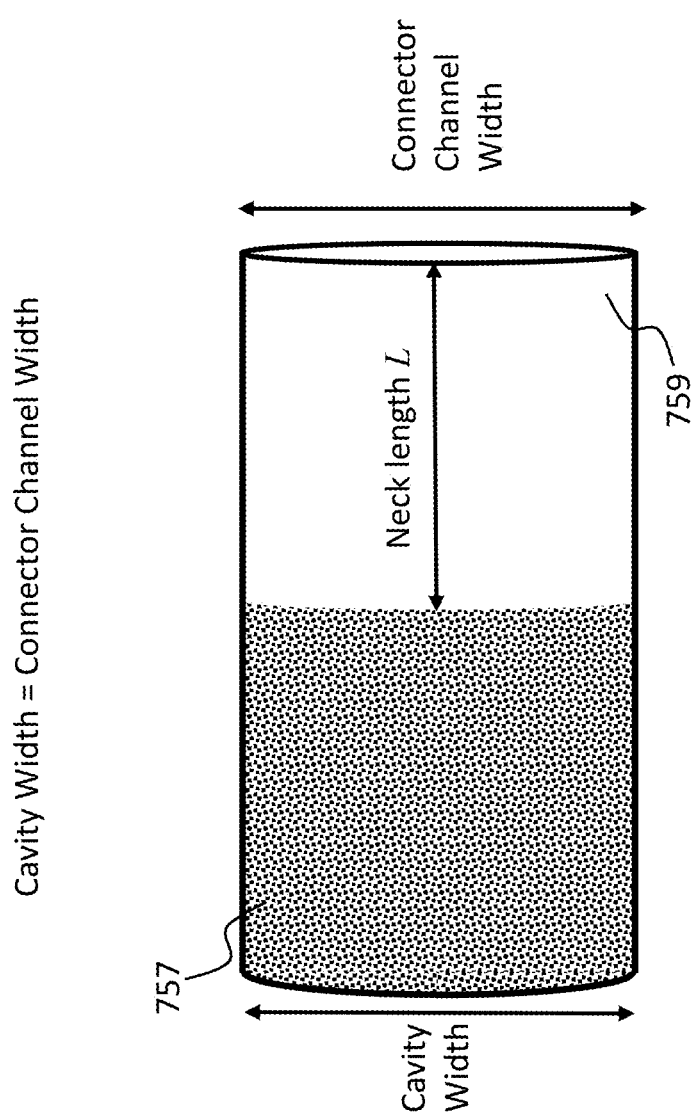
FIG. 7 illustrates calculation of a resonant frequency of sound at a connecting channel between a cavity and a dispense chamber when a width of the cavity and a width of the connecting channel are substantially same, according to an embodiment herein.

FIG. 7 illustrates calculation of a resonant frequency of sound at a connecting channel between a cavity and a dispense chamber when the width of the cavity and the width of the connecting channel are substantially the same. In an embodiment, the first cavity 557 and the first connecting channel 559 of the liquid dispenser 530 in FIG. 5A may have similar structures to the cavity 757 and the connecting channel 759, respectively, of FIG. 7. In an embodiment, the second cavity 567 may have a similar structure to the first cavity 557 and there may be a connecting channel that is connected to the second cavity 567 and similar to the connecting channel 559.

For the embodiment illustrated by FIG. 7, the connecting channel 759 has a neck length L. In an embodiment, a sound generator may be disposed in the cavity 757 and the neck length L may represent a distance between the sound generator and a dispense chamber. Where c represents the speed of sound and n represents the harmonic number, the resonant frequency f at the connecting channel 759 may be calculated based on the following equation.

$$f = \frac{nc}{4L},$$

where n=1, 3, 5, 7, . . . .

For example, as discussed above, the desired frequency range for detecting the tip-liquid contact may be 200 Hz-1 kHz, or preferably 100 Hz-4 kHz. In such an example, the resonant frequency f outside the 100 Hz-4 kHz range is preferred. When the harmonic number is 1 and the resonant frequency f is 4 kHz, the neck length L is approximately 21 mm. Thus, when the harmonic number is 1, the neck length L should be lower than 21 mm to result the resonant frequency f higher than 4 kHz, outside the 100 Hz-4 kHz range. In other words, a smaller neck length L may be preferred to ensure that the resonant frequency f is outside the desired frequency range for detecting the tip-liquid contact.

Figure 8A:
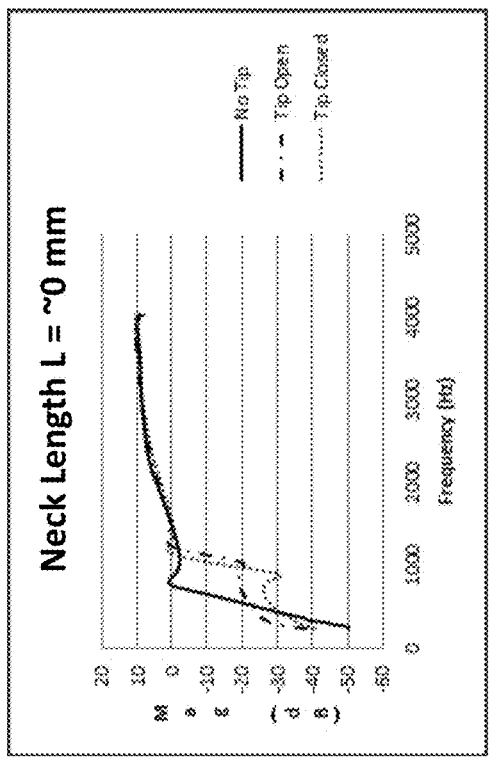
FIG. 8A-8C are diagrams illustrating experimental results based on a liquid dispenser when the width of the cavity and the width of the connecting channel are substantially same, according to an embodiment herein.
Figure 8C:
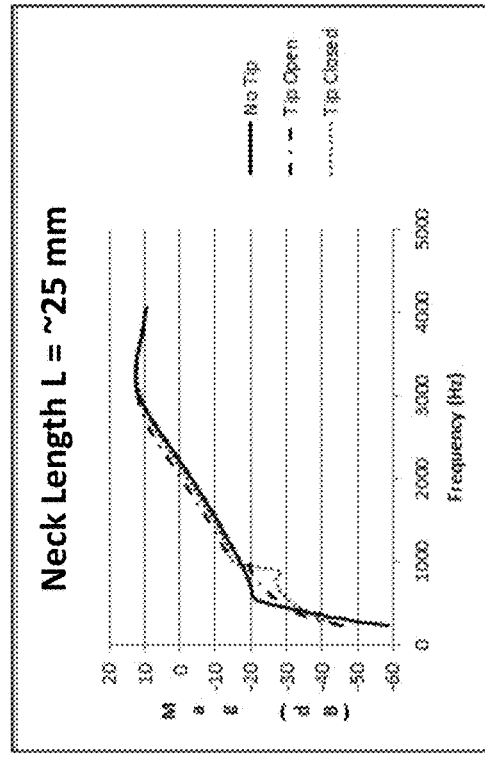
Figure 8B:
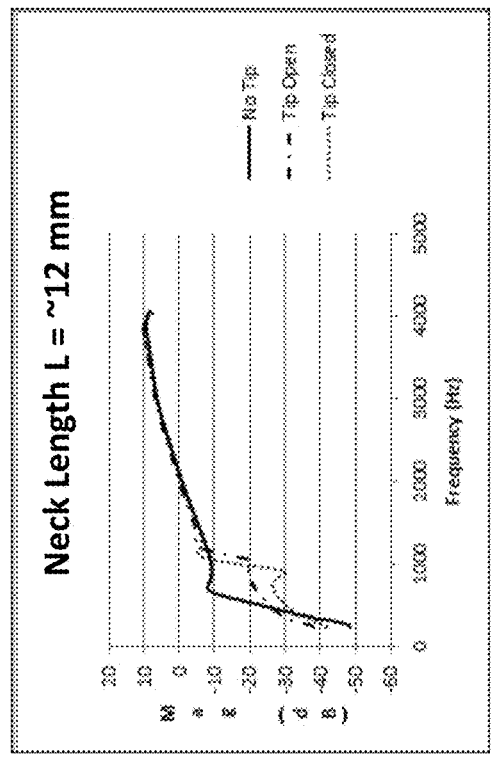

FIG. 8A is a diagram illustrating an experimental acoustic spectrum based on a liquid dispenser with a very short connecting channel or no connecting channel. For the embodiment illustrated by FIG. 8A, when the neck length L of the connecting channel is around 0 mm, a difference in the sound signal magnitude between the "Tip Open" state (before contacting liquid) and the "Tip Closed" state (when contacting the liquid) at around 900 Hz is 11.9 dB. FIG. 8B is a diagram illustrating an experimental result based on a liquid dispenser with a connecting channel having a medium length. FIG. 8B illustrates that, when the neck length L of the connecting channel is around 12 mm, the difference in the sound signal magnitude between the "Tip Open" state (before contacting liquid) and the "Tip Closed" state (when contacting the liquid) at around 900 Hz is 9.35 dB, which is smaller than the difference in the sound signal magnitude observed in FIG. 8A. FIG. 8C is a diagram illustrating an experimental result based on a liquid dispenser with a long connecting channel. FIG. 8C illustrates that, when the neck length L of the connecting channel is around 25 mm, the difference in the sound signal magnitude between the "Tip Open" state (before contacting liquid) and the "Tip Closed" state (when contacting the liquid) at around 900 Hz is 8.3 dB, which is smaller than the difference in the sound signal magnitude observed in FIG. 8A and FIG. 8B.

As discussed above, when the harmonic number is 1, the neck length L should be lower than 21 mm to result in the resonant frequency f higher than 4 kHz, outside the 100 Hz-4 kHz range. Because the neck length L in FIG. 8C is slightly greater than 21 mm, the resonant frequency f may be within the 100 Hz-4 kHz range and may interfere with measurements of the sound signal. Such interferences caused by the 25 mm neck length L may cause a smaller difference in the magnitude between the "Tip Open" state and the "Tip Closed" state than when a neck length L is approximately 0. Because the neck length L in FIG. 8C is much greater than 21 mm, the resonant frequency f is within the 100 Hz-4 kHz range and may interfere with measurements of the sound signal even more than the case illustrated in FIG. 8B. As shown in FIGS. 8A-8C, the detection of the tip-liquid contact degrades as the neck length L increases (e.g., beyond the 21 mm) to the point where the resonant frequency f is within the frequency range for detecting the tip-liquid contact.

In addition, as shown in FIGS. 8A-8C, the sound signal magnitude when a tip is absent (e.g., "No Tip" state) becomes similar to the sound signal magnitude with the tip present (e.g., "Tip Open" state and "Tip Close" state) as the neck length L of the connecting channel increases. Thus, the sound signal magnitude when a tip is absent becomes less distinguishable from the sound signal magnitude with the tip present as the neck length L of the connecting channel increases. In particular, the frequency range for detecting whether the tip is present on the liquid dispenser may be 200 Hz-1 kHz, or preferably 100 Hz-4 kHz. Hence, as the neck length L of the connecting channel increases (e.g., beyond the 21 mm) to the point where the resonant frequency f is within the frequency range for detecting the tip presence, the detection of the tip presence on the liquid dispenser may degrade. Hence, as discussed above, a long neck length L may not be desirable, and reducing or eliminating the side conduits may provide improved results with reduced errors in the tip-liquid contact detection and/or the tip presence detection.

Figure 9A:
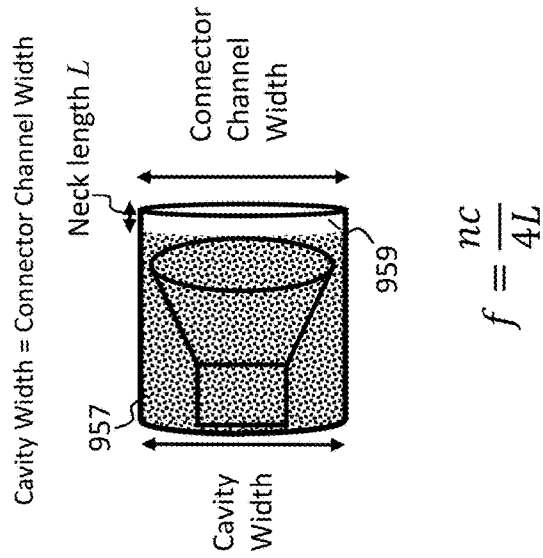
FIG. 9A is an example diagram illustrating a cross-section view of an example liquid dispenser to avoid sound resonance within a frequency range for sensing sound, according to an embodiment herein.
Figure 9A:
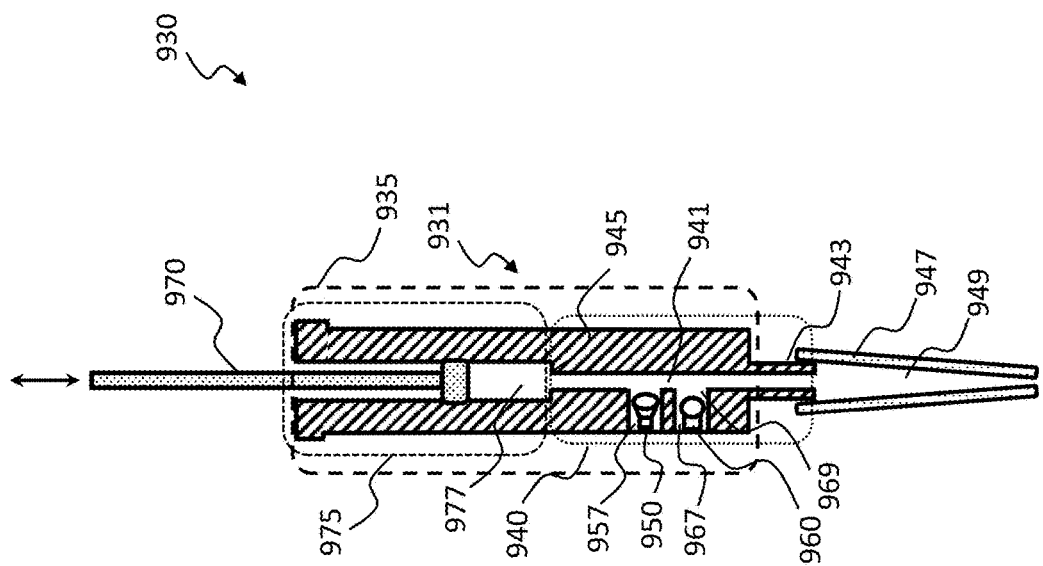

FIG. 9A is an example diagram illustrating a cross-section view of an example liquid dispenser 930 to avoid sound resonance within a frequency range of sound sensed by an acoustic sensor of the liquid dispenser 930, according to an embodiment herein. FIG. 9AA is an example diagram illustrating calculation of a resonant frequency of sound at a connecting channel between a cavity and a dispense chamber, for the embodiment illustrated in FIG. 9A. The example liquid dispenser 930 of FIG. 9A is structured to avoid a Helmholtz resonator structure that may generate the undesirable sound resonance and may not have side conduits. In FIG. 9A, the portions represented by reference numbers 935, 940, 941, 943, 945, 947, 949, 970, 975, and 977 have similar features to the portions represented by the reference numbers 640, 641, 643, 645, 647, 649, 670, 675, and 677, respectively, as discussed above in reference to FIG. 3. Hence, detailed discussions of reference numbers 935, 940, 941, 943, 945, 947, 949, 970, 975, and 977 are omitted.

As shown in FIG. 9A, a sound generator 950 may be positioned within a first cavity portion 957 of the dispense chamber 941 to provide sound to the longitudinal path of the dispense chamber 941. An acoustic sensor 960 may be positioned within a second cavity 967 of the dispense chamber 941 to sense a sound directly from the longitudinal path of the dispense chamber 941. In the example shown in FIG. 9A, the sound generator 950 and the acoustic sensor 960 are located on the same side. The dispenser body 931 of the liquid dispenser 930 may also have a first connector channel portion 959 connecting the first cavity portion 957 to the dispense chamber 941 and thereby defining a first cavity. Because a width of the first cavity portion 957 and the width of the first connector channel portion 959 are substantially the same, the first cavity portion 957 and the first connector channel portion 959 do not form a Helmholtz resonator. Similarly, because a width of the second cavity portion 967 and the width of a second connector channel portion 969 are substantially the same, the second cavity portion 967 and the second connector channel portion 969 do not form a Helmholtz resonator. Therefore, Helmholtz resonance does not exist in the liquid dispenser 930 and thus errors caused by such acoustic resonance may be reduced or eliminated.

The resonant frequency formed by the cavities (e.g., first cavity portion 957 and the second cavity portion 967) may be calculated based on the equation, $$f = \frac{nc}{4L},$$

as discussed above. Because the neck length L in FIG. 9A is close to zero, the resulting resonant frequency f at the connector channel 959 is very high. For example, if the harmonic number is 1 and the neck length L is 1 mm, the resonant frequency /is 85.75 kHz, which is much greater than the frequency range (e.g., 100 Hz-4 kHz) for detecting the tip-liquid contact. Therefore, a shorter neck length L is preferred to ensure that the resonant frequency f is outside the frequency range for detecting the tip-liquid contact.

Figure 10A:
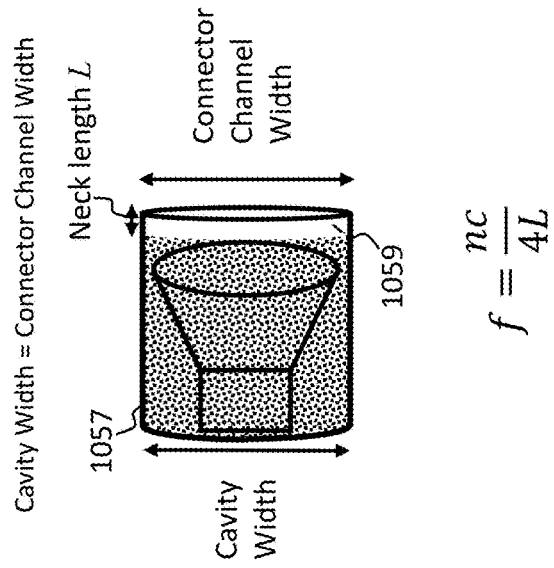
FIG. 10A is an example diagram illustrating a cross-section view of an example liquid dispenser to avoid sound resonance within a frequency range for sensing sound, according to an embodiment herein.
Figure 10A:
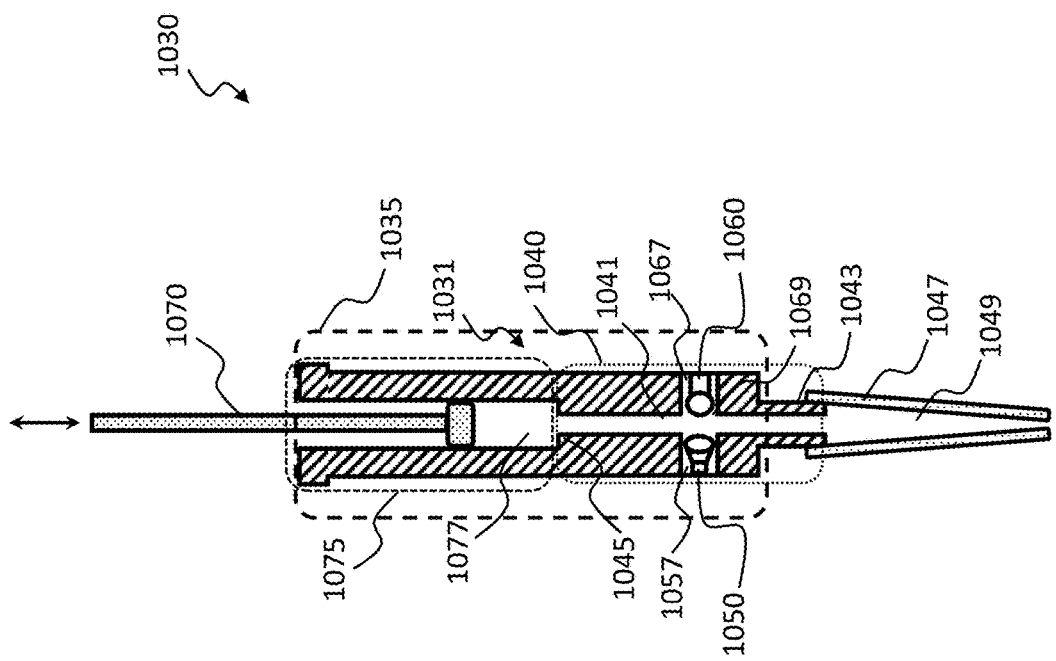

FIG. 10A is an example diagram illustrating a cross-section view of an example liquid dispenser 1030 to avoid sound resonance within a frequency range of sound sensed by an acoustic sensor of the liquid dispenser 1030, according to an embodiment herein. FIG. 10AA is an example diagram illustrating calculation of a resonant frequency of sound at a connecting channel between a cavity and a dispense chamber, for the embodiment illustrated in FIG. 10A. The example liquid dispenser 1030 of FIG. 10A is structured to avoid a Helmholtz resonator structure that may generate the undesirable sound resonance and may not have side conduits. In FIG. 10A, the portions represented by reference numbers 1035, 1040, 1041, 1043, 1045, 1047, 10410, 1070, 1075, and 1077 have similar features to the portions represented by the reference numbers 640, 641, 643, 645, 647, 6410, 670, 675, and 677, respectively, as discussed above in reference to FIG. 6. Hence, detailed discussions of reference numbers 1035, 1040, 1041, 1043, 1045, 1047, 1049, 1070, 1075, and 1077 are omitted.

As shown in FIG. 10A, a sound generator 1050 may be positioned within a first cavity having a first cavity portion 1057 and a first connector channel portion 1059 of the dispense chamber 1041 to provide sound to the longitudinal path of the dispense chamber 1041. An acoustic sensor 1060 may be positioned within a second cavity having a second cavity portion 1067 and a second connector channel portion 1069 of the dispense chamber 1041 to sense a sound directly from the longitudinal path of the dispense chamber 1041. In the example shown in FIG. 10A, the sound generator 1050 and the acoustic sensor 1060 are located on opposite sides. The first connector channel portion 1059 connects the first cavity portion 1057 to the dispense chamber 1041. Because a width of the first cavity portion 1057 and the width of the first connector channel portion 1059 are substantially the same, the first cavity portion 1057 and the first connector channel portion 1059 do not form a Helmholtz resonator. Similarly, because a width of the second cavity portion 1067 and the width of a second connector channel portion 1069 are substantially the same, the second cavity portion 1067 and the second connector channel portion 1069 do not form a Helmholtz resonator. Therefore, Helmholtz resonance does not exist in the liquid dispenser 1030 and thus errors caused by such acoustic resonance may be reduced or eliminated.

The resonant frequency formed by the cavities (e.g., the first cavity portion 1057 and the second cavity portion 1067) may be calculated based on the equation, $$f = \frac{nc}{4L},$$

as discussed above. Because the neck length L in FIG. 10A is close to zero, the resulting resonant frequency f at the connector channel portion 1059 is very high, which is a similar result to FIG. 9A. For example, if the harmonic number is 1 and the neck length L is 1 mm, the resonant frequency f is 85.75 kHz, which is much greater than the frequency range (e.g., 100 Hz-4 kHz) for detecting the tip liquid contact.

Figure 11A:
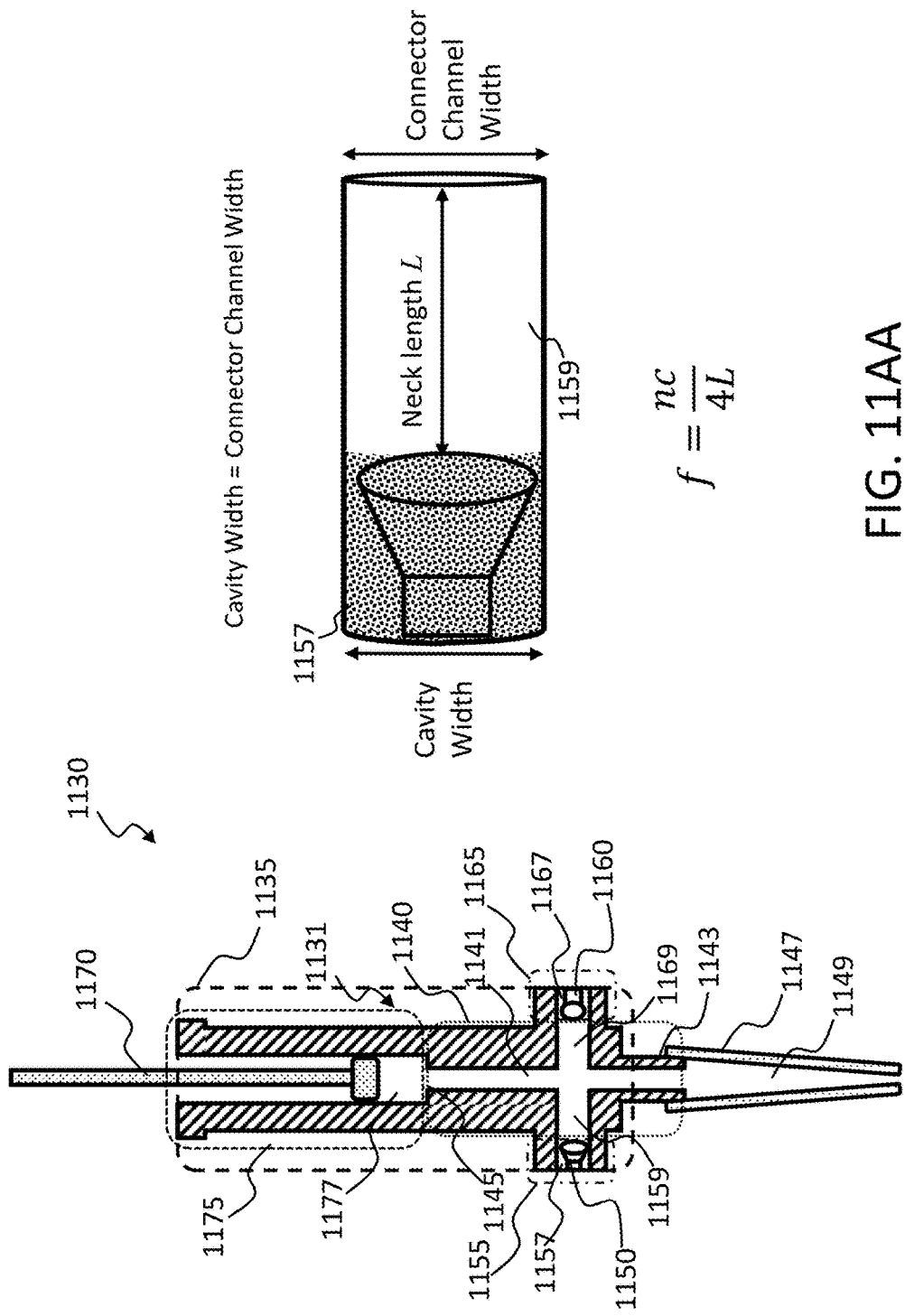
FIG. 11A is an example diagram illustrating a cross-section view of an example liquid dispenser with short side conduits that are structured to avoid sound resonance within a frequency range for sensing sound, according to an embodiment herein.

FIG. 11A is an example diagram illustrating a cross-section view of an example liquid dispenser 1130 with side conduits that are structured to avoid sound resonance within a frequency range of sound sensed by an acoustic sensor of the liquid dispenser, according to an embodiment herein. FIG. 11AA is an example diagram illustrating calculation of a resonant frequency of sound at a connecting channel between a cavity and a dispense chamber, for the embodiment illustrated in FIG. 11A. In FIG. 11A, the portions represented by reference numbers 1135, 1140, 1141, 1143, 1145, 1147, 1149, 1170, 1175, and 1177 have similar features to the portions represented by the reference numbers 340, 341, 343, 345, 347, 349, 370, 375, and 377, respectively, as discussed above in reference to FIG. 3. Hence, detailed discussions of reference numbers 1135, 1140, 1141, 1143, 1145, 1147, 1149, 1170, 1175, and 1177 are omitted.

For the embodiment illustrated by FIG. 11A, the liquid dispenser 1130 has a dispenser body 1131 including a first side conduit 1155 having a first cavity having a first cavity portion 1157 and a first connector channel portion 1159 connecting the first cavity portion 1157 to the dispense chamber 1141. A sound generator 1150 may be disposed within the first cavity portion 1157 and may generate a sound to induce acoustic resonance within the dispense chamber 1141. The dispenser body 1131 includes a second side conduit 1165 having a second cavity with a second cavity portion 1167 and a second connector channel portion 1169 connecting the second cavity portion 1167 to the dispense chamber 1141. An acoustic sensor 1160 may be disposed within the second cavity portion 1167 and may sense sound within the dispense chamber 1141. For the embodiment illustrated by FIG. 11A, the widths of the first and second connector channel portions 1159 and 1169 are substantially same as the width of the first and second cavities cavity portions 1157 and 1167, respectively. Therefore, the first cavity portion 1157 and the first connector channel portion 1159 do not form a Helmholtz resonator, and the second cavity portion 1167 and the second connector channel portion 1169 also do not form a Helmholtz resonator. The arrangements of the sound generator 1150 and the acoustic sensor 1160 and the number of side conduits implemented may not be limited to the example shown in FIG. 11A. For instance, in another example, the sound generator and the acoustic sensor may be disposed within a single side conduit.

The resonant frequency formed by the cavities (e.g., the first cavity portion 1157 and the second cavity portion 1167) may be calculated based on the equation, $$f = \frac{nc}{4L},$$

as discussed above. Although the neck length L in FIG. 10A is long, the neck length L may be selected such that the resulting resonant frequency f at the first connector channel 1159 may be outside the frequency range (e.g., 100 Hz-4 kHz) for detecting the tip-liquid contact. For example, as discussed above, if the harmonic number is 1, the resonant frequency f is greater than 4 kHz as long as the neck length L is less than 21 mm. In such an example, as long as the neck length L is less than 21 mm, the resonant frequency f will be greater than the frequency range for detecting the tip-liquid contact and may cause little or no error.

Figure 12:
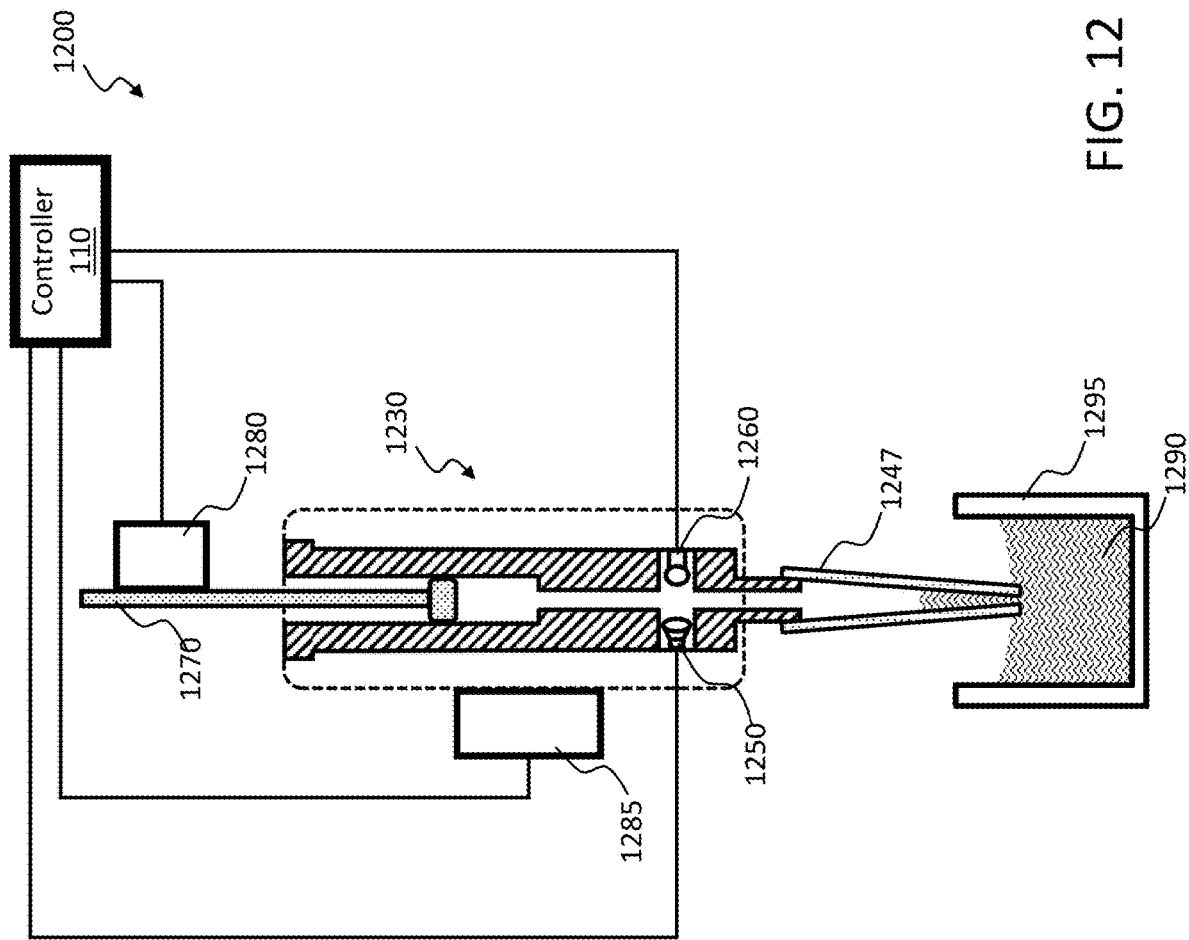
FIG. 12 is an example diagram illustrating a liquid dispenser system with a cross-section view of a liquid dispenser, according to an embodiment herein.

FIG. 12 is an example diagram illustrating a liquid dispenser system 1200 with a cross-section view of a liquid dispenser, according to an embodiment herein. The liquid dispenser system 1200 includes a liquid dispenser 1230 controlled by the controller 110. The liquid dispenser 1230 illustrated in FIG. 12 has a similar structure to the liquid dispenser 1030 of FIG. 10A, and thus the details about the structure of the liquid dispenser 1230 are similar to the details about the structure of the liquid dispenser 1030 discussed above. Although FIG. 12 shows that the liquid dispenser 1230 has a structure similar to the structure of the liquid dispenser 1030, the structure of the liquid dispenser 1230 is not limited to the structure of the liquid dispenser 1030 and another type of liquid dispenser, such as the liquid dispenser 530 of FIG. 5A or the liquid dispenser 630 of FIG. 6 or the liquid dispenser 930 of FIG. 9A or the liquid dispenser 1130 of FIG. 11A, may be used as the liquid dispenser 1230. The liquid dispenser system 1200 further includes a liquid dispenser transporter 1285 configured to move the liquid dispenser 1230 and a piston mover 1280 configured to move a piston 1270 of the liquid dispenser 1230. For example, when the controller 110 may control the liquid dispenser transporter 1285 to move the liquid dispenser 1230 toward a liquid 1290 stored in a reservoir 1295. The controller 110 may control a sound generator 1250 to generate sound and may utilize an acoustic sensor 1260 to sense sound within a dispense chamber of the liquid dispenser 1230. When the controller 110 determines that a contact of a dispensing tip 1247 with the liquid 1290 has occurred based on the sensed sound, then the controller 110 may control the liquid dispenser transporter 1285 to stop moving the liquid dispenser 1230, and the controller 110 may control the piston mover 1280 to move the piston 1270 and draw in liquid into the dispensing tip 1247. As discussed above, the detection of the tip-liquid contact by the liquid dispenser system 1200 is improved using embodiments such as the liquid dispenser 530, the liquid dispenser 630, the liquid dispenser 930, the liquid dispenser 1030, and the liquid dispenser 1130.

According to an aspect of the disclosure, an acoustic filter may be implemented between the dispense chamber of the liquid dispenser and the piston chamber of the liquid dispenser, where the acoustic filter is configured to decouple the dispense chamber from the piston chamber. As discussed above, the movement of the piston may cause additional noise or changes in acoustic properties within the dispense chamber that may affect the sound sensed by the acoustic sensor. For example, any noise such as noise from a motor moving the piston or noise from the piston moving within the piston chamber may adversely affect the detection of the tip-liquid contact and/or liquid volume sensing. Further, the piston may define an enclosed portion of the piston chamber, where the enclosed portion is a piston chamber portion enclosed by the piston and connected to the dispense chamber. A volume of the enclosed portion of the piston chamber may change based on the movement of the piston because a position of the piston within the piston chamber may define the volume of the enclosed portion. The change in the volume of the enclosed portion may also affect the sound sensed by the acoustic sensor. By implementing an acoustic filter that can acoustically decouple the dispense chamber from the piston chamber, errors caused by the movement of the piston may be reduced or eliminated.

The acoustic filter disposed between the piston chamber and the dispense chamber should be configured to allow air to move between the piston chamber and the dispense chamber. In an embodiment, the acoustic filter may be a sound-absorbent filter configured to muffle sound from the piston chamber (e.g., noise from the piston movement). The acoustic filter that is a sound-absorbent filter may be made of an air-permeable material such that air may pass through the acoustic filter between the piston chamber and the dispense chamber. The sound-absorbent filter may be made of an open-cell foam material (e.g., polyurethane) or a fibrous material (e.g., glass wool) or a porous material.

In an embodiment, the acoustic filter may be a sound-reflective filter that is structured to isolate the length of the air column resonance of the dispense chamber from the length of the air column resonance of the piston chamber, where the length of the air column resonance of the piston chamber changes due to the piston movement. The sound-reflective filter may not be air-permeable. Hence, if the sound-reflective filter is used as the acoustic filter, an air passage is also implemented with the acoustic filter such that air may pass between the piston chamber and the dispense chamber via the air passage. In an embodiment, the sound-reflective filter may be made of closed-cell foam (e.g., polyethylene) with an air passage such that air may pass through the acoustic filter between the piston chamber and the dispense chamber via the air passage. In one embodiment, the foam can be configured to a thickness wherein it can be compressively fitted into the piston chamber without impeding the passage of air during the piston's movement. In an embodiment, the sound-reflective filter may be made from a flexible material. In such an aspect, an air passage can be formed as a result of the sound-reflective filter changing in shape (e.g., shrinking) due to the pressure difference induced by the piston movement.

Figure 13:
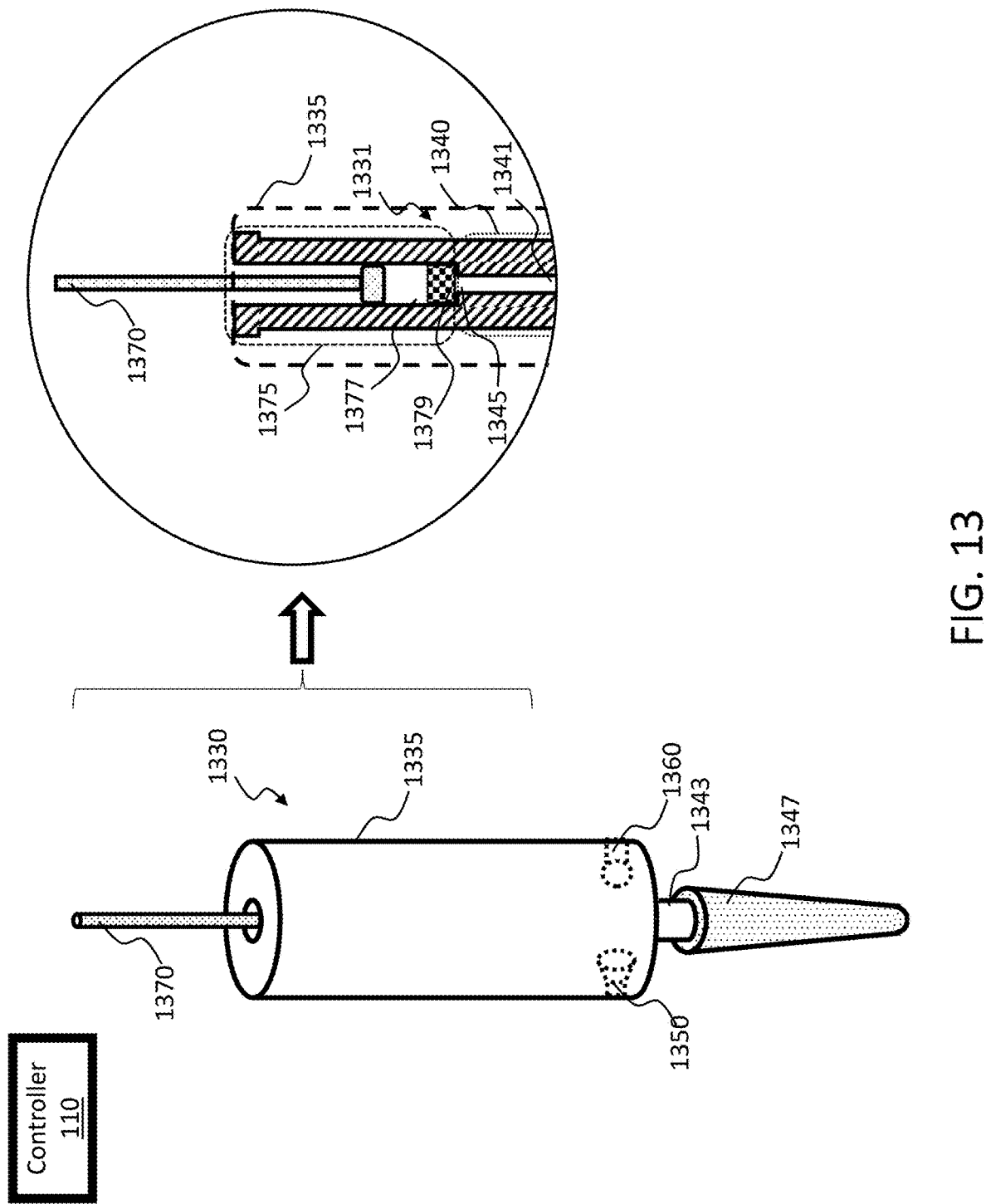
FIG. 13 is an example diagram illustrating an example acoustic filter implemented within a liquid dispenser, according to an embodiment herein.

FIG. 13 is an example diagram illustrating an example acoustic filter implemented within a liquid dispenser, according to an embodiment herein. FIG. 13 shows a liquid dispenser 1330 controlled by the controller 110. The liquid dispenser 1330 may be similar to the liquid dispenser 230 of FIG. 2. The liquid dispenser 1330 may include a dispenser body 1331 that includes a dispense chamber portion 1340 having a dispense chamber 1341 and a piston chamber portion 1375 having a piston chamber 1377. The dispense chamber 1341 has a first opening at a first portion 1343 of the dispense chamber portion 1340 and a second opening at a second portion 1345 of the dispense chamber portion 1340. The piston chamber 1377 is connected to the dispense chamber 1341 via the second opening of the second portion 1345. The dispenser body 1331 may be included within a housing 1335, which may be an optional structure. The liquid dispenser 1330 further includes a piston 1370 that is received and guided by the piston chamber 1375. The first portion 1343 is configured to couple with a dispensing tip, such as a dispensing tip 1347. The dispensing tip 1347 may be permanently attached to the first portion 1343 or may be removably attached to the first portion 1343.

For the embodiment illustrated by FIG. 13, an acoustic filter 1379 is disposed between the piston chamber 1377 and the dispense chamber 1341. In an embodiment, the acoustic filter 1379 may be configured such that the acoustic filter 1379 may acoustically decouple the dispense chamber 1341 from the piston chamber 1377. Further, the acoustic filter 1379 may be configured such that air may pass between the piston chamber 1377 and the dispense chamber 1341 (e.g., having a coarse surface texture), to allow the movement of the piston 1370 to draw or dispense liquid.

Figures 14A, 14B:
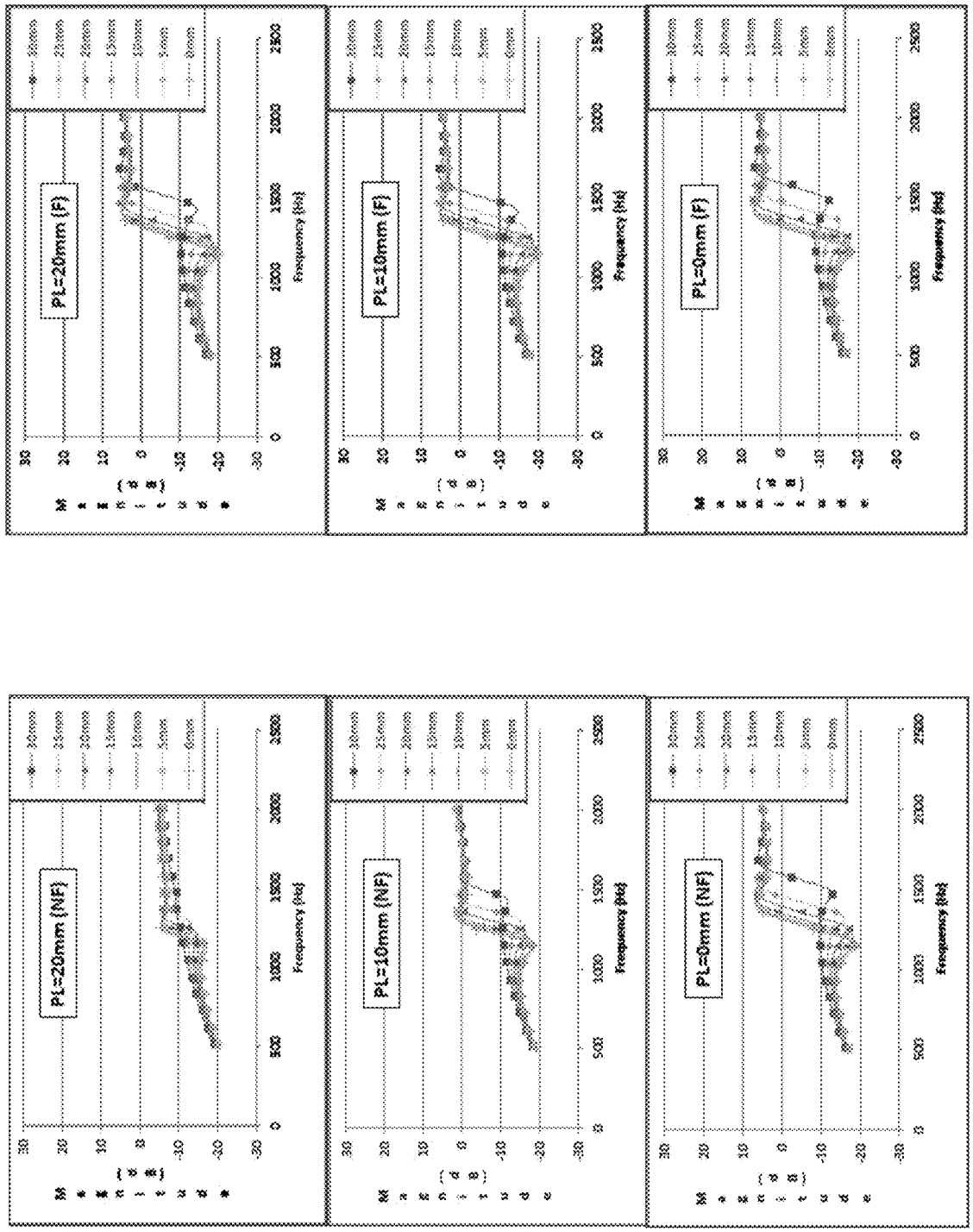
FIG. 14A is an example diagram illustrating plots showing a frequency spectrum of the sound signal at various piston locations within a piston chamber and different liquid levels inside a dispenser tip, according to an embodiment without an acoustic filter.
FIG. 14B is an example diagram illustrating plots showing a frequency spectrum of the sound signal at various piston locations within a piston chamber and different liquid levels inside a dispenser tip, according to an embodiment with an acoustic filter.

In an embodiment, the acoustic filter 1379 may substantially improve a result of liquid volume sensing, where the liquid volume is sensed based on sound sensed by an acoustic sensor. FIG. 14A is an example diagram illustrating plots showing a frequency spectrum of the sound signal at various piston locations (PLs) within a piston chamber and different liquid levels inside a dispenser tip, according to an embodiment without an acoustic filter. FIG. 14B is an example diagram illustrating plots showing a frequency spectrum of the sound signal at various piston locations (PLs) within a piston chamber and different liquid levels inside a dispenser tip, according to an embodiment with an acoustic filter. For the embodiment illustrated by FIG. 14A, when the acoustic filter is not implemented, the frequency spectrum changes significantly based on the piston location. As discussed above, the change in the frequency spectrum based on the piston location is due to the change of the volume of the enclosed portion in the piston chamber. On the other hand, for the embodiment illustrated by FIG. 14B, when the acoustic filter is implemented, the piston locations have little effect on the frequency spectrum. Thus, the implementation of the acoustic filter may reduce or eliminate the effect of the piston location on the acoustic spectrum with regard to liquid volume sensing.

Figure 15B:
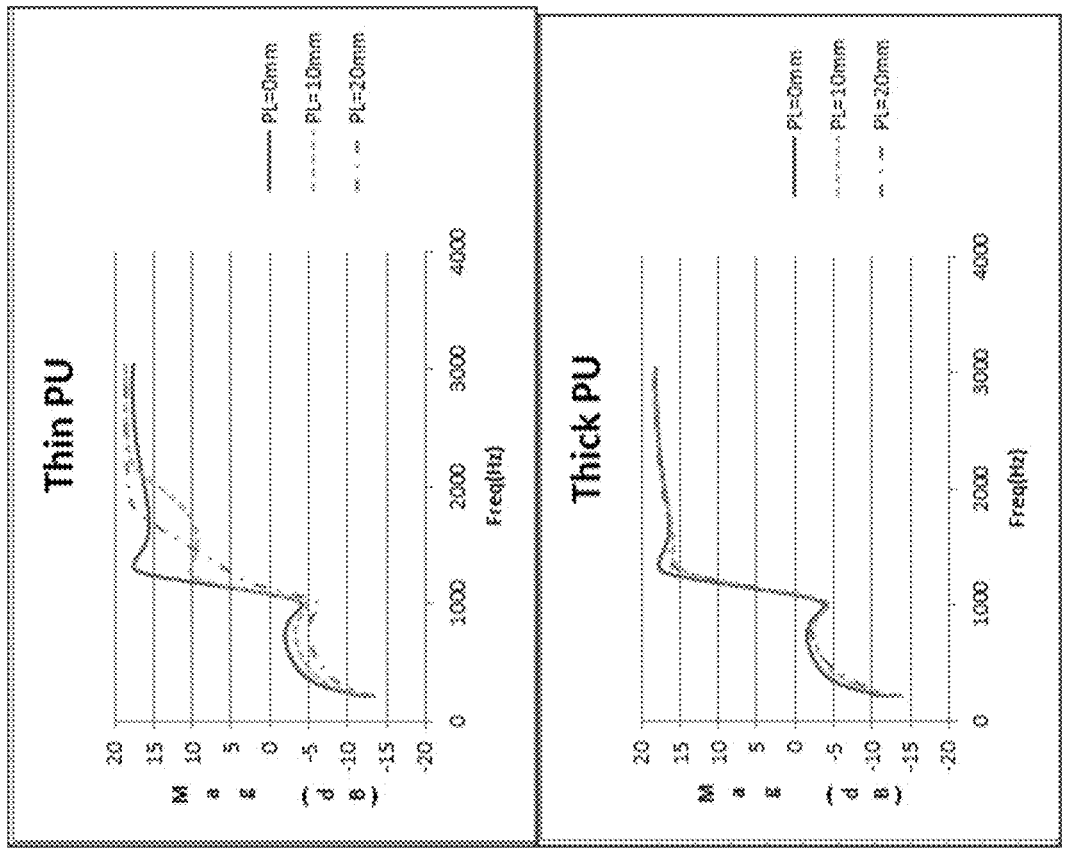
FIG. 15B is an example diagram illustrating acoustic spectrums at different thicknesses of an acoustic filter when the acoustic filter is made of polyurethane (PU).
Figure 15A:
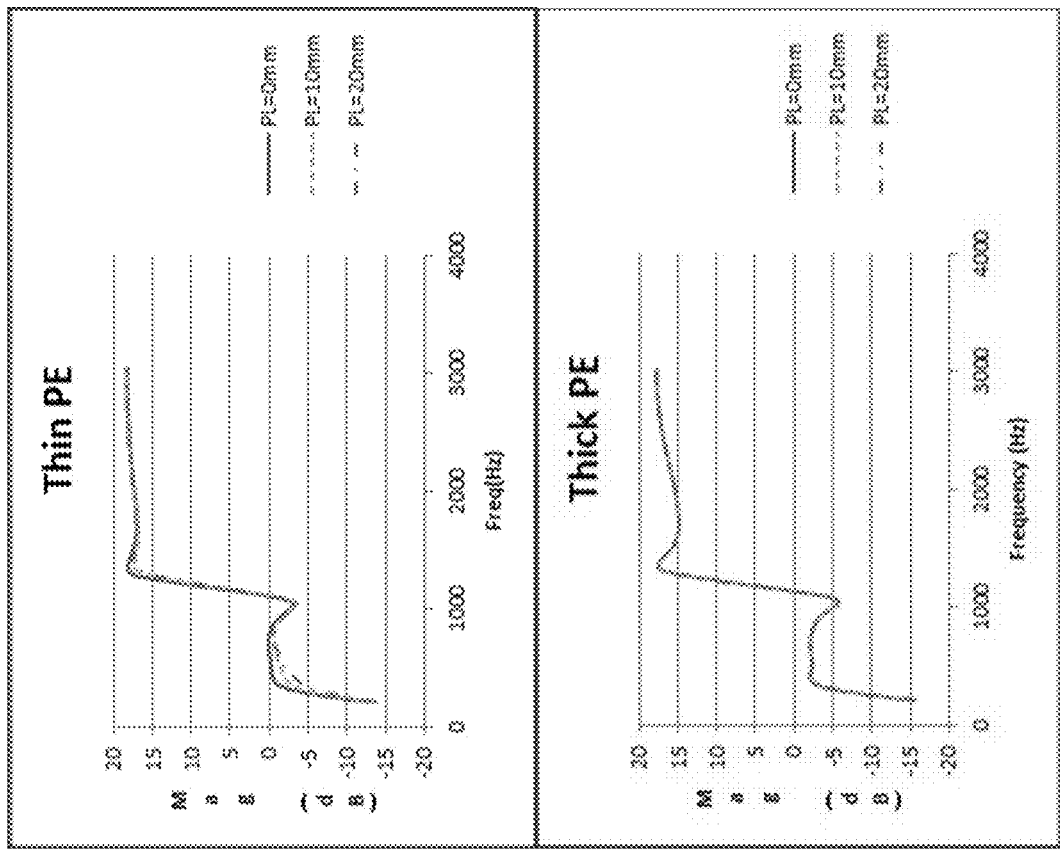
FIG. 15A is an example diagram illustrating acoustic spectrums at different thicknesses of an acoustic filter when the acoustic filter is made of polyethylene (PE).

In an embodiment, a type of the acoustic filter may have different effects. As discussed above, the acoustic filter may be a closed-cell filter or an open-cell filter. In some instances, the closed-cell filter (e.g., made of polyethylene) may provide more benefits than the open-cell filter (e.g., made of polyurethane). FIG. 15A is an example diagram illustrating acoustic spectrums at different thicknesses of an acoustic filter when the acoustic filter is made of polyethylene (PE). For the embodiment illustrated by FIG. 15A, the piston location has little effect on the acoustic spectrum, regardless of whether the acoustic filter is thin (e.g., 5 mm) or thick (e.g., 10 mm). FIG. 15B is an example diagram illustrating acoustic spectrums at different thicknesses of an acoustic filter when the acoustic filter is made of polyurethane (PU). For the embodiment illustrated by FIG. 15B, the piston location has some effect on the acoustic spectrum when the acoustic filter is thick (e.g., 10 mm) and the piston location a greater effect on the acoustic spectrum when the acoustic filter is thin (e.g., 5 mm). Therefore, for the embodiment illustrated by FIGS. 15A and 15B, for some instances, utilizing a closed-cell filter as the acoustic filter may be preferred.

Because the acoustic filter implemented between the dispense chamber and the piston chamber acoustically decouples the dispense chamber from the piston chamber, the changes in the volume of the enclosed portion of the piston chamber has little or no effect on the frequency of the sound sensed by the acoustic sensor. The acoustic resonant frequency changes with changes in the air column length. When the acoustic filter is implemented, the resonant frequency of the sound sensed by the acoustic sensor depends on the air column length in the dispense chamber and the dispensing tip. The air column length in the dispense chamber and the dispensing tip changes based on the volume of the liquid inside the dispensing tip. Therefore, the volume of the liquid inside the dispensing tip may be estimated based on the resonant frequency of the sound sensed by the acoustic sensor. The frequency-volume correlation may be established via a look-up table. For example, the look-up table may indicate a one-to-one relationship between the measured resonance frequencies and the liquid volumes for a given type of a dispensing tip (e.g., a 350 µl dispensing tip or a 1000 µl dispensing tip). Further, there may be instances where the dispensing tip may not be correctly coupled with the liquid dispenser. In such instances, the frequency of the sound sensed may be different from the frequency of the sound sensed when the dispensing tip is correctly coupled with the liquid dispenser. By monitoring the frequency of the sound, the controller 110 may determine whether the dispensing tip is properly coupled with the liquid dispenser.

In some embodiments, by monitoring the resonant frequencies and the magnitudes of the sound within the dispense chamber, the controller 110 may determine which types of the dispensing tips are coupled with the liquid dispenser, and/or no tips are coupled.

Figure 16B:
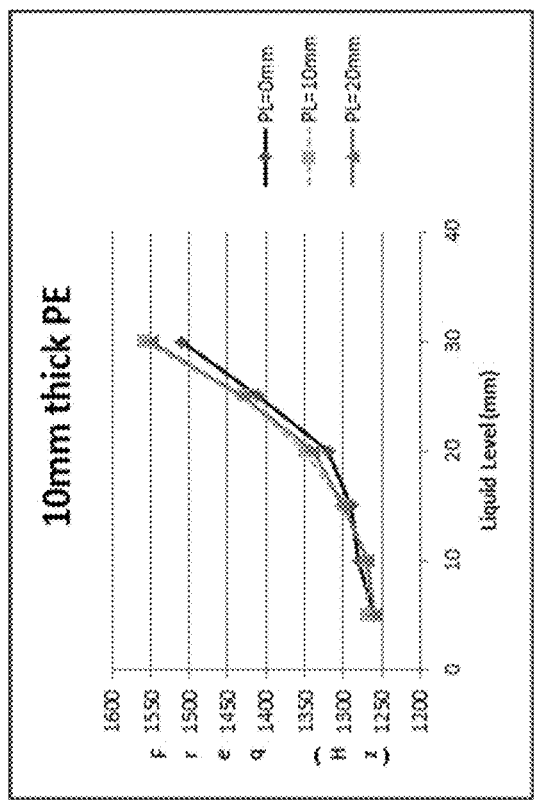
FIG. 16B is an example diagram illustrating that different liquid levels in a dispensing tip corresponds to a different frequency, when a thickness of the acoustic filter is 10 mm.
Figure 16A:
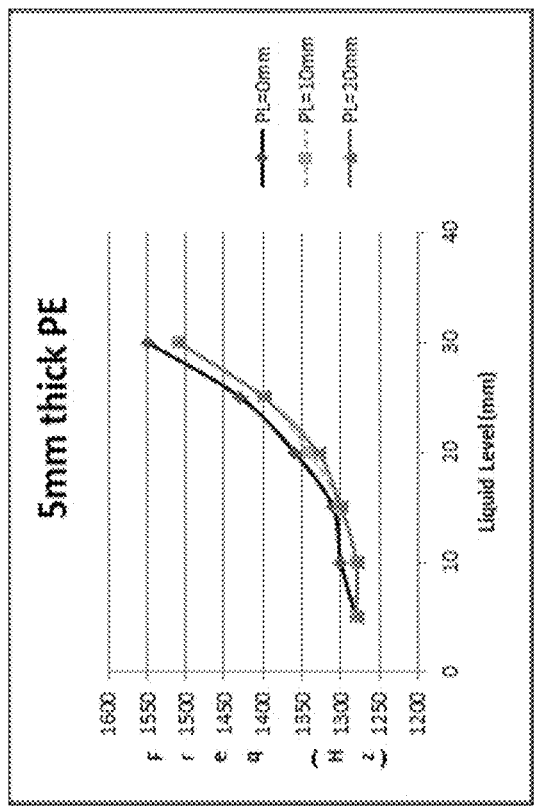
FIG. 16A is an example diagram illustrating that different liquid levels in a dispensing tip corresponds to a different frequency, when a thickness of the acoustic filter is 5 mm.

FIG. 16A is an example diagram illustrating that different liquid levels in the dispensing tip correspond to different frequencies, when the thickness of the acoustic filter is 5 mm. FIG. 16B is an example diagram illustrating that different liquid levels in the dispensing tip correspond to different frequencies, when the thickness of the acoustic filter is 10 mm. Both FIG. 16A and FIG. 16B illustrate that the frequency increases as the liquid level in the dispensing tip increases. FIG. 16B shows that the thicker acoustic filter provides somewhat more consistent results regardless of the piston location.

In addition, because the sound sensed may change based on the volume changes inside the dispensing tip, different types of dispensing tips may be identified based on the sound sensed by the acoustic sensor. For example, an array of frequency spectrums of sound with respect to various types of dispensing tips may be included in multiple look-up tables. As such, the controller 110 may be able to identify the type of the dispensing tip if the measured spectrum finds a match in the spectrums stored in a corresponding look-up table.

Figure 17:
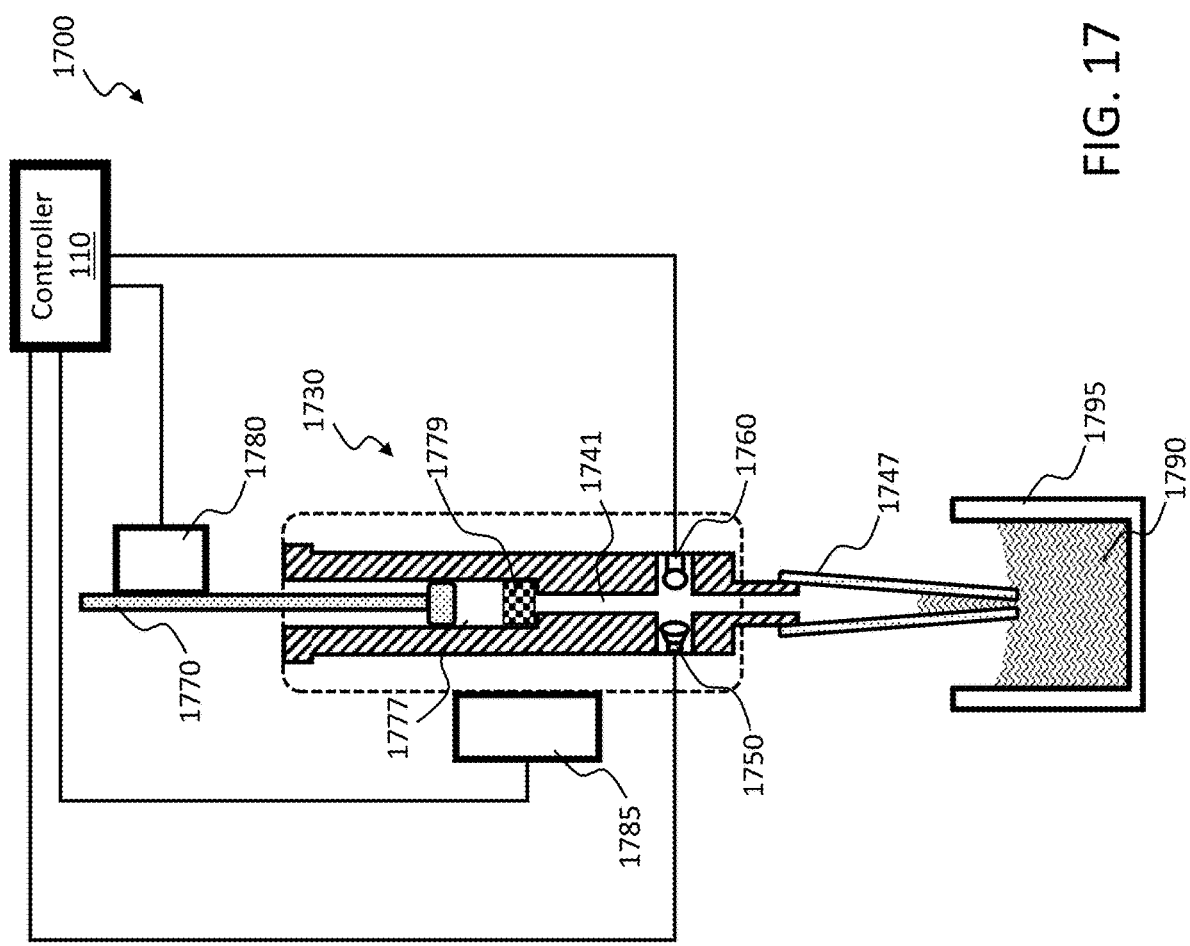
FIG. 17 is an example diagram illustrating a liquid dispenser system with a cross-section view of a liquid dispenser with an acoustic filter, according to an embodiment herein.

FIG. 17 is an example diagram illustrating a liquid dispenser system 1700 with a cross-section view of a liquid dispenser, according to an embodiment herein. The liquid dispenser system 1700 includes a liquid dispenser 1730 controlled by the controller 110. The liquid dispenser 1730 includes an acoustic filter 1779 disposed between the dispense chamber 1741 and the piston chamber 1777. Except for the acoustic filter 1779, the liquid dispenser 1730 illustrated in FIG. 17 has a similar structure to the liquid dispenser 1030 of FIG. 10A, and thus the details about the structure of the liquid dispenser 1730 are similar to the details about the structure of the liquid dispenser 530 discussed above. Although FIG. 17 shows that the liquid dispenser 1730 has a structure similar to the structure of the liquid dispenser 530 with the implementation of the acoustic filter 1779, the structure of the liquid dispenser 1730 is not limited to the structure of the liquid dispenser 530 and another type of liquid dispenser such as the liquid dispenser 530 of FIG. 5A or the liquid dispenser 630 of FIG. 6 or the liquid dispenser 930 of FIG. 9A or the liquid dispenser 1130 of FIG. 11A may be used as the liquid dispenser 1730 with the implementation of the acoustic filter 1779. The liquid dispenser system 1700 further includes a liquid dispenser transporter 1785 configured to move the liquid dispenser 1730 and a piston mover 1780 configured to move a piston 1770 of the liquid dispenser 1730. For example, when the controller 110 may control the liquid dispenser transporter 1785 to move the liquid dispenser 1730 toward liquid 1790 stored in a reservoir 1795. The controller 110 may control a sound generator 1750 to generate sound and may utilize an acoustic sensor 1760 to sense sound within the dispense chamber 1741 of the liquid dispenser 1730. When the controller 110 determines that a contact of a dispensing tip 1747 with the liquid 1790 has occurred based on the sensed sound, then the controller 110 may control the liquid dispenser transporter 285 to stop the motion of the liquid dispenser 1730 and the controller 110 may control the piston mover 1780 to move the piston 1770 and draw in liquid into the dispensing tip 1747. As discussed above, because the acoustic filter 1779 acoustically decouples the dispense chamber 1741 from the piston chamber 1777, the movement of the piston 1770 has little or no effect on the sound sensed by the acoustic sensor 1760.

According to another aspect, an improved way to process the sound sensed by the acoustic sensor is desired for accurate detection of the tip-liquid contact. As discussed above, detecting the tip-liquid contact based on the changes in the amplitude/phase or the acoustic impedance of the sensed sound may be subject to undesirable errors (e.g., due to ambient noise or another anomaly that creates an error event). For example, the detection of the tip-liquid contact based on the amplitude/phase or the acoustic impedance generally suffers from a false positive error, where the rate of the false positive error increases with increase in the background acoustic noise.

Figure 18:
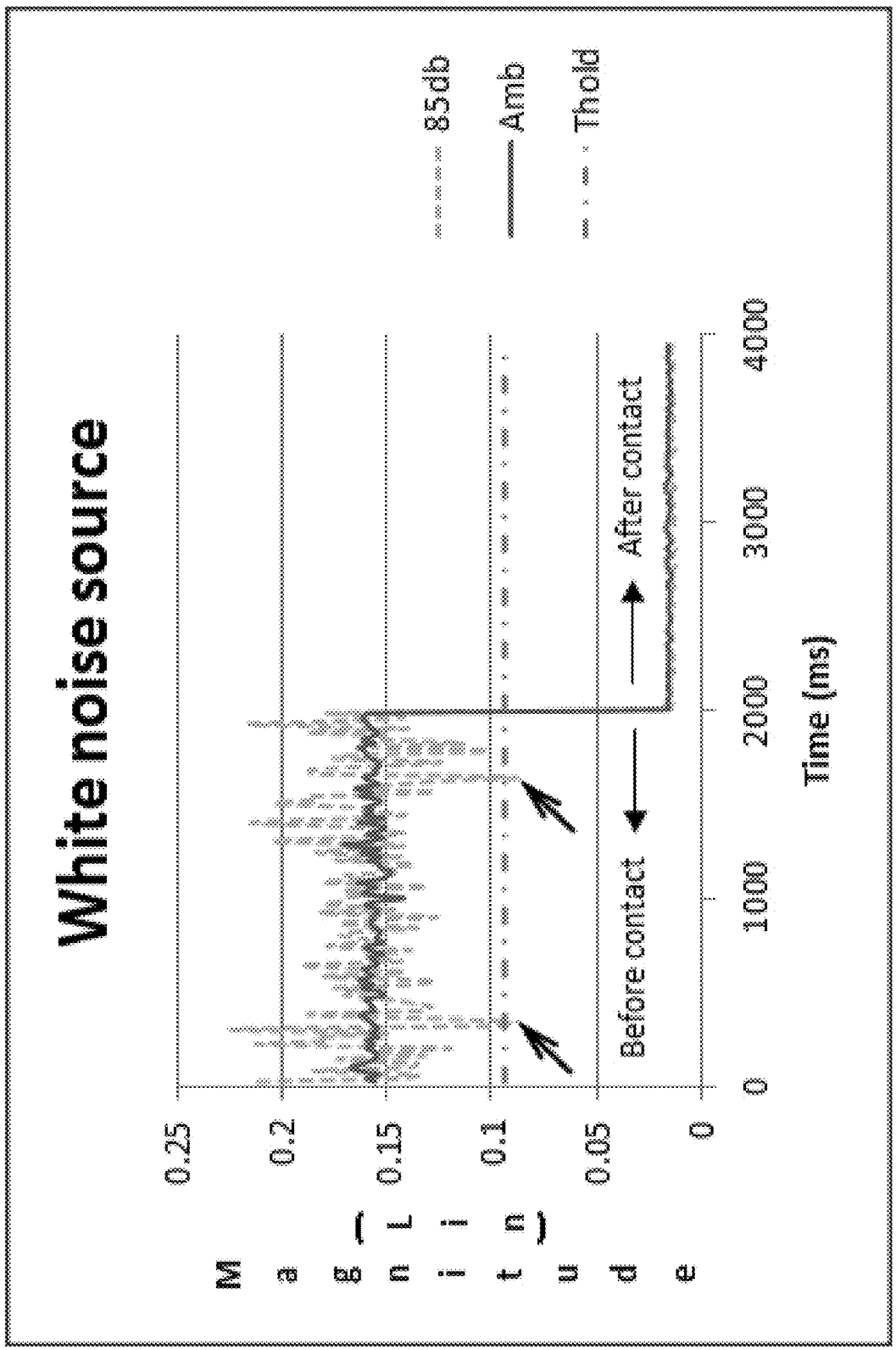
FIG. 18 is an example diagram illustrating false positive errors due to white noise when an amplitude of a sound is used to detect a tip-liquid contact.

FIG. 18 is an example diagram illustrating false positive errors due to white noise when the amplitude of the sound is used to detect the tip-liquid contact. The diagram in FIG. 18 shows experimental results in a graph of the sound amplitude over time. The dashed-dotted line in the graph indicates an amplitude threshold for determining whether the tip-liquid contact has occurred. In this experiment, the actual tip-liquid contact occurred at 2000 msec. As illustrated by the solid line in FIG. 18, when only ambient noise (e.g., ambient noise of 65 dBc) is present in the background, the magnitude of the sound amplitude crosses the amplitude threshold only around 2000 msec, and thus the controller 110 detects the tip-liquid contact only at 2000 msec. On the other hand, as illustrated by the dashed line in FIG. 18, when white noise (e.g., white noise of 85 dBC) is present in the background, the sound amplitude appears noisy and the sound amplitude crosses the amplitude threshold twice before crossing the threshold again at the 2000 msec mark, as shown by the arrows. Therefore, the diagram of FIG. 18 illustrates the increase in false positive errors as the background acoustic noise is increased when the sound amplitude at a single frequency is used to detect the tip-liquid contact.

Figure 19:
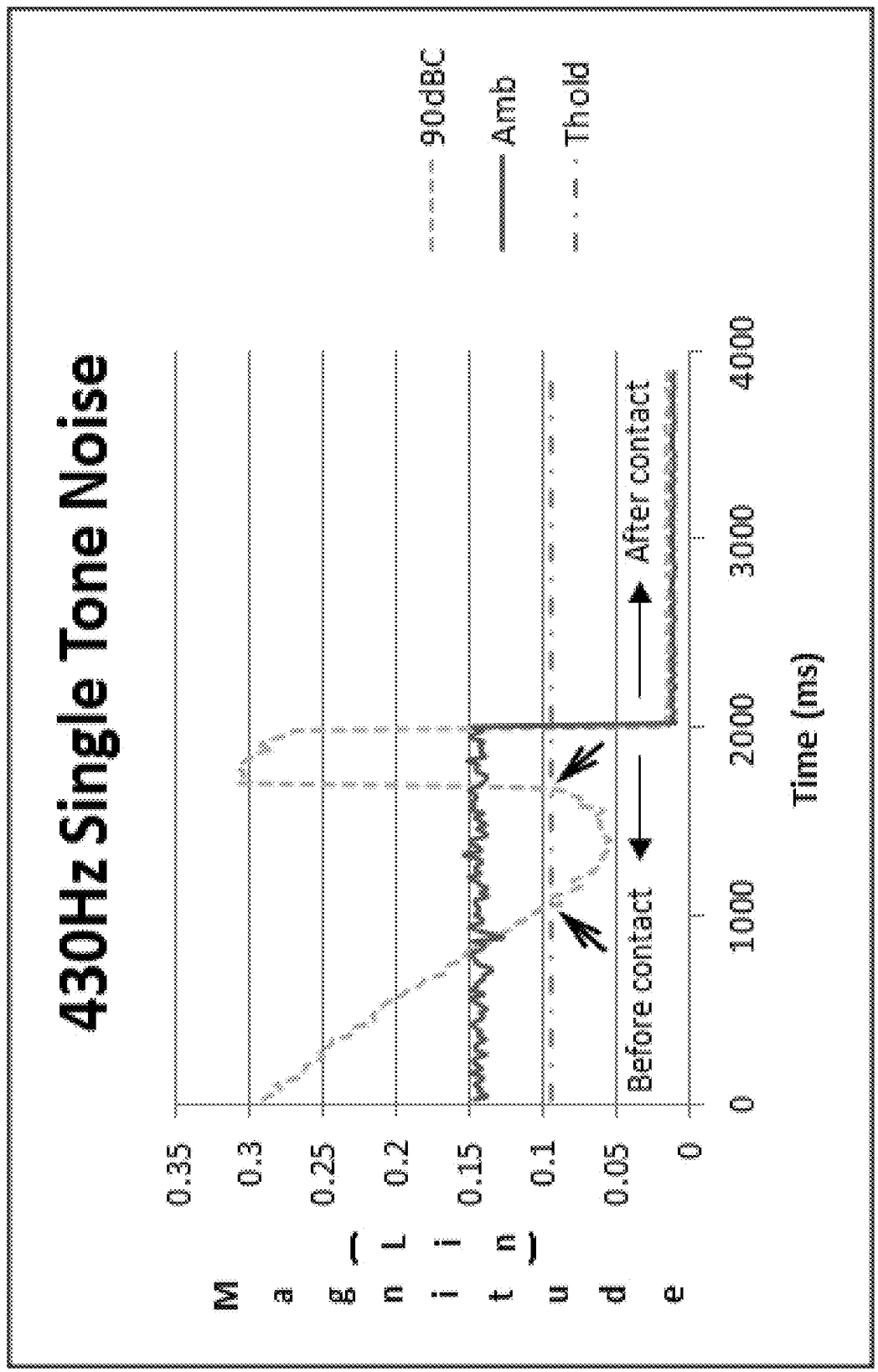
FIG. 19 is an example diagram illustrating a false positive error due to a single-tone noise when an amplitude of a sound is used to detect a tip-liquid contact.

FIG. 19 is an example diagram illustrating a false positive error due to a single-tone noise when the amplitude of the sound at a same frequency is used to detect the tip-liquid contact. The diagram in FIG. 19 shows experimental results in a graph of the sound amplitude over time. The dash-dotted line in the graph indicates an amplitude threshold for determining whether the tip-liquid contact has occurred. In this experiment, the actual tip-liquid contact occurred at around 2000 msec. As illustrated by the solid line in FIG. 19, when only ambient noise is present in the background, the magnitude of the sound amplitude crosses the amplitude threshold only around 2000 msec. On the other hand, as illustrated by the dashed line in FIG. 19, when the background noise is a single-tone noise with a frequency of 430 Hz with 90 dBC, the sound amplitude at 430 Hz shows a significant dip below the threshold between 1100 msec and 1700 msec, as indicated by the arrows, before it surges and drops below the threshold again at the 2000 msec mark when the actual contact occurs.

Figure 20:
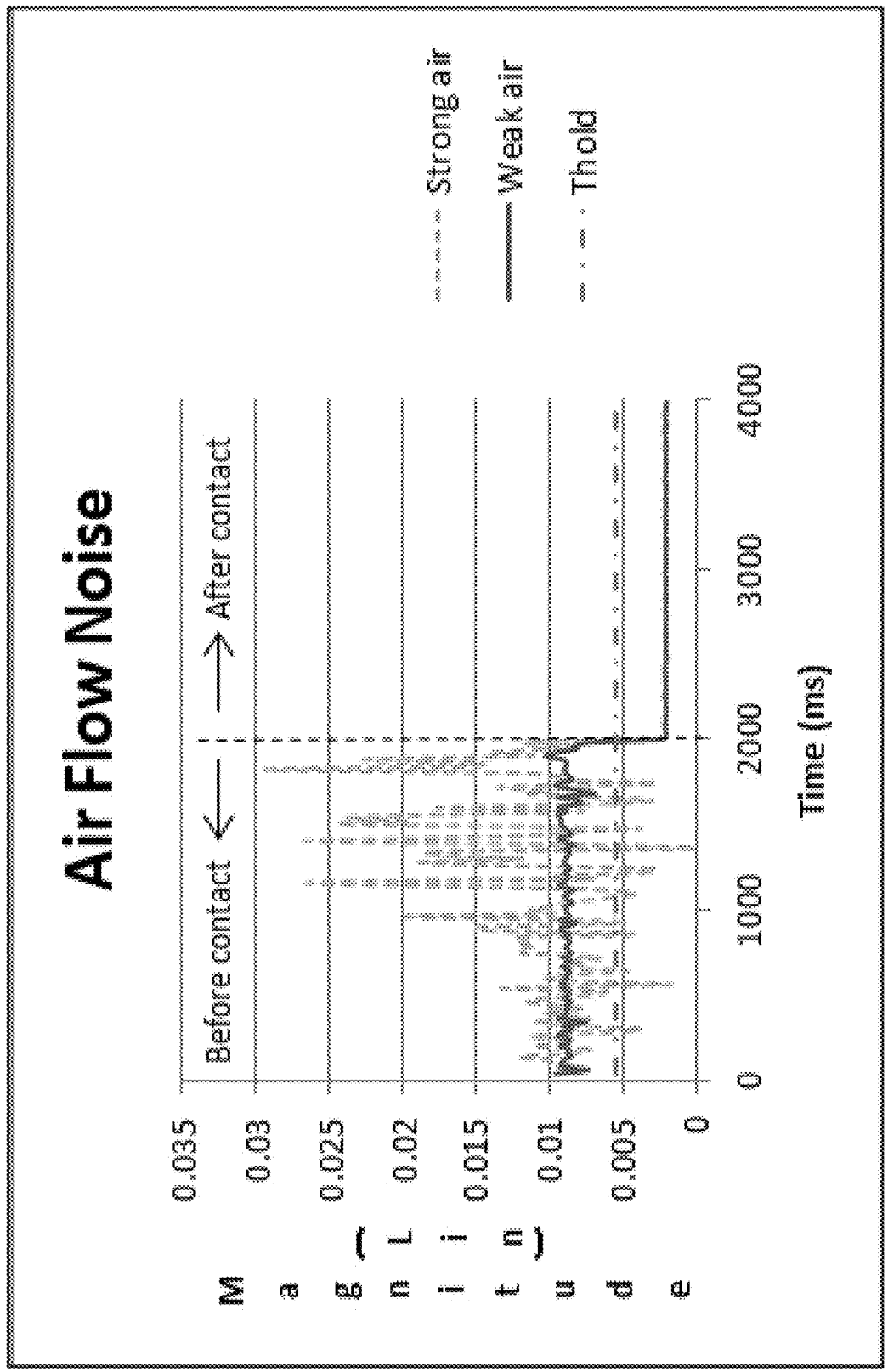
FIG. 20 illustrates an example diagram showing a false positive error due to an air flow noise.

When the background noise is present, the sound intensity of the sound generator may be increased to make the background noise less significant. However, such an approach has a limitation in that certain types of the background noise still has significant effects even with the increased sound intensity of the sound generator. Further, increasing the sound intensity may cause negative impacts, such as high power consumption, increased temperature of the sound generator and/or the controller 110, elevated total harmonic distortions, and reduced life cycles of the sound generator and/or the acoustic sensor. FIG. 20 illustrates an example diagram showing a false positive error due to an air flow noise. During the experiment of FIG. 20, the sound amplitude is set with a gain of 8.2× at the sound generator. For the embodiment illustrated by FIG. 20, when a strong air flow is introduced around the liquid dispenser and thus adds a substantial background noise, increasing the sound intensity at the sound generator did not prevent the wind noise of the air flow from causing many false positive errors.

According to an aspect of the disclosure, a sound intensity or a sound power of the sensed sound may be monitored to detect whether the tip of the liquid dispenser has contacted liquid, instead of monitoring the amplitude/phase or the acoustic impedance of the sensed sound. In one embodiment, values associated with the sound power or the sound intensity may be averaged over a time window, and the average value may be monitored to detect the tip-liquid contact.

The sound power SP may be calculated based on the following equation, where A is an area normal to the sound wave propagation, I is a sound intensity, p is a sound pressure, and $Z_0$ is a characteristic acoustic impedance.

$$SP = AI = Ap^2 Z_0$$

Assuming that the area A and the characteristic acoustic impedance $Z_0$ are constant, the sound power SP is linearly proportional to the squared sound pressure $p^2$. The acoustic sensor may sense a sound pressure and output a voltage amplitude $V_o$ corresponding to the sound pressure. Hence, the voltage amplitude $V_o$ output from the acoustic sensor in response to the sensed sound is linearly proportional to the sound pressure p. Accordingly, by monitoring for a change in the squared voltage amplitude $V_o^2$, the controller 110 may detect a change in the sound power SP. For similar reasons, by monitoring for a change in the squared voltage amplitude $V_o^2$, the controller 110 may detect a change in the sound intensity I, as the sound intensity I is also linearly proportional to the squared sound pressure $p^2$.

Figure 21:
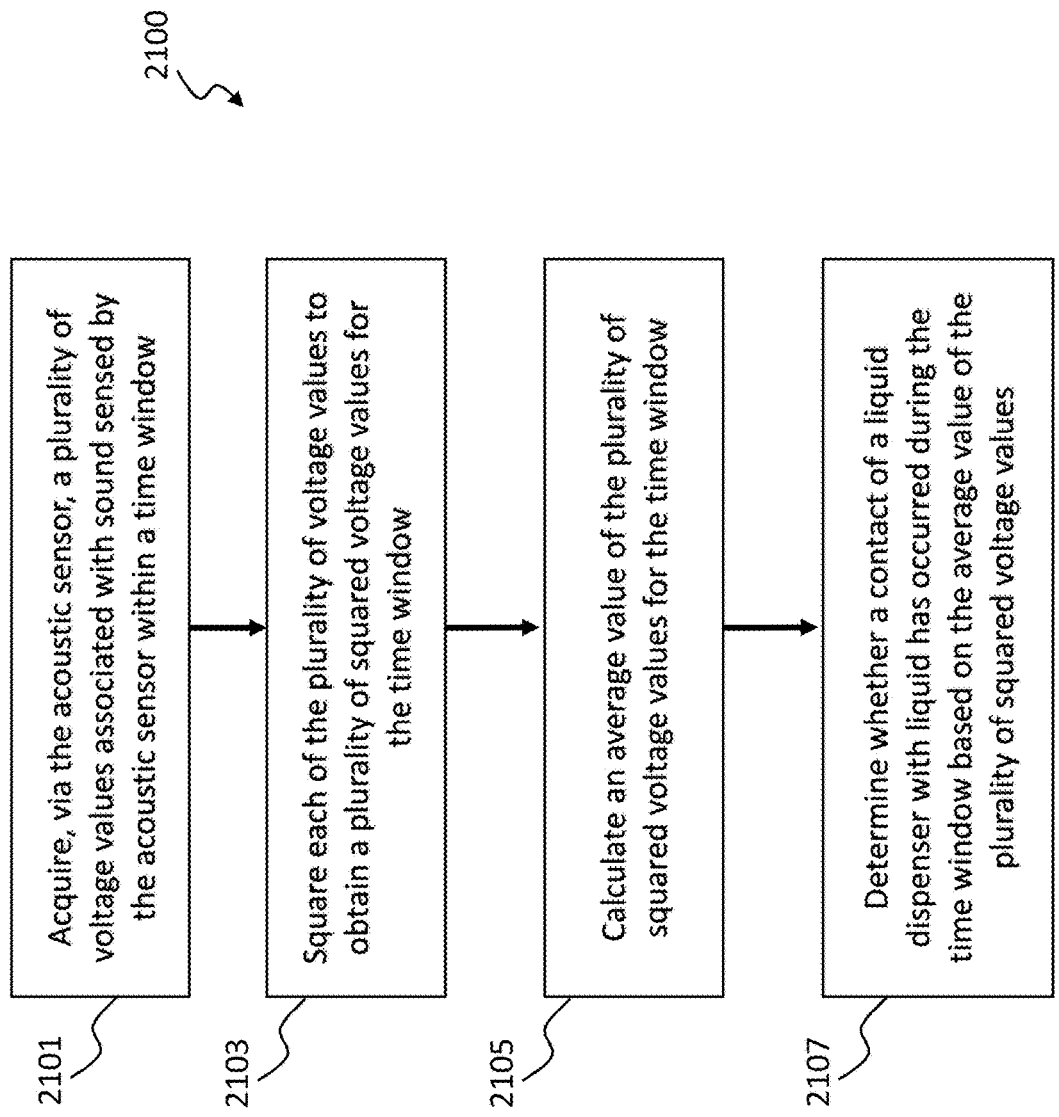
FIG. 21 illustrates a flow diagram of an example method for detecting a dispenser-liquid contact.

FIG. 21 illustrates a flow diagram of an example method 2100 for detecting a dispenser-liquid contact. The method 2100 may be performed by, e.g., the control circuit 111 of the controller 110. In an embodiment, the method may begin with step or operation 2101, in which the control circuit 111 acquires, via the acoustic sensor, a plurality of voltage values associated with sound sensed by the acoustic sensor within a time window. At operation 2103, the control circuit 111 squares each of the plurality of voltage values to obtain a plurality of squared voltage values for the time window. At operation 2105, the control circuit 111 calculates an average value of the plurality of squared voltage values for the time window. At operation 2107, the control circuit 111 determines whether a contact of a liquid dispenser with liquid has occurred during the time window based on the average value of the plurality of squared voltage values.

For instance, according to an embodiment, the acoustic sensor senses sound and generates the voltage values associated with the sound sensed within a time window. The controller 110 acquires voltage values of the voltage output from the acoustic sensor over the set time window, squares each of the voltage values, and then determines an average value of the squared voltage values over the set time window. The average value of the squared voltage may be used to determine whether the tip of the liquid dispenser has contacted the liquid during the time window.

In an embodiment, the control circuit 111 may acquire the plurality of voltage values over a time domain. In an embodiment, the control circuit 111 may acquire the plurality of voltage values over a frequency domain. In such an aspect, the plurality of voltage values may be acquired over a predetermined frequency band including a plurality of frequencies. In an embodiment, the predetermined frequency band may have a bandwidth greater than 1 kHz.

For instance, the voltage values may be acquired over a time domain and/or a frequency domain. When acquiring the voltage values over a frequency domain, the voltage values may be acquired over a broad frequency band (e.g., 200 Hz-1 kHz or preferably 100 Hz-4 kHZ).

A signal monitored at a single frequency is likely to cause errors. The errors may be reduced by monitoring signals over a frequency band (e.g., over multiple frequencies) rather than a single frequency. In one example, a value associated with an average power over a frequency band (e.g., 200 Hz-1 kHz or 100 Hz-4 kHZ) is used to detect the tip-liquid contact. From the perspective of signal processing, sampling multiples of data samples on multiple frequencies over a frequency band can be equal to sampling multiples of data samples on multiple time points over a time window. However, monitoring the signal monitored over a time window requires less complicated hardware and algorithm for the detection purpose, and thus may be the preferred method.

In one example, considering that the frequency band is 100 Hz-4 kHZ, the preferred time window and the number of samples is as follows. An upper limit of the frequency band may be set to one half of the acoustic sensor's sampling rate. Assuming the acoustic sensor's sample rate (S) is 8 kHz, an upper limit of the frequency band then becomes 4 kHz (0.5 S). A total of 80 (N) samples yields a time window of 10 ms (N/S). This may set the lower limit of the frequency band to 100 Hz. The corresponding frequency band resolution also becomes (frequency band×2)/N=100 Hz, which is deemed adequate for the detection purpose. On the other hand, to obtain a more relaxed lower limit (e.g., greater than or equal to 200 Hz), the time window may be lower than 5 ms. For a given time window, a higher sample rate (e.g., 16 kHz, 48 kHz, 96 kHz, etc.) may be preferred because more samples collected can provide more data for averaging, thereby lowering an overall noise.

In an embodiment, the sound sensed by the acoustic sensor may be sensed from sound travelling within the liquid dispenser. For instance, the acoustic sensor may sense sound traveling within the liquid dispenser 130, e.g., within a dispense chamber of the liquid dispenser. The sound traveling within the liquid dispenser may include a resulting sound from the sound generated by the sound generator within the liquid dispenser. The generated sound can be single-tone signals, multi-tone signals, white noise, pink noise, etc. In one embodiment, the sound traveling within the liquid dispenser may include a resulting sound from the sound generated by the sound generator located outside the liquid dispenser and/or the sound generator located inside the liquid dispenser.

In one example, before engaging in any type of detection, the controller 110 may control the sound generator to generate a pilot sound to induce a desired resonance. As such, the discernible amplitude change in sound will occur at a desired resonant frequency when the tip-liquid contact occurs. The pilot sound may be single-tone signals, multi-tone signals, white noise, pink noise, etc. In one embodiment, a single-tone signal may provide an optimal Signal-to-Noise Ratio (SNR) in the tip-liquid detection. In such an embodiment, the single-tone signal needs to match the mechanical resonance of the dispense chamber for the optimal results. Hence, in such an embodiment, when the single-tone signal is used, different tip types may need single-tone signals with different frequencies.

In an embodiment, the control circuit 111 at operation 2107 determines whether the contact with the liquid has occurred by: determining that a contact with liquid has occurred when the average value of the plurality of squared voltage values is below a threshold, and determining that a contact with liquid has not occurred when the average value of the plurality of squared voltage values is greater than or equal to the threshold.

For instance, the controller 110 may determine whether the tip of the liquid dispenser has contacted liquid during the time window based on the average value of the squared voltage values. In particular, the controller 110 may determine that the tip has contacted the liquid during the time window if the average value is below a threshold, and may determine that the tip has not contacted the liquid if the average value is greater than or equal to the threshold.

In an example, a size of the time window may be 20 msec or larger. For example, if the time window is set to 20 msec, the controller 110 may determine whether the tip has contacted the liquid every 20 msec. Considering a scenario where the sound signal is sampled at 48 kHz by the acoustic sensor, if the time window is 20 msec, then 960 samples are collected per 20 msec and thus the average value is calculated once per 960 samples.

In an embodiment, at least one of the acoustic sensor or a sound generator that is a source of the sensed sound is located within an interior of the liquid dispenser. For example, as illustrated in various figures, such as FIGS. 2, 3, 5, and 6, the acoustic sensor may be located within the liquid dispenser and the sound generator may be located within the liquid dispenser or outside of the liquid dispenser. In a preferred embodiment, the acoustic sensor may be located within the liquid dispenser, while the sound generator may be located either within the liquid dispenser or outside the liquid dispenser.

In further embodiments, the structures, devices, and methods discussed herein may further be used for additional sensing activities. The structural proposals regarding cavities may be further be used with any of the following embodiments to improve the sensing methods.

Figure 22:
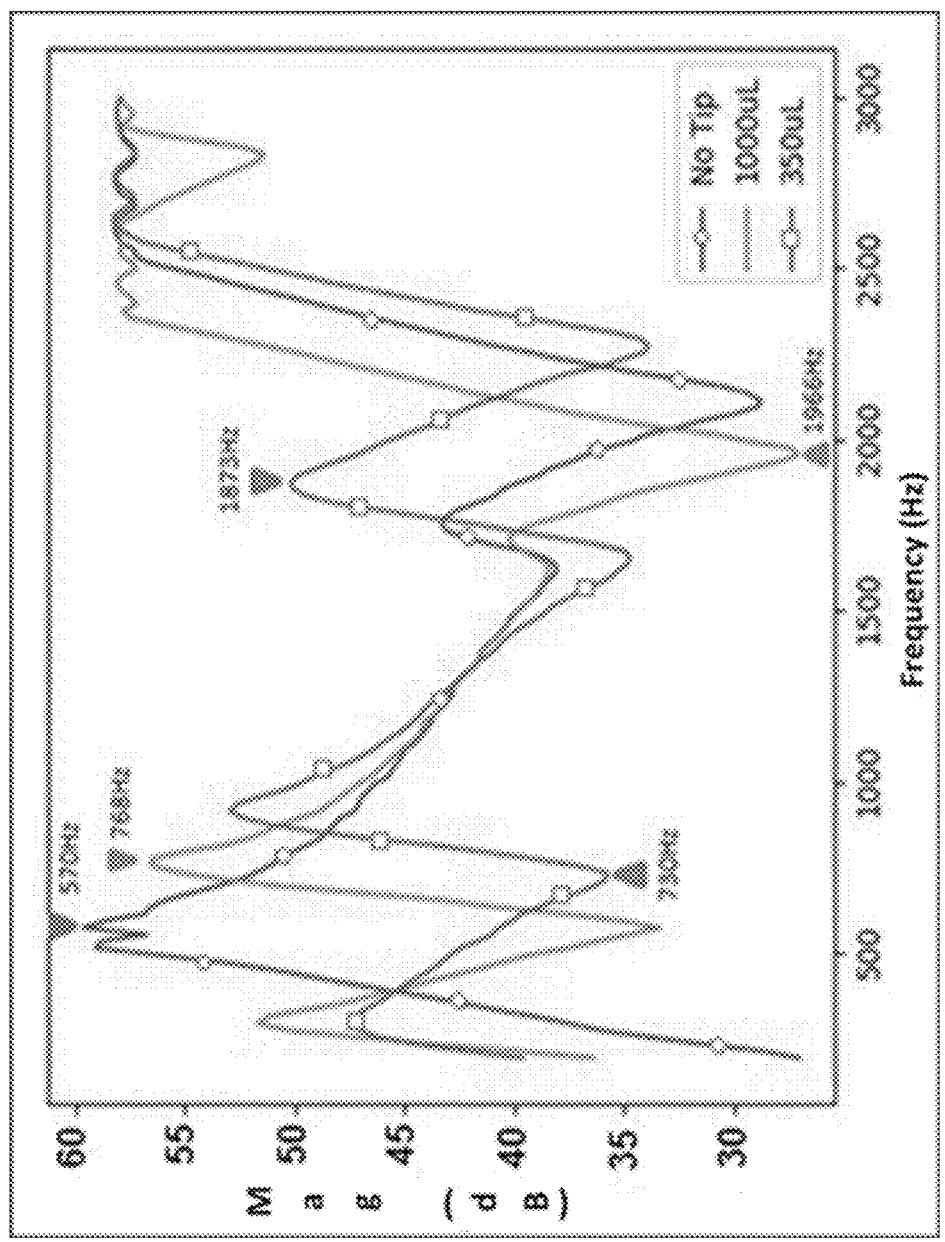
FIG. 22 is an example diagram illustrating experimentally acquired acoustic spectra for multiple tip conditions.
Figure 23:
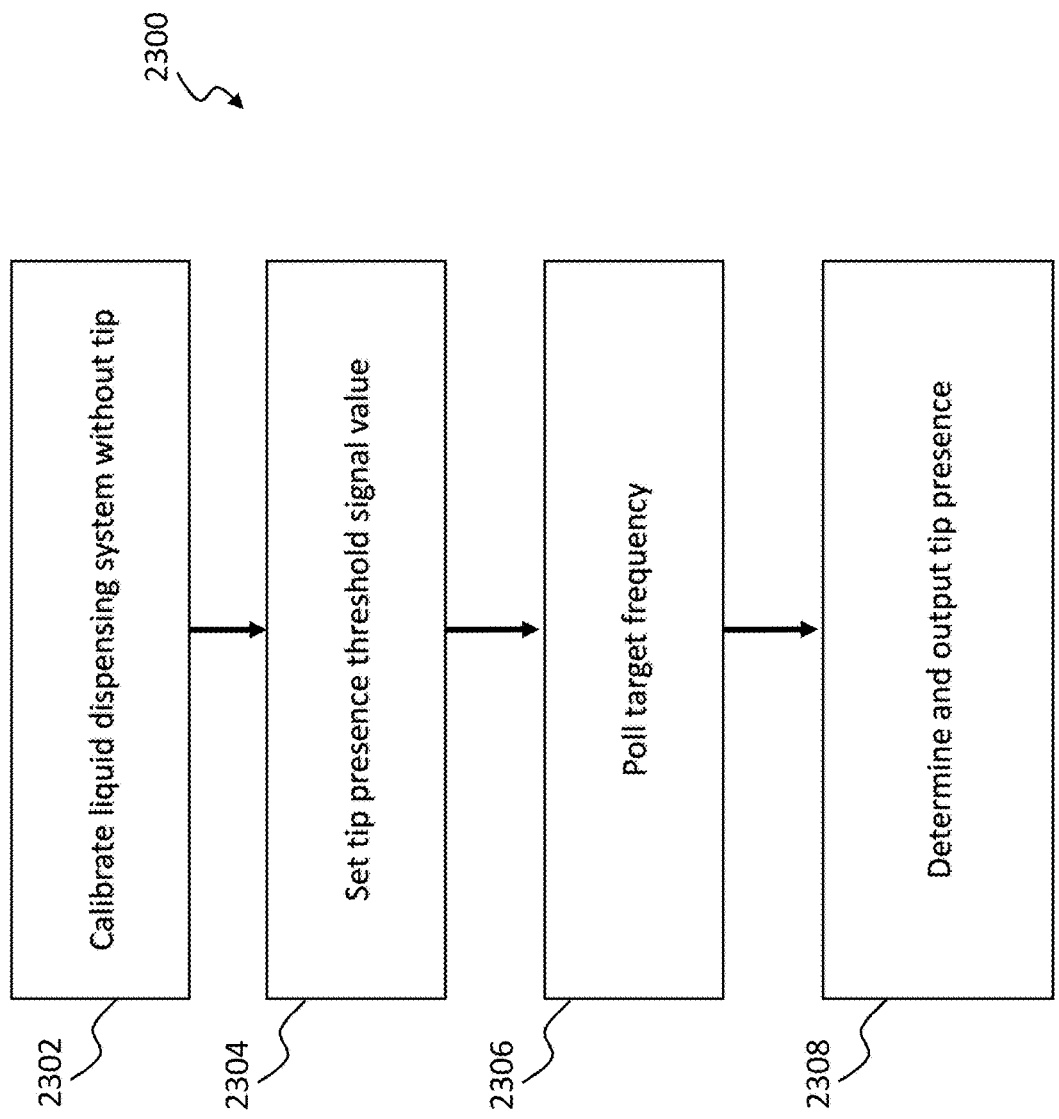
FIG. 23 illustrates a flow diagram of a method of tip presence detection consistent with embodiments hereof.

In further embodiments, the automated pipetting system 100 may execute a method of tip presence detection, as described with respect to FIGS. 22-23. The tip presence detection method may be carried out with any appropriate systems and hardware discussed herein, including any controllers (e.g., controller 110), liquid dispensing systems (e.g., liquid dispensing systems 100, 200, 298, 1200, 1700), liquid dispensers (e.g., liquid dispensers 130, 230, 330, 530, 580, 590, 630, 930, 1030, 1330) and any or all of their constituent parts. The tip presence detection methods described herein are not limited, however, to the specific hardware and devices discussed herein and may be implemented by any suitable control systems and liquid dispensing systems. For example, the method of tip presence detection may be implemented by a liquid dispensing system as described herein in conjunction with a controller, e.g., the controller 110 as described in FIG. 1B and any of its constituent parts (the control circuit 111, communication interface 113, the non-transitory computer-readable medium 115 (e.g., memory or other computer-readable storage medium)) may be employed to implement a tip presence detection method. In an embodiment, the control circuit 111 may include one or more processors, a programmable logic circuit (PLC) or a programmable logic array (PLA), a field programmable gate array (FPGA), an application specific integrated circuit (ASIC), or any other control circuit. In further embodiments, e.g., as described with respect to FIG. 1B, the controller 110 may include may include an analog-to-digital converter 117 that converts an analog signal to a digital signal, a digital-to-analog converter 119 that converts a digital signal to an analog signal, and/or a signal conditioning circuit 121 that may manipulate various analog signals so that the analog signals can meet requirements of their next stages for further processing.

In an embodiment, the control circuit (e.g., control circuit 111 as shown in FIG. 1B) may determine whether the dispensing tip is properly coupled with the first portion (e.g., 243 of FIGS. 2A and 2C or 343, 543, 643, etc.) of the dispensing chamber portion (e.g., 240 of FIGS. 2B and 2D or 340, 540, 640, etc.) based on the average value of the plurality of squared voltage values and/or based directly on the voltage value at a single frequency or multiple frequencies. The dispensing tip may be considered properly coupled with the first portion of the dispensing chamber portion when the dispensing tip is completely coupled with the first portion of the dispensing chamber portion, so as to provide an air-tight seal between the dispensing tip and the first portion of the dispensing chamber portion. The average value of the squared voltage of the sound sensed when the dispensing tip is properly coupled with the liquid dispenser may be different from the average value of the squared voltage when the dispensing tip is not properly coupled with the liquid dispenser. By monitoring the average value of the squared voltage, the controller 110 may determine whether the dispensing tip is properly coupled with the liquid dispenser. For example, because the liquid dispenser has a larger opening at a portion coupled with the liquid dispenser than the tip opening of the dispensing tip, the average value of the plurality of squared voltage values may be larger when the dispensing tip is not properly coupled with the liquid dispenser. Thus, if a relative increase in the average value of the plurality of squared voltage values exceeds a tip presence threshold, the controller 110 may determine that the dispensing tip is not properly coupled with the liquid dispenser. In further embodiments, the voltage values at one or more frequencies may be compared to a tip detection threshold value to determine the presence or absence of a liquid dispensing tip.

FIG. 22 is an example diagram illustrating experimentally acquired acoustic spectra for multiple tip conditions. FIG. 22 illustrates the amplitude response of a liquid dispenser system in dBs over a range of frequencies in multiple tip conditions. Acoustic response spectra are displayed for a liquid dispenser with no dispensing tip, with a 1000 μl dispensing tip, and with a 350 μl dispensing tip. As shown in FIG. 22, although the pattern of each response spectrum is somewhat similar, the frequency locations of the peaks and troughs of amplitude differ between each tip condition. For example, with no dispensing tip, an amplitude peak is present at approximately 570 Hz while the same frequency produces a significantly lower response in the 1000 μl dispensing tip and the 350 μl dispensing tip. The amplitude response differences at different frequencies may thus be employed to identify the presence of a dispensing tip and/or the type of dispensing tip. A system consistent with embodiments herein may compare the acoustic response in the system at a target frequency to determine the presence or absence of a dispensing tip. An example method of such a determination is discussed below.

FIG. 23 illustrates a flow diagram of a method of tip presence detection consistent with embodiments hereof. The method 2300 may be employed with any of the liquid dispenser systems and devices discussed herein. The operations and/or steps of the method 2300 may be carried out by any appropriate control systems as discussed herein, such as by controller 110, or more generally by the liquid dispenser systems discussed herein, such as the liquid dispenser systems 100, 200, 298, 1200, 1700. In embodiments, the structural improvements to the cavities of the dispense chamber discussed herein may be applied to liquid dispenser systems and devices employed for the method 2300 of tip presence detection.

Method 2300 is discussed below with respect to signals having frequencies and voltages. As discussed herein, a signal, such as a test or polling signal disclosed below, in the liquid dispenser system is provided to a sound generator in the liquid dispenser system, which produces an acoustic output having a frequency (e.g., frequency content) corresponding to the test signal's or polling signal's frequency and having a magnitude corresponding to the test signal's or polling signal's voltage (which may be referred to as a test signal voltage). An acoustic sensor detects the acoustic output, and a response signal having a frequency and voltage corresponding to the frequency and magnitude of the acoustic output is provided to a control circuit(s) (e.g., 111) of the liquid dispenser system.

In an operation 2302, the liquid dispenser system is calibrated with no tip attached. An operator may confirm that no dispensing tip is attached to the dispensing system prior to performing a calibration step. In an embodiment, the calibration operation 2302 includes measuring at least one signal test response, or more generally a system test response, at a target frequency. The signal response is measured in response to a test signal provided at the target frequency. An appropriate magnitude of the test signal voltage may be selected according to system characteristics to provide an appropriate test signal.

The target frequency may be selected based on, e.g., analysis of acoustic spectra of the liquid dispenser system under multiple tip conditions. The acoustic spectra may be gathered according to a plurality of anticipated tip conditions in the liquid dispenser system. For example, the acoustic spectra may include an acoustic spectrum for each anticipated tip condition, including the no tip condition and the tip present condition for any liquid dispensing tips that may be expected for use. As used herein, the no tip condition refers to a state wherein the liquid dispenser system includes no dispensing tip attached. The tip present condition refers to a state wherein the liquid dispenser system includes an attached liquid dispensing tip. In embodiments, the acoustic spectra may include only a subset of anticipated tip conditions. The target frequency is selected according to, e.g., a frequency that exhibits a significant difference between the no tip condition and one or more tip present conditions accounted for in the acoustic spectra. In embodiments, the one or more tip present conditions may include all known tip present conditions in the acoustic spectra. For example, based on the acoustic spectra shown in FIG. 22, 570 Hz may be selected, because it shows a +5 dB magnitude response for the no-tip condition and approximately a −15 dB magnitude response for both tip present conditions (involving a 350 μl tip and a 1000 μl tip). 570 Hz is an example only, and other embodiments may use another frequency(ies) as a target frequency. Different liquid dispenser systems may have differing acoustic characteristics requiring the selection of a different value at the target frequency.

In an operation 2304, the system test response at the target frequency using the test signal in the no tip condition is used to set a tip presence threshold. The tip presence threshold may be set as a percentage of a system test response voltage (which corresponds to the sound pressure) at the test signal target frequency in the no tip condition. For example, the tip presence threshold may be set at 20% of the no tip condition system test response voltage. In other examples, the tip presence threshold may be set higher than 20%, e.g., at 30%, 40%, 50%, 60%, 70%, 80%, 90%, etc., or at lower than 20%, e.g., at 10%, 5%. In further embodiments, the tip presence threshold may be set as a percentage of the acoustic output generated by the sound generator at the test signal target frequency in the no tip condition.

In an operation 2306, the liquid dispenser system provides a polling signal at the target frequency and at the test signal voltage and detects a system polling response voltage. The polling signal may be provided once according to an operator command and/or a system workflow. The polling signal may be provided continuously, e.g., the signal may be provided with no interruptions. The polling signal may be provided substantially continuously. The polling signal may also be provided at regular intervals, e.g., every second, every millisecond, every microsecond, etc.

In an operation 2308, tip presence may be determined and output. For instance, if the system polling response voltage exceeds the tip presence threshold, the controller 110 of the liquid dispenser system may determine that no tip is present and the system is in the no tip condition. If the system polling response voltage does not exceed the tip presence threshold, it is determined that a tip is present. If the polling response voltage equals the tip presence threshold, the system may be configured for either determination.

The liquid dispenser system outputs the tip presence threshold according to the tip presence threshold determination. The output may be provided in any suitable format, for example, a notification on a display, a continuous sound or a sound indicating a change of state, a light, etc. The output may be provided continuously, may be provided in response to a polling signal, and/or may be provided only in response to a change of state.

The embodiment discussed with respect to FIG. 23 employs a target frequency wherein the no tip condition response exceeds that of the tip present response, as illustrated in FIG. 22. In further embodiments, a target frequency wherein the tip present condition response exceeds the no tip condition response may be selected. Other operations in the method may be adjusted accordingly.

In further embodiments, the automated pipetting system 100 may execute a method of tip identification, as described with respect to FIGS. 24-30. The tip identification method may be carried out with any appropriate systems and hardware discussed herein, including any controllers (e.g., controller 110), liquid dispensing systems (e.g., liquid dispensing systems 100, 200, 298, 1200, 1700), liquid dispensers (e.g., liquid dispensers 130, 230, 330, 530, 580, 590, 630, 930, 1030, 1330) and any or all of their constituent parts. The tip identification methods described herein are not limited, however, to the specific hardware and devices discussed herein and may be implemented by any suitable control systems and liquid dispensing systems. For example, the method of tip identification may be implemented by a liquid dispensing system as described herein in conjunction with a controller, e.g., the controller 110 as described in FIG. 1B and any of its constituent parts (the control circuit 111, communication interface 113, the non-transitory computer-readable medium 115 (e.g., memory or other computer-readable storage medium) may be employed to implement a tip identification method. In an embodiment, the control circuit 111 may include one or more processors, a programmable logic circuit (PLC) or a programmable logic array (PLA), a field programmable gate array (FPGA), an application specific integrated circuit (ASIC), or any other control circuit. In further embodiments, e.g., as described with respect to FIG. 1B, the controller 110 may include may include an analog-to-digital converter 117 that converts an analog signal to a digital signal, a digital-to-analog converter 119 that converts a digital signal to an analog signal, and/or a signal conditioning circuit 121 that may manipulate various analog signals so that the analog signals can meet requirements of their next stages for further processing.

In an embodiment, the control circuit 111 (FIG. 1B) may identify information about the dispensing tip (e.g., 247 of FIG. 2A, or 347, 547, 647, etc.) based on an average value of a plurality of squared voltage values, wherein the plurality of squared voltage values may be part of a voltage response associated with an acoustic sensor. Because the sound sensed by the acoustic sensor (e.g., 260, 360, etc.) may change based on the structure of the dispensing tip, different types of dispensing tips may be identified based on the sound sensed by the acoustic sensor. For example, the average value of the squared voltage values based on the sound sensed may be used to distinguish different types of dispensing tips. In embodiments, the voltage responses may be directly employed for such tip identification in place of the average value of the plurality of squared voltage values.

Referring again to FIG. 22, it can be seen that not only do the dispensing tips produce different acoustic spectra than the no tip condition, the different dispensing tips produce different acoustic spectra from one another. Thus, the liquid dispenser system may be configured to determine a type of dispensing tip attached to the system according to a response to one or more test signals. For example, a test signal at 768 Hz would show a significantly different response for a 1000 µl dispensing tip versus a 350 µl dispensing tip. In some embodiments, the entirety of the acoustic spectra of different dispensing tips may be compared to determine the identity of a dispensing tip. In further embodiments, a discrete number of selected target frequencies may be chosen for comparison to determine the identify of a dispensing tip.

Figure 24:
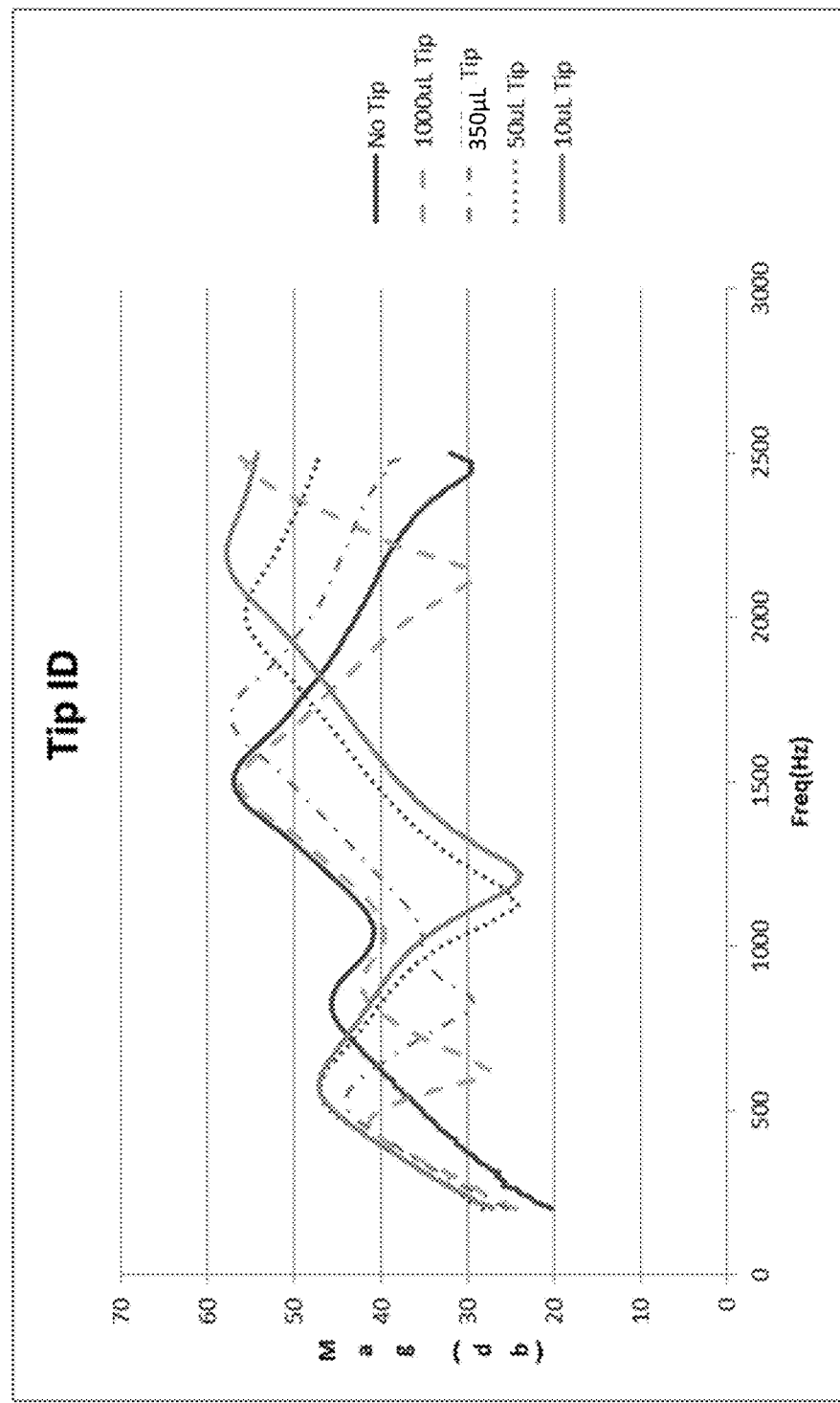
FIG. 24 is an example diagram illustrating experimentally acquired acoustic spectra for multiple dispensing tip types.

FIG. 24 is an example diagram illustrating experimentally acquired acoustic spectra for multiple dispensing tip types. FIG. 24 illustrates the amplitude response in dBs over a range of frequencies for four different tip types (10 µl, 50 µl, 350 µl, and 1,000 µl) as well as the no tip condition. As shown in FIG. 24, although the patterns of the spectra are somewhat similar, the amplitude response differs between the different tip conditions. The amplitude response differences at different frequencies may thus be employed to identify a specific dispensing tip from among several dispensing tip options. A system consistent with embodiments herein, such as the liquid dispenser system, may compare the acoustic response in the system at one or more target frequencies to determine the type of dispensing tip.

In embodiments, two acoustic spectra may be compared using Pearson Correlation Coefficients (PCCs). PCCs provide a measure of the linear correlation between two variables. PCCs may be used to represent the similarity between two data series over the length of the series. A PCC of exactly one represents total linear correlation, and a PCC of zero represents no linear correlation.

FIGS. 25A-28D are example diagrams illustrating experimentally acquired acoustic spectra for multiple dispensing tip types under differing experimental conditions.

Figures 27A, 27B, 27C, 27D, 27E:
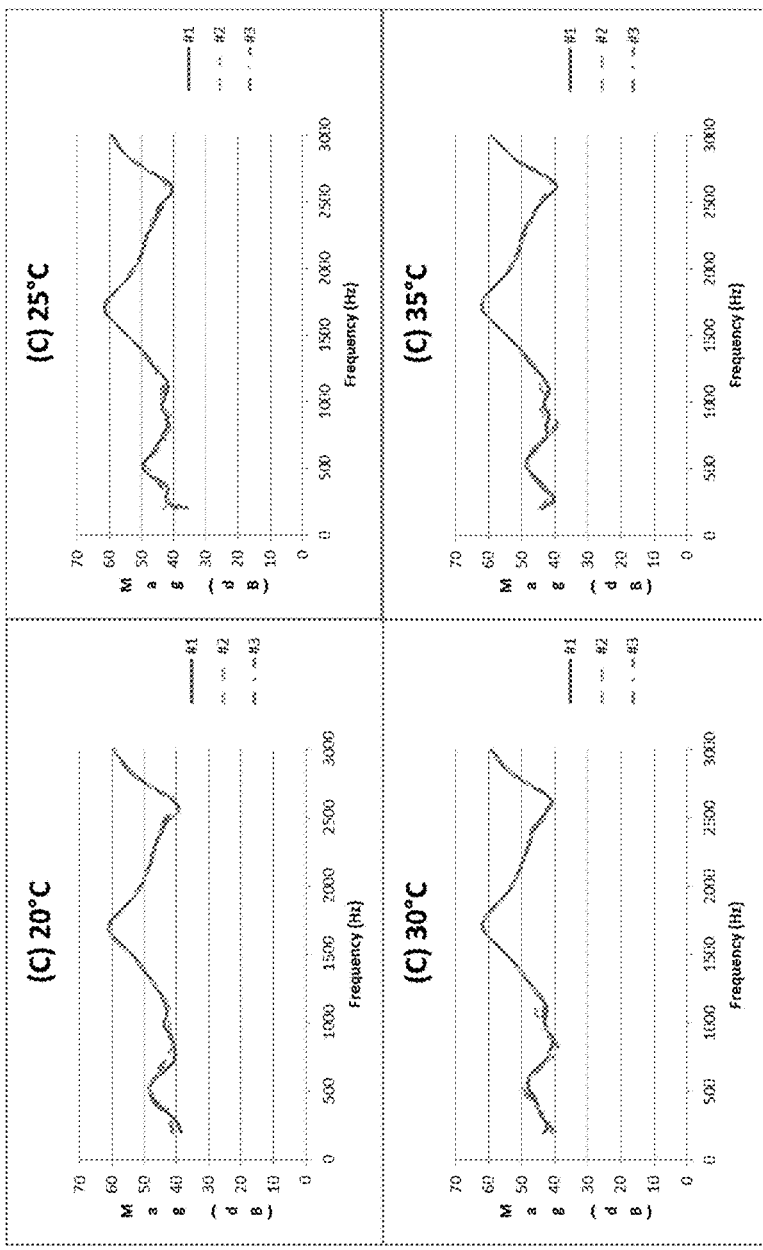
FIGS. 27A-E are example diagrams illustrating experimentally acquired acoustic spectra for a dispensing tip at multiple temperatures.

FIGS. 25A-25E are example diagrams illustrating experimentally acquired acoustic spectra for multiple dispensing tip types with and without added noise. Instruments employing liquid dispensing tips may employ various fans, for example, thermal electric cooler (TEC) fans, ventilation fans, and others, which may generate noise. FIGS. 25A-25E illustrate the amplitude response in dBs over a range of frequencies for the no tip condition (FIG. 25A), for a 1,000 µl dispensing tip (FIG. 25B), for a 350 µl dispensing tip (FIG. 25C), for a 50 µl dispensing tip (FIG. 25D), and for a 10 µl dispensing tip (FIG. 25E), as measured with a fan to add noise (WF—with fan condition) and without a fan (NF—no fan condition). Using PCCs to determine the similarity of the datasets in FIGS. 25A-25E, it can be shown that the no-fan data set of each tip is more closely correlated with the with-fan data set of the same tip than it is to any other data set. These results are shown in Tables 1 and 2. Table 1 shows the PCCs for each no fan condition compared to each of the other no fan conditions. Table 2 shows the PCCs for each no fan condition compared to each with fan condition. Accordingly, determining correlations between acoustic spectra may reliably be used to determine the identity of a dispensing tip in conditions of varying noise.

illustrate the amplitude response in dBs over a range of frequencies for the 350 µl dispensing tip condition at 20° C., 25° C., 30° C., and 35° C. Each of FIGS. 27A-27D illustrate the results of three frequency sweeps. FIG. 27E shows the acoustic spectra of the four different temperatures on the same diagram. Using PCCs to determine the similarity of the datasets in FIGS. 27A-27E, it can be shown that, when the tip condition is not altered, the resulting acoustic spectra are highly correlated, even at different temperatures. The datasets of FIGS. 27A-27D may also be compared to those of FIG. 25C to demonstrate a high correlation with the no-fan and with-fan conditions of that experiment.

FIGS. 28A-28D are example diagrams illustrating experimentally acquired acoustic spectra for the no tip condition at four different temperatures across multiple experiments using three different levels of acoustic output from a sound generator. FIGS. 28A-28D illustrate the amplitude response in dBs over a range of frequencies for the no tip condition at 20° C., 25° C., 30° C., and 35° C. Each of FIGS. 28A-28D illustrate the results of three frequency sweeps performed at different speaker volumes. Using PCCs to determine the similarity of the datasets in FIGS. 28A-28D, it can be shown that, when the tip condition is not altered, the resulting acoustic spectra are highly correlated, even at different temperatures and different volumes. The datasets of FIGS. 28A-28D may also be compared to those of FIG. 25A to

TABLE 1

| Correlation | A-NF | B-NF | C-NF | D-NF | E-NF |
|---|---|---|---|---|---|
| A-NF | 1 | 0.45452526 | 0.60934022 | 0.1531597 | −0.1207783 |
| B-NF | 0.454526 | 1 | 0.25846456 | 0.05203483 | 0.07147587 |
| C-NF | 0.60934022 | 0.25846456 | 1 | 0.57853248 | 0.025841958 |
| D-NF | 0.1531597 | 0.05203483 | 0.57853248 | 1 | 0.90175653 |
| E-NF | −0.1207783 | 0.07147587 | 0.25841958 | 0.90175653 | 1 |

TABLE 2

| Correlation | A-WF | B-WF | C-WF | D-WF | E-WF |
|---|---|---|---|---|---|
| A-NF | 0.96684813 | 0.41243327 | 0.61652385 | 0.12196335 | −0.1375414 |
| B-NF | 0.47682254 | 0.98519274 | 0.24562518 | −0.0058725 | 0.06531435 |
| C-NF | 0.5873423 | 0.22491166 | 0.99597335 | 0.57442832 | 0.23363667 |
| D-NF | 0.06853596 | 0.04667363 | 0.54857159 | 0.99315235 | 0.8842036 |
| E-NF | −0.2066031 | 0.08505754 | 0.22329073 | 0.89563231 | 0.99058186 |

FIGS. 26A-26E are example diagrams illustrating experimentally acquired acoustic spectra for the 1,000 µl dispensing tip condition at four different temperatures across multiple experiments. FIGS. 26A-26D illustrate the amplitude response in dBs over a range of frequencies for the 1,000 µl dispensing tip condition at 20° C., 25° C., 30° C., and 35° C. Each of FIGS. 26A-26D illustrate the results of three frequency sweeps. FIG. 26E shows the acoustic spectra of the four different temperatures on the same diagram. Using PCCs to determine the similarity of the datasets in FIGS. 26A-26E, it can be shown that, when the tip condition is not altered, the resulting acoustic spectra are highly correlated, even at different temperatures. The datasets of FIGS. 26A-26D may also be compared to those of FIG. 25B to demonstrate a high correlation with the no-fan and with-fan conditions of that experiment. FIGS. 27A-27E are example diagrams illustrating experimentally acquired acoustic spectra for the 350 µl dispensing tip condition at four different temperatures across multiple experiments. FIGS. 27A-27D demonstrate a high correlation with the no fan and with fan conditions of that experiment.

The data shown in FIGS. 26A-28D demonstrate that determining correlations between acoustic spectra may reliably be used to determine the identity of a dispensing tip in conditions of varying temperature and varying acoustic volume. The data shown in FIGS. 26A-28E further demonstrate that the acoustic spectra associated with various liquid dispensing tips remain relatively stable during variations in temperature, acoustic volume, and ambient noise. The acoustic spectra recorded during these experiments indicate robustness in view of changing conditions and demonstrate that comparison of acoustic spectra may be reliable in identifying tip type in the face of potentially confounding experimental conditions. In embodiments, results of using PCCs may be improved through several techniques. For example, the amplitude may be converted from a linear to a log scale prior to determining the PCC between two data sets. In another example, preprocessing with a low pass filter may be performed across the entire spectrum to improve the data quality and eliminate excess noise. The cutoff frequency may be selected as a function of the Nyquist frequency, for example, at 0.2 of the Nyquist frequency or any other suitable value.

Figure 29:
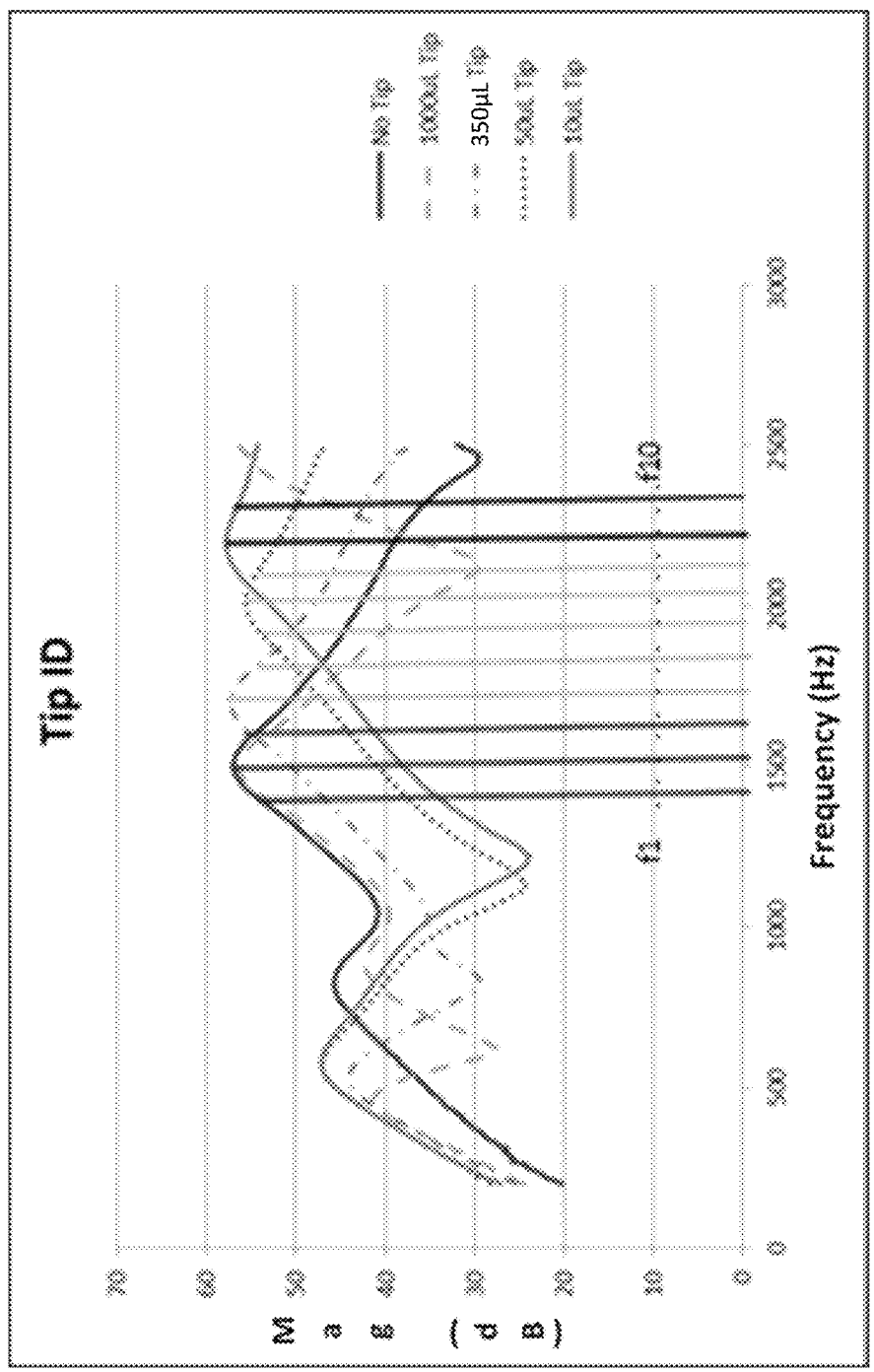
FIG. 29 is an example diagram illustrating experimentally acquired acoustic spectra for multiple dispensing tip types.

FIG. 29 is an example diagram illustrating experimentally acquired acoustic spectra for multiple dispensing tip types. FIG. 29 illustrates the amplitude gain in dBs over a range of frequencies for four different tip types (10 µl, 50 µl, 350 µl, and 1,000 µl) as well as the no tip condition. FIG. 29 further illustrates multiple target frequencies that may be used in a comparison to determine the identity of a dispensing tip.

In an embodiment, identifying one liquid dispensing tip from among multiple dispensing tip types may be performed based on three target frequency measurements for each liquid dispensing tip rather than using the entire acoustic spectrum. In an embodiment, the three target frequency measurements may be selected according to a resonant peak location in the acoustic spectra associated with the different liquid dispensing tips. For example, the 1,000 µl dispensing tip is the only dispensing tip to have a resonant peak between the frequency F1 and the frequency F3 in FIG. 29. Thus, Mag(F2)−Mag(F1) is positive while Mag(F3)−Mag(F2) is negative. This pattern holds true only for the 1,000 µl dispensing tip. As shown in FIG. 29, the 350 µl liquid dispensing tip has a peak near F4, or between F3 and F5, the 50 µl liquid dispensing tip has a peak near F7, or between F6 and F8, and the 10 µl liquid dispensing tip has a peak near F9, or between F8 and F10. Accordingly, each of the four liquid dispensing tips may be uniquely identified by a simple comparison involving addition or subtraction of the system response at three discrete frequencies. As illustrated in FIG. 29, the target frequencies may be selected according to a pre-determined interval between each target frequency. In further embodiments, the target frequencies may be selected according to an analysis of the acoustic spectra such that resonant peaks of the acoustic spectra fall between two target frequencies with a third target frequency also falling between the two target frequencies. Fewer or greater number of target frequencies may be used, depending on the number of dispensing tips that must be distinguished and the locations of the resonant peaks.

Figure 30:
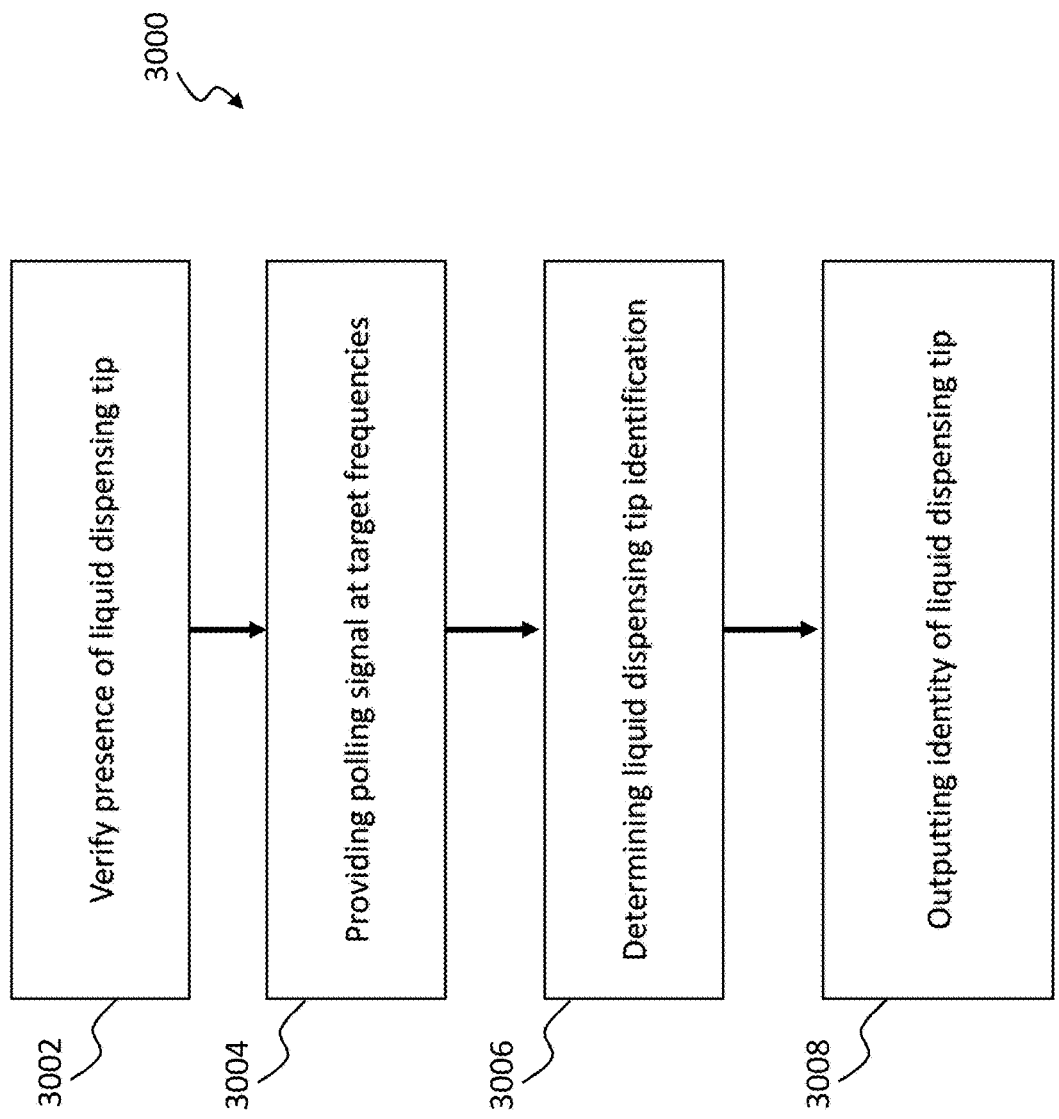
FIG. 30 illustrates a flow diagram of a method of tip identification consistent with embodiments hereof.

FIG. 30 illustrates a flow diagram of a method of tip identification (identity determination) consistent with embodiments hereof. The method 3000 may be employed with any of the liquid dispenser systems and devices discussed herein. The operations and/or steps of the method 3000 may be carried out by any appropriate control systems (e.g., controller 110 of FIG. 1B) as discussed herein. In embodiments, the structural improvements to the cavities of the dispense chamber discussed herein may be applied to liquid dispenser systems and devices employed for the method 3000 of tip identity determination.

Method 3000 is discussed below with respect to signals having frequencies and voltages. As discussed herein, a signal, such as a test or polling signal disclosed below, in the liquid dispenser system is provided to a sound generator in the liquid dispenser system, which then produces an acoustic output having a frequency corresponding to the test signal's or polling signal's frequency and having a magnitude corresponding to the test signal's or polling signal's voltage. The acoustic sensor detects an acoustic response or other system response to the acoustic output, and a response signal having a frequency and voltage corresponding to the frequency and magnitude of the acoustic response is provided to a control circuit(s) (e.g., 111) of the liquid dispenser system.

In an operation 3002, the method 3000 includes verifying the presence of a dispensing tip. Presence of a dispensing tip may be ensured, for example, via the tip presence detecting method 2300 discussed above with respect to FIG. 23. In further embodiments, tip presence detection may be performed via any suitable means, such as electrical detection, mechanical detection, optical detection, manual detection via an operator, etc.

In an operation 3004, the method 3000 includes providing a polling signal at a plurality of target frequencies. In an embodiment, the plurality of target frequencies may include a plurality of discrete target frequencies. In an embodiment, the plurality of target frequencies may also include a complete frequency sweep across a specific range of frequencies at a specified frequency increment.

In an operation 3006, the method 3000 includes determining the tip identification. the tip identification is determined according to a comparison of the system response at the plurality of target frequencies with one or more tip identification metrics and determining the identify of a liquid dispensing tip according to the comparison. Comparing the system response at the plurality of target frequencies with one or more tip identification metrics may be performed in several ways.

In an embodiment, a tip identification metric may be a threshold PCC between the system response and one or more stored acoustic spectra. The plurality of target frequencies may include a frequency sweep across a range of frequencies. The polling signal provided at this plurality of target frequencies produces a tip response acoustic spectrum. The tip response acoustic spectrum may be compared to one or more tip identification acoustic spectra that are stored and accessible by a control circuit (e.g., 111) of the liquid dispenser system. The tip identification acoustic spectra may be stored, for example, in a look-up table.

The tip identification acoustic spectra may be determined in advance and stored in one or more storage media associated with or accessible by the control circuit of the liquid dispenser system. Tip identification acoustic spectra may be established under standard conditions, for example, 25° C. ambient temperature, environmental noise generated by or mimicking that of the liquid dispenser system, standard sound generator volume loud enough to overcome the environmental noise but not saturate the acoustic sensor, and frequency range between approximately 200 Hz-3 kHz, between 500 Hz-2500 kHz, and/or any suitable range. The tip identification acoustic spectra generated thereby may further be filtered, e.g., via a low pass filter, to remove any artifacts or noise in the signal. The tip identification acoustic spectra may be established in advance by another device and imported into the liquid dispenser system. The tip identification spectra may be established by the liquid dispenser system during an initial set-up or calibration operation. The tip identification spectra may further be reestablished at intervals to ensure that the calibration remains up to date.

The comparison between the tip response acoustic spectrum and the stored tip identification acoustic spectra may include computation of a PCC and/or any other suitable method of comparing these datasets. The highest PCC value that surpasses a threshold PCC value may be used to determine an identification of the dispensing tip used to generate the tip response acoustic spectrum. For example, an operator may attach a 350 µl tip to the liquid dispenser system. The control circuit (e.g., 111) of the liquid dispenser system then obtains a tip response acoustic spectrum for the attached tip and generated PCCs between the tip response acoustic spectrum and one or more stored tip identification acoustic spectra. As discussed above, the PCC between the tip response acoustic spectrum for the 350 μl dispensing tip in this example and the stored tip identification acoustic spectrum for the 350 μl dispensing tip will have the highest value, indicating that the attached tip most closely matches a 350 μl dispensing tip. The system may further perform a threshold check to determine that the 350 μl dispensing tip response acoustic spectrum also matches the stored 350 μl dispensing tip data in excess of a predetermined level, such as a PCC threshold. For example, the PCC threshold may be 0.85, 0.86, 0.87, 0.88, 0.89, 0.90, 0.91, 0.92, 0.93, 0.94, and/or 0.95. The PCC threshold requirement may verify that the detected tip is actually a 350 μl dispensing tip and not an unknown dispensing tip that most closely matches that 350 μl dispensing tip. In embodiments, the liquid dispenser system may be configured to provide an alert or warning if a dispensing tip is attached that does not surpass the PCC threshold, indicating that an unknown tip has been attached.

In another embodiment, a tip identification metric may include a requirement that the system response at three target frequencies for the liquid dispensing tip being identified match a stored tip response pattern. As discussed above, e.g., with respect to FIG. 29, the plurality of target frequencies may include a series of target frequencies selected to identify a dispensing tip based on predicted response amplitude peaks. System response at three selected target frequencies may identify a location of a peak in a tip response acoustic spectrum without polling the entire spectrum. For example, with reference to FIG. 29, for the 1000 μl dispensing tip, a tip identification metric may be to determine whether the system response at F1, F2, and F3 matches the stored tip response pattern wherein Magnitude (F2)–Magnitude (F1) is positive while Magnitude (F3)–Magnitude (F2) is negative. Each known dispensing tip may have a tip response pattern stored as a tip identification metric. The system response at the plurality of target frequencies may be compared to each tip response pattern to determine an identity of the attached dispensing tip. In situations where the plurality of target frequencies do not match any stored tip response pattern, the liquid dispenser system may be configured to provide an alert or warning that an unknown dispensing tip has been attached.

In an operation 3008, the method 3000 includes outputting a determined liquid dispensing tip type. As discussed above, the identity of the liquid dispensing tip type is determined according to the comparison between the plurality of target frequencies and the tip identification metric. The liquid dispenser system is configured to output the identity of the liquid dispensing tip type in any suitable manner, e.g., to a display, via a tone or sound, via a series of lights, etc.

The method 3000 of determining a liquid dispensing tip type may be combined with the method 2300 of determining liquid dispensing tip presence. For example, the liquid dispenser system may be configured to continuously monitor tip presence and update a display or other notification upon the detection of a liquid dispensing tip. The liquid dispenser system may be configured to operate in a liquid dispensing tip identification mode after determining a tip presence and to provide a continuous update to the display or other notification indicating the identity of the attached liquid dispensing tip.

In embodiments, the tip identification metric may further be configured to include a no tip condition for tip identity. Thus, the in a liquid dispensing tip identification method 3000, determining an identification of a liquid dispensing tip may include determining that no tip is present. In such an embodiment, the tip presence verification operation 3002 may not be required.

In embodiments, the tip presence detecting method 2300 and tip identification method 3000 may be performed in a liquid dispenser system including multiple liquid dispensing devices or modules, each having its own liquid dispensing tip. In embodiments, the tip presence detecting method 2300 and liquid dispensing tip identification method 3000 may be performed on multiple liquid dispensing modules simultaneously. Contrary to what may be expected, the experiments described herein demonstrate that cross talk between the multiple liquid dispensing modules does not interfere with the presence and identification results.

Table 3 shows the voltage response results from seven liquid dispensing device modules separated by 10 mm polled with 560 Hz tip presence detection polling signals simultaneously. Six data points are taken for each of the seven dispensing modules. Table 4 shows the voltage response results from the first two of the seven liquid dispensing module tip presence detection polling signals (at 560 Hz) conducted simultaneously. Six data points are taken for each of the two modules. As shown by comparing the results in Table 3 and Table 4, the voltage responses in the Modules #1 and #2 are substantially similar with and without activation of the tip presence detection polling signals in modules #3-#7. Accordingly, tip presence detection and tip identification methods may be performed simultaneously in multiple liquid dispensing modules of a liquid dispenser system. Such simultaneous performance may decrease the time required to update tip presence and tip identification notifications because it is not necessary to test each module separately.

TABLE 3

| Module | 1$^{st}$ data point | 2$^{nd}$ data point | 3$^{rd}$ data point | 4$^{th}$ data point | 5$^{th}$ data point | 6$^{th}$ data point |
| --- | --- | --- | --- | --- | --- | --- |
| #1 | 1.156 | 1.161 | 1.159 | 1.171 | 1.167 | 1.164 |
| #2 | 0.694 | 0.687 | 0.691 | 0.690 | 0.701 | 0.689 |
| #3 | 0.642 | 0.645 | 0.645 | 0.641 | 0.634 | 0.647 |
| #4 | 0.773 | 0.775 | 0.768 | 0.768 | 0.772 | 0.773 |
| #5 | 0.947 | 0.942 | 0.964 | 0.952 | 0.955 | 0.942 |
| #6 | 0.778 | 0.785 | 0.774 | 0.782 | 0.769 | 0.783 |
| #7 | 1.050 | 1.035 | 1.052 | 1.028 | 1.053 | 1.040 |

TABLE 4

| Module | 1$^{st}$ data point | 2$^{nd}$ data point | 3$^{rd}$ data point | 4$^{th}$ data point | 5$^{th}$ data point | 6$^{th}$ data point |
| --- | --- | --- | --- | --- | --- | --- |
| #1 | 1.163 | 1.159 | 1.157 | 1.153 | 1.166 | 1.158 |
| #2 | 0.696 | 0.689 | 0.683 | 0.688 | 0.695 | 0.692 |

Figure 31:
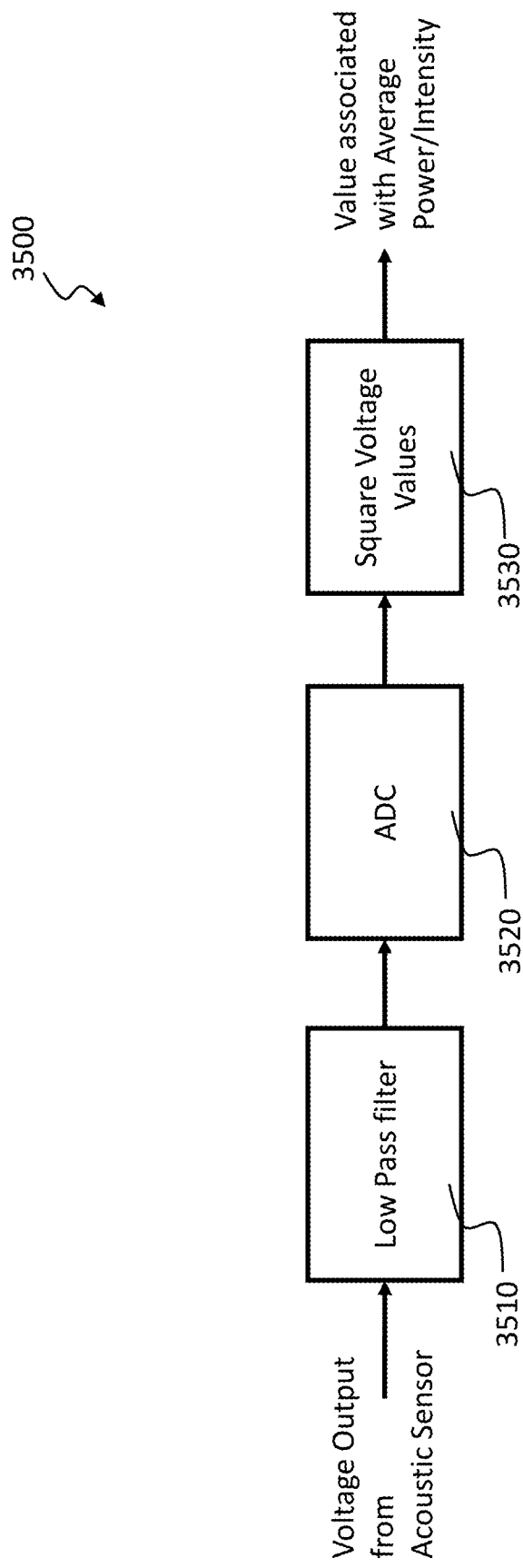
FIG. 31 is an example block diagram illustrating a block diagram for processing the voltage output from the acoustic sensor.

FIG. 31 is an example block diagram 3500 illustrating a block diagram for processing the voltage output from the acoustic sensor. The features performed in the block diagram 3500 may be performed by the controller 110. At 3510, voltage output from the acoustic sensor is received by the controller 110 and is passed through a low pass filter (e.g., low pass filter of the signal conditioning circuit 121). The low pass filter may reduce noise in the voltage output and/or may limit the bandwidth of the voltage output to reduce anti-aliasing effect and/or to enhance the signal-to-noise ratio. Thereafter, at 3520, the output from the low pass filter is passed through an analog-to-digital converter (e.g., analog-to-digital converter 117), to convert the output from analog to digital voltage values. At 3530, the voltage values are each squared (e.g., by the control circuit 111) to generate the squared voltage values. As discussed above, the squared voltage values are linearly proportionate to the sound power or the sound intensity. An average value of the squared voltage values over a set time window may be determined (e.g., by the control circuit 111), where the average value of the squared voltage values is associated with an average power or an average intensity within the set time window. Hence, as discussed above, the average value of the squared voltage values may be monitored to determine whether the tip-liquid contact has occurred and/or to determine whether the tip has been coupled to the liquid dispenser.

Figure 32:
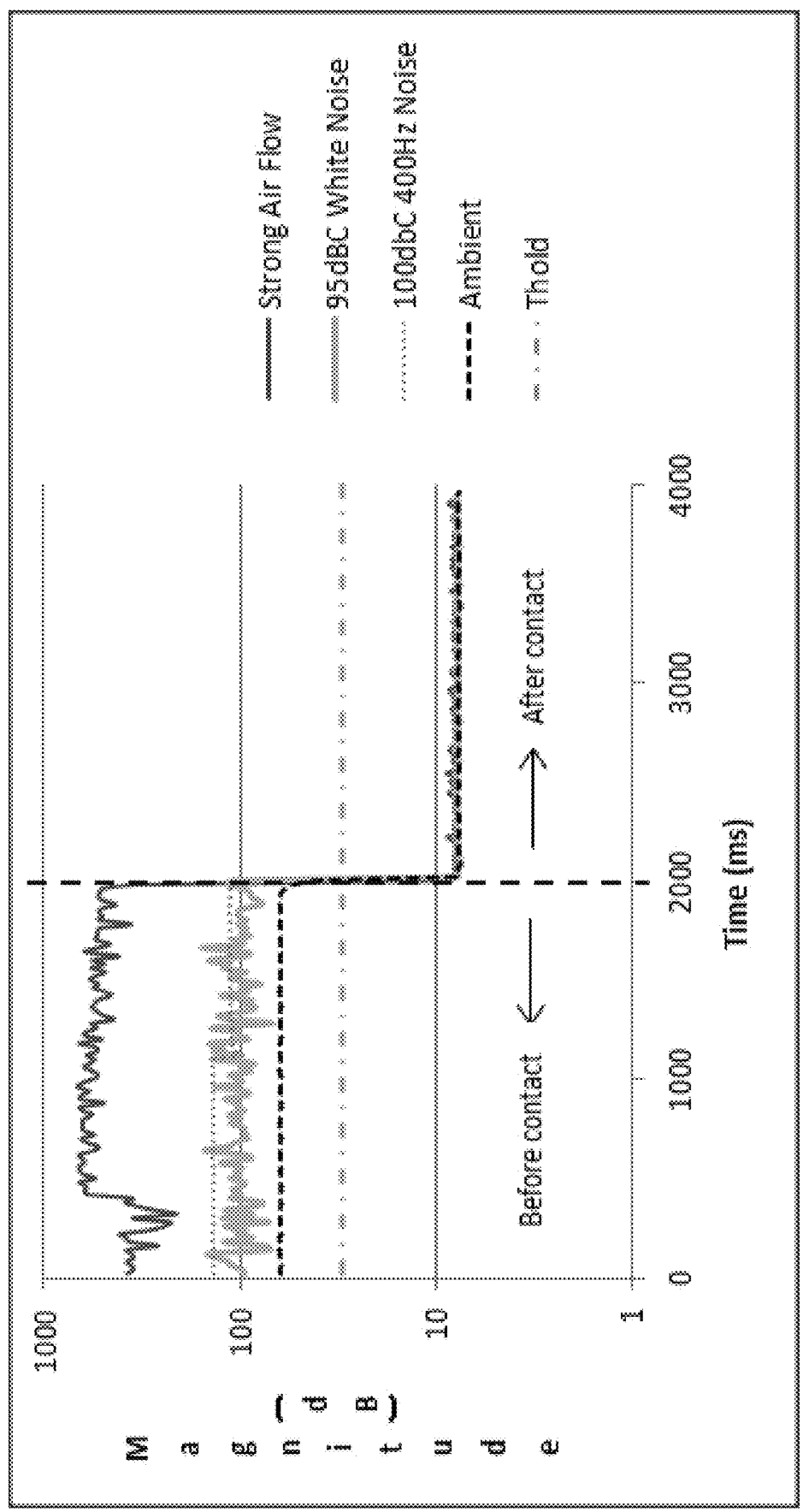
FIG. 32 is an example diagram illustrating elimination of false positive errors when tip-liquid contact is detected based on a value associated with an average power or an average intensity of sound.

FIG. 32 is an example diagram illustrating elimination of false positive errors when tip-liquid contact is detected based on a value associated with an average power or an average intensity of sound. The diagram in FIG. 32 shows experimental results in a graph of the value associated with the average power or the average intensity of sound over time. The dashed-dotted line in the graph indicates a threshold for determining whether the tip-liquid contact has occurred. In this experiment, the actual tip-liquid contact occurred at 2000 msec. For the embodiment illustrated by FIG. 32, no false positive error is detected even when various types of background noises such as the white noise (grey solid line), 400 Hz single-tone noise (dotted line), and a strong wind noise (solid black line).

Further embodiments include:

Embodiment 1 is a liquid dispenser, comprising: a dispenser body including: a dispense chamber portion including a dispense chamber therein, the dispense chamber having a first opening at a first portion of the dispense chamber portion and a second opening at a second portion of the dispense chamber portion, wherein the first portion is configured to couple with a dispensing tip, and a piston chamber portion including a piston chamber therein, the piston chamber being connected to the dispense chamber via the second opening and configured to guide a piston in a linear motion within the piston chamber to draw liquid into the liquid dispenser and to dispense liquid out of the liquid dispenser; a sound generator configured to generate a sound to induce acoustic resonance within the dispense chamber; and an acoustic sensor configured to sense a sound within the dispense chamber, wherein at least one of the sound generator or the acoustic sensor is disposed within the dispense chamber portion.

Embodiment 2 is the liquid dispenser of embodiment 1, further comprising: a control circuit configured to determine whether a contact of the dispensing tip with liquid has occurred based on the sensed sound.

Embodiment 3 is the liquid dispenser of embodiment 1 or 2, wherein the sound generator and the acoustic sensor are positioned to face each other or are positioned on a same side.

Embodiment 4 is the liquid dispenser of embodiments 1 to 3, wherein the dispense chamber is enclosed except at the first opening and the second opening.

Embodiment 5 is the liquid dispenser of embodiments 2 to 3, wherein the control circuit is further configured to: identify information about the dispensing tip based on the sensed sound.

Embodiment 6 is the liquid dispenser of embodiment 5, wherein the sensed sound includes a sound pressure sensed within the dispense chamber, and the information about the dispensing tip is identified based on the sensed sound pressure.

Embodiment 7 is the liquid dispenser of embodiments 1 to 3, wherein the control circuit is further configured to: determine whether the dispensing tip is completely coupled with the first portion of the dispensing chamber portion based on the sensed sound.

Embodiment 8 is a liquid dispenser system, comprising: a liquid dispenser including: a dispenser body including: a dispense chamber portion including a dispense chamber therein, the dispense chamber having a first opening at a first portion of the dispense chamber portion and a second opening at a second portion of the dispense chamber portion, wherein the first portion is configured to couple with a dispensing tip, and a piston chamber portion including a piston chamber therein, the piston chamber being connected to the dispense chamber via the second opening and configured to guide a piston in a linear motion within the piston chamber to draw liquid into the liquid dispenser and to dispense liquid out of the liquid dispenser; a sound generator configured to generate a sound to induce acoustic resonance within the dispense chamber; and an acoustic sensor configured to sense a sound within the dispense chamber, wherein at least one of the sound generator or the acoustic sensor is disposed within the dispense chamber portion; and a control circuit configured to determine whether a contact of the dispensing tip with liquid has occurred based on the sensed sound.

Embodiment 9 is the liquid dispenser system of embodiment 8, further comprising: a liquid dispenser transporter configured to move the liquid dispenser; and a piston mover configured to move the piston within the piston chamber.

Embodiment 10 is the liquid dispenser system of embodiments 8 or 9, wherein the sound generator and the acoustic sensor are positioned to face each other or are positioned on a same side.

Embodiment 11 is the liquid dispenser system of embodiments 8 to 10, wherein the dispense chamber is enclosed except at the first opening and the second opening.

Embodiment 12 is the liquid dispenser system of embodiments 8 to 11, wherein the control circuit is further configured to: identify information about the dispensing tip based on the sensed sound.

Embodiment 13 is the liquid dispenser system of embodiments 8 to 12, wherein the sensed sound includes a sound pressure sensed within the dispense chamber, and the information about the dispensing tip is identified based on the sensed sound pressure.

Embodiment 14 is the liquid dispenser system of embodiments 8 to 13, wherein the control circuit is further configured to: determine whether the dispensing tip is completely coupled with the first portion of the dispensing chamber portion based on the sensed sound.

Embodiment 15 is a liquid dispenser, comprising: a dispenser body including: a dispense chamber portion including a dispense chamber therein, the dispense chamber having a first opening at a first portion of the dispense chamber portion and a second opening at a second portion of the dispense chamber portion, wherein the first portion is configured to couple with a dispensing tip, one or more side conduits, each of the one or more side conduits having a respective cavity and a respective connector channel connecting the respective cavity to the dispense chamber, and a piston chamber portion including a piston chamber therein, the piston chamber being connected to the dispense chamber via the second opening and configured to guide a piston in a linear motion within the piston chamber to draw liquid into the liquid dispenser and to dispense liquid out of the liquid dispenser; a sound generator configured to generate a sound to induce acoustic resonance within the dispense chamber; and an acoustic sensor configured to sense a sound within the dispense chamber, wherein at least one of the sound generator or the acoustic sensor is disposed within the respective cavity of one of the one or more side conduits, wherein the respective cavity and the respective connector of each of the one or more side conduits are free from resonance within a frequency range of the sound sensed by the acoustic sensor.

Embodiment 16 is the liquid dispenser of embodiment 15, further comprising: a control circuit configured to determine whether a contact of the dispensing tip with liquid has occurred based on the sensed sound.

Embodiment 17 is the liquid dispenser of embodiments 15 to 16, wherein the respective cavity and the respective connector of each of the one or more side conduits are free from Helmholtz resonance.

Embodiment 18 is the liquid dispenser of embodiments 15 to 17, wherein a lateral dimension of the respective cavity is same as a lateral dimension of the respective connector for each of the one or more side conduits.

Embodiment 19 is the liquid dispenser of embodiments 15 to 18, wherein acoustic resonance within the one or more side conduits is outside of the frequency range of 100 Hz-4 kHz.

Embodiment 20 is the liquid dispenser of embodiments 15 to 19, wherein the acoustic resonance within the one or more side conduits is outside of the frequency range of 200 Hz-1 kHz.

Embodiment 21 is the liquid dispenser of embodiments 15 to 20, wherein the respective cavity of each of the one or more side conduits is configured to house at least one of the sound generator or the acoustic sensor.

Embodiment 22 is the liquid dispenser of embodiments 15 to 21, wherein the one or more side conduits include a single side conduit, and wherein one of the sound generator and the acoustic sensor is housed within the single side conduit and the other one of the sound generator and the acoustic sensor is housed within the dispense chamber portion.

Embodiment 23 is a liquid dispenser system, comprising: a liquid dispenser including: a dispenser body including: a dispense chamber portion including a dispense chamber therein, the dispense chamber having a first opening at a first portion of the dispense chamber portion and a second opening at a second portion of the dispense chamber portion, wherein the first portion is configured to couple with a dispensing tip, and a piston chamber portion including a piston chamber therein, the piston chamber being connected to the dispense chamber via the second opening and configured to guide a piston in a linear motion within the piston chamber to draw liquid into the liquid dispenser and to dispense liquid out of the liquid dispenser; a sound generator configured to generate a sound to induce acoustic resonance within the dispense chamber; an acoustic sensor configured to sense a sound within the dispense chamber, wherein at least one of the sound generator or the acoustic sensor is disposed within the dispense chamber portion.

Embodiment 24 is the liquid dispenser system of embodiment 23, further comprising: a liquid dispenser transporter configured to move the liquid dispenser; and a piston mover configured to move the piston within the piston chamber.

Embodiment 25 is the liquid dispenser system of embodiments 23 to 24, further comprising: a control circuit configured to determine whether a contact of the dispensing tip with liquid has occurred based on the sensed sound.

Embodiment 26 is the liquid dispenser system of embodiments 23 to 25, wherein the dispenser body further comprises one or more side conduits, each of the one or more side conduits having a respective cavity and a respective connector connecting the respective cavity to the dispense chamber, and wherein the respective cavity and the respective connector of each of the one or more side conduits are free from Helmholtz resonance.

Embodiment 27 is the liquid dispenser system of embodiments 23 to 26, wherein a lateral dimension of the respective cavity is same as a lateral dimension of the respective connector for each of the one or more side conduits.

Embodiment 28 is the liquid dispenser system of embodiments 23 to 27, wherein acoustic resonance within the one or more side conduits is outside of the frequency range of 100 Hz-4 kHz.

Embodiment 29 is the liquid dispenser system of embodiments 23 to 28, wherein the acoustic resonance within the one or more side conduits is outside of the frequency range of 200 Hz-1 kHz.

Embodiment 30 is the liquid dispenser system of embodiments 23 to 29, wherein the cavity of each of the one or more side conduits is configured to house at least one of the sound generator or the acoustic sensor.

Embodiment 31 is the liquid dispenser system of embodiments 23 to 30, wherein the one or more side conduits include a single side conduit, and wherein one of the sound generator and the acoustic sensor is housed within the single side conduit and the other one of the sound generator and the acoustic sensor is housed within the dispense chamber portion.

Embodiment 32 is a liquid dispenser, comprising: a dispenser body including: a dispense chamber portion including a dispense chamber therein, the dispense chamber having a first opening at a first portion of the dispense chamber portion and a second opening at a second portion of the dispense chamber portion, wherein the first portion is configured to couple with a dispensing tip, a piston chamber portion including a piston chamber therein, the piston chamber being connected to the dispense chamber via the second opening and configured to guide a piston in a linear motion within the piston chamber to draw liquid into the liquid dispenser and to dispense liquid out of the liquid dispenser, and an acoustic filter disposed between the dispense chamber and the piston chamber, wherein the acoustic filter is configured to acoustically decouple the dispense chamber from the piston chamber; a sound generator configured to generate a sound to the dispense chamber; and an acoustic sensor configured to sense an acoustic signal resulting from the generated sound.

Embodiment 33 is the liquid dispenser of embodiment 32, further comprising: a control circuit configured to determine at least one of: whether a contact of the dispensing tip with liquid has occurred based on the sensed sound, or a volume of the liquid in the dispensing tip based on the sensed sound.

Embodiment 34 is the liquid dispenser of embodiments 32 to 33, wherein a length of air column resonance in the dispense chamber is unaffected by movement of the piston.

Embodiment 35 is the liquid dispenser of embodiments 32 to 34, wherein the acoustic filter includes at least one of sound-reflective filter or a sound-absorbent filter.

Embodiment 36 is the liquid dispenser of embodiments 32 to 35, wherein the sound-reflective filter is configured to isolate a length of air column resonance in the dispense chamber from a length of air column resonance in the piston chamber.

Embodiment 37 is the liquid dispenser of embodiments 32 to 36, wherein the sound-reflective filter is impermeable to air.

Embodiment 38 is the liquid dispenser of embodiments 32 to 37, wherein the sound-absorbent filter is configured to reduce sound caused by movement of the piston.

Embodiment 39 is the liquid dispenser of embodiments 32 to 38, wherein the sound-absorbent filter is air-permeable and sound suppressing.

Embodiment 40 is the liquid dispenser of embodiments 32 to 39, wherein the acoustic filter is made of at least one of an open-cell foam, a closed-cell foam with an air passage, or a fibrous material.

Embodiment 41 is the liquid dispenser of embodiments 32 to 40, wherein at least one of the sound generator or the acoustic sensor is disposed within the dispense chamber portion.

Embodiment 42 is the liquid dispenser of embodiments 32 to 41, wherein the dispenser body further comprises one or more side conduits, each of the one or more side conduits having a respective cavity and a respective connector connecting the respective cavity to the dispense chamber, and wherein at least one of the sound generator or the acoustic sensor is disposed within the one or more side conduits, wherein the respective cavity and the respective connector of each of the one or more side conduits are free from resonance within a frequency range of the sound sensed by the acoustic sensor.

Embodiment 43 is the liquid dispenser of embodiments 32 to 42, wherein the control circuit is further configured to: identify information about the dispensing tip based on the sensed sound.

Embodiment 44 is the liquid dispenser of embodiments 32 to 43, wherein the control circuit is further configured to: determine whether the dispensing tip is completely coupled with the first portion of the dispensing chamber portion based on the sensed sound.

Embodiment 45 is a liquid dispenser system, comprising: a liquid dispenser comprising: a dispenser body including: a dispense chamber portion including a dispense chamber therein, the dispense chamber having a first opening at a first portion of the dispense chamber portion and a second opening at a second portion of the dispense chamber portion, wherein the first portion is configured to couple with a dispensing tip, a piston chamber portion including a piston chamber therein, the piston chamber being connected to the dispense chamber via the second opening and configured to guide a piston in a linear motion within the piston chamber to draw liquid into the liquid dispenser and to dispense liquid out of the liquid dispenser, and an acoustic filter disposed between the dispense chamber and the piston chamber, wherein the acoustic filter is configured to acoustically decouple the dispense chamber from the piston chamber; a sound generator configured to generate a sound to the dispense chamber; and an acoustic sensor configured to sense an acoustic signal resulting from the generated sound; and a control circuit configured to determine at least one of: whether a contact of the dispensing tip with liquid has occurred based on the sensed sound, or a volume of the liquid in the dispensing tip based on the sensed sound.

Embodiment 46 is the liquid dispenser system of embodiment 45, further comprising: a liquid dispenser transporter configured to move the liquid dispenser; and a piston mover configured to move the piston within the piston chamber.

Embodiment 47 is the liquid dispenser system of embodiments 45 to 46, wherein a length of air column resonance in the dispense chamber is unaffected by movement of the piston.

Embodiment 48 is the liquid dispenser system of embodiments 45 to 46, wherein the acoustic filter includes at least one of sound-reflective filter or a sound-absorbent filter.

Embodiment 49 is the liquid dispenser system of embodiments 45 to 48, wherein the sound-reflective filter is configured to isolate a length of air column resonance in the dispense chamber from a length of air column resonance in the piston chamber.

Embodiment 50 is the liquid dispenser system of embodiments 45 to 49, wherein the sound-reflective filter is impermeable to air.

Embodiment 51 is the liquid dispenser system of embodiments 45 to 50, wherein the sound-absorbent filter is configured to reduce sound caused by movement of the piston.

Embodiment 52 is the liquid dispenser system of embodiments 45 to 51, wherein the sound-absorbent filter is air-permeable and sound suppressing.

Embodiment 53 is the liquid dispenser system of embodiments 45 to 52, wherein the acoustic filter is made of at least one of an open-cell foam, a closed-cell foam with an air passage, or a fibrous material.

Embodiment 54 is the liquid dispenser system of embodiments 45 to 53, wherein at least one of the sound generator or the acoustic sensor is disposed within the dispense chamber portion.

Embodiment 55 is the liquid dispenser system of embodiments 45 to 54, wherein the dispenser body further comprises one or more side conduits, each of the one or more side conduits having a respective cavity and a respective connector connecting the respective cavity to the dispense chamber, and wherein at least one of the sound generator or the acoustic sensor is disposed within the one or more side conduits, wherein the respective cavity and the respective connector of each of the one or more side conduits are free from resonance within a frequency range of the sound sensed by the acoustic sensor.

Embodiment 56 is the liquid dispenser system of embodiments 45 to 46, wherein the control circuit is further configured to: identify information about the dispensing tip based on the sensed sound.

Embodiment 57 is the liquid dispenser system of embodiments 45 to 56, wherein the control circuit is further configured to: determine whether the dispensing tip is completely coupled with the first portion of the dispensing chamber portion based on the sensed sound.

Embodiment 58 is a method of detecting a contact of a liquid dispenser with liquid, comprising: acquiring, via an acoustic sensor, a plurality of voltage values associated with sound sensed by the acoustic sensor within a time window; squaring each of the plurality of voltage values to obtain a plurality of squared voltage values for the time window; calculating an average value of the plurality of squared voltage values for the time window; and determining whether a contact of a dispenser tip of the liquid dispenser with liquid has occurred during the time window based on the average value of the plurality of squared voltage values.

Embodiment 59 is the method of embodiment 58, wherein determining whether the contact with the liquid has occurred comprises: determining that a contact with liquid has occurred when the average value of the plurality of squared voltage values is below a threshold; and determining that a contact with liquid has not occurred when the average value of the plurality of squared voltage values is greater than or equal to the threshold.

Embodiment 60 is the method of embodiments 58 to 59, wherein the plurality of voltage values are acquired over a time domain.

Embodiment 61 is the method of embodiments 58 to 60, wherein the plurality of voltage values are acquired over a frequency domain.

Embodiment 62 is the method of embodiments 58 to 61, wherein the plurality of voltage values are acquired over a predetermined frequency band including a plurality of frequencies.

Embodiment 63 is the method of embodiments 58 to 62, wherein the predetermined frequency band has a bandwidth greater than 1 kHz.

Embodiment 64 is the method of embodiments 58 to 63, wherein the sound sensed by the acoustic sensor is sensed from sound travelling within the liquid dispenser.

Embodiment 65 is the method of embodiments 58 to 64, wherein at least one of the acoustic sensor or a sound generator that is a source of the sensed sound is located within an interior of the liquid dispenser.

Embodiment 66 is a controller for detecting a contact of a liquid dispenser with liquid, comprising: a memory; and a control circuit coupled to: the memory and an acoustic sensor included in the liquid dispenser and configured to sense sound and to generate a plurality of voltage values based on the sound sensed within a time window, wherein the control circuit is configured to: acquire the plurality of voltage values via the acoustic sensor; square the plurality of voltage values to obtain a plurality of squared voltage values for the time window; calculate an average value of the plurality of squared voltage values for the time window; and determine whether a contact of the liquid dispenser with liquid has occurred during the time window based on the average value of the plurality of squared voltage values.

Embodiment 67 is the controller of embodiment 66, wherein the control circuit is configured to determine whether the contact with the liquid has occurred by: determining that a contact with liquid has occurred when the average value of the plurality of squared voltage values is below a threshold; and determining that a contact with liquid has not occurred when the average value of the plurality of squared voltage values is greater than or equal to the threshold.

Embodiment 68 is the controller of embodiments 66 to 67, wherein the plurality of voltage values are acquired over a time domain.

Embodiment 69 is the controller of embodiments 66 to 68, wherein the plurality of voltage values are acquired over a frequency domain.

Embodiment 70 is the controller of embodiments 66 to 69, wherein the plurality of voltage values are acquired over a predetermined frequency band including a plurality of frequencies.

Embodiment 71 is the controller of embodiments 66 to 70, wherein the predetermined frequency band has a bandwidth greater than 1 kHz.

Embodiment 72 is the controller of embodiments 66 to 70, wherein the sound sensed by the acoustic sensor is sensed from sound travelling within the liquid dispenser.

Embodiment 73 is a liquid dispenser system for detecting an air-liquid boundary, comprising: a liquid dispenser comprising: a sound generator configured to generate a sound to an interior of the liquid dispenser; and an acoustic sensor configured to sense an acoustic signal resulting from the generated sound; and a control circuit coupled to the acoustic sensor and configured to: acquire, via an acoustic sensor, a plurality of voltage values associated with sound sensed by the acoustic sensor within a time window; square each of the plurality of voltage values to obtain a plurality of squared voltage values for the time window; calculating an average value of the plurality of squared voltage values for the time window; and determine whether a contact of a dispenser tip of the liquid dispenser with liquid has occurred during the time window based on the average value of the plurality of squared voltage values.

Embodiment 74 is the liquid dispenser system of embodiment 73, wherein the control circuit is configured to determine whether the contact with the liquid has occurred by: determining that a contact with liquid has occurred when the average value of the plurality of squared voltage values is below a threshold; and determining that a contact with liquid has not occurred when the average value of the plurality of squared voltage values is greater than or equal to the threshold.

Embodiment 75 is the liquid dispenser system of embodiments 73 to 74, wherein the plurality of voltage values are acquired over a time domain.

Embodiment 76 is the liquid dispenser system of embodiments 73 to 75, wherein the plurality of voltage values are acquired over a frequency domain.

Embodiment 77 is the liquid dispenser system of embodiments 73 to 76, wherein the plurality of voltage values are acquired over a predetermined frequency band including a plurality of frequencies.

Embodiment 78 is the liquid dispenser system of embodiments 73 to 77, wherein the predetermined frequency band has a bandwidth greater than 1 kHz.

Embodiment 79 is the liquid dispenser system of embodiments 73 to 78, wherein the sound sensed by the acoustic sensor is sensed from sound travelling within the liquid dispenser.

Embodiment 80 is a liquid dispenser system, comprising: a control circuit configured to provide at least one test signal; a liquid dispenser including: a dispenser body including a dispense chamber therein, a sound generator configured to generate at least one test sound in response to the at least one test signal from the control circuit; an acoustic sensor configured to sense the at least one sound within the dispense chamber and provide at least one response signal to the control circuit, wherein the control circuit is configured to compare the at least one response signal to a tip presence threshold signal value to determine a liquid dispensing tip presence.

Embodiment 81 is the liquid dispenser system of embodiment 80, wherein the control circuit is further configured to: generate the at least one test signal at a target frequency in a no tip condition; determine the tip presence threshold signal value based on the at least one response signal received during the no tip condition.

Embodiment 82 is the liquid dispenser system of embodiments 80 to 81, wherein the control circuit is further configured to: output a notification of the liquid dispensing tip presence.

Embodiment 83 is a method of liquid tip dispensing tip presence identification to be carried out in a liquid dispenser system, comprising: providing, by a control circuit, at least one test signal; receiving the at least one test signal, by a liquid dispenser including a dispenser body having a dispense chamber, a sound generator, and an acoustic sensor; generating at least one test sound by the sound generator in response to the at least one test signal from the control circuit; sensing, by the acoustic sensor, at least one sound within the dispense chamber; providing, by the acoustic sensor to the control circuit, at least one response signal based on the at least one sound; and comparing the at least one response signal to a tip presence threshold signal value to determine a liquid dispensing tip presence.

Embodiment 84 is the method of embodiment 83, further comprising: generating the at least one test signal at a target frequency in a no tip condition; determining the tip presence threshold signal value based on the response signal received during the no tip condition.

Embodiment 85 is the method of embodiments 83-84, further comprising outputting a notification of the liquid dispensing tip presence Embodiment 86 is a liquid dispenser system, comprising: a control circuit configured to provide at least one test signal; a liquid dispenser including: a dispenser body including a dispense chamber therein a sound generator configured to generate at least one test sound in response to the at least one test signal from the control circuit; an acoustic sensor configured to sense the at least one sound within the dispense chamber and provide at least one response signal to the control circuit, wherein the control circuit is configured to compare the at least one response signal to a tip identification metric to determine a liquid dispensing tip identity.

Embodiment 87 is the liquid dispenser system of embodiment 86, wherein the control circuit is further configured to: verify a presence of a liquid dispensing tip.

Embodiment 88 is the liquid dispenser system of embodiments 86 to 87, wherein the control circuit is further configured to: output a notification of the liquid dispensing tip identity.

Embodiment 89 is the liquid dispenser system of embodiments 86 to 88, wherein the at least one test signal includes a frequency sweep and the at least one response signal includes a tip response acoustic spectrum, and the control circuit is further configured to: compare the at least one response signal to a tip identification metric by determining a Pearson Correlation Coefficient between the tip response acoustic spectrum and one or more stored tip identification acoustic spectra.

Embodiment 90 is the liquid dispenser system of embodiments 86 to 89, wherein the at least one test signal includes a frequency sweep and the at least one response signal includes a response acoustic spectrum, and the control circuit is further configured to: compare the response signal to a tip identification metric by matching the at least one response signal to a tip frequency response pattern.

Embodiment 91 is a method of determining a liquid dispensing tip identity in a liquid dispenser system, comprising: providing at least one test signal via a control circuit; receiving the at least one test signal, by a liquid dispenser including a dispenser body having a dispense chamber, a sound generator, and an acoustic sensor; generating, by the sound generator, at least one test sound in response to the at least one test signal from the control circuit; sensing, by the acoustic sensor, the at least one sound within the dispense chamber; providing, by the acoustic sensor, at least one response signal according to the at least one sound; and comparing the at least one response signal to a tip identification metric to determine a liquid dispensing tip identity.

Embodiment 92 is the method of embodiment 91, further comprising verifying a presence of a liquid dispensing tip.

Embodiment 93 is the method of embodiments 91 to 92, further comprising outputting a notification of the liquid dispensing tip identity.

Embodiment 94 is the method of embodiments 91 to 93, wherein the at least one test signal includes a frequency sweep and the at least one response signal includes a tip response acoustic spectrum, the method further comprising: comparing the at least one response signal to a tip identification metric by determining a Pearson Correlation Coefficient between the tip response acoustic spectrum and one or more stored tip identification acoustic spectra.

Embodiment 95 is the method of embodiments 91 to 94, wherein the at least one test signal includes a frequency sweep and the at least one response signal includes a response acoustic spectrum, the method further comprising: comparing the at least one response signal to a tip identification metric by matching the at least one response signal to a tip frequency response pattern.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:
1. A liquid dispenser, comprising:
a dispenser body including:
a dispense chamber portion including a dispense chamber therein, the dispense chamber having a first opening at a first portion of the dispense chamber portion and a second opening at a second portion of the dispense chamber portion, wherein the first portion is configured to couple with a dispensing tip,
a piston chamber portion including a piston chamber therein, the piston chamber being connected to the dispense chamber via the second opening and configured to guide a piston in a linear motion within the piston chamber to draw liquid into the liquid dispenser and to dispense liquid out of the liquid dispenser;
a first cavity having a first cavity portion having a sound generator disposed therein and a first connector channel portion extending from the first cavity portion to the dispense chamber, the sound generator configured to generate a sound to induce acoustic resonance within the dispense chamber; and
a second cavity having a second cavity portion having an acoustic sensor disposed therein and a second connector channel portion extending from the second cavity portion to the dispense chamber, the acoustic sensor configured to sense a sound within the dispense chamber;
wherein the first cavity portion and the first connector channel portion have substantially the same width along an entire length of the first connector channel portion, and
wherein the second cavity portion and the second connector channel portion have substantially the same width along an entire length of the second connector channel portion.

2. The liquid dispenser of claim 1, wherein the first cavity and the second cavity are not connected.

3. The liquid dispenser of claim 1, wherein the entire length of the first connector channel portion extends from the first cavity portion to a first opening at the dispense chamber and the entire length includes the first opening, wherein the entire length of the second connector channel portion extends from the second cavity portion to a second opening at the dispense chamber and the entire length includes the second opening.

4. The liquid dispenser of claim 1, further comprising:
a first opening between the first connector channel portion and the dispense chamber, wherein the first opening has substantially the same width as the as first connector channel portion and the first cavity portion; and
a second opening between the second connector channel portion and the dispense chamber, wherein the second opening has substantially the same width as the as second connector channel portion and the second cavity portion.

5. The liquid dispenser of claim 1, wherein the first cavity portion and the first connector channel portion have the same width along the entire length of the first connector channel portion, and
wherein the second cavity portion and the second connector channel portion have the same width along the entire length of the second connector channel portion.

6. The liquid dispenser of claim 1, further comprising:
a control circuit configured to determine a volume of dispensing liquid in the dispensing tip based on the sensed sound.

7. The liquid dispenser of claim 1, further comprising a sound-reflective filter configured to isolate a length of air column resonance in the dispense chamber from a length of air column resonance in the piston chamber.

8. The liquid dispenser of claim 1, further comprising:
a control circuit configured to determine whether a contact of the dispensing tip with liquid has occurred based on the sensed sound.

9. The liquid dispenser of claim 8, wherein the control circuit is further configured to:
identify information about the dispensing tip based on the sensed sound.

10. The liquid dispenser of claim 9, wherein the sensed sound includes a sound pressure sensed within the dispense chamber, and the information about the dispensing tip is identified based on the sensed sound pressure.

11. The liquid dispenser of claim 8, wherein the control circuit is further configured to:
determine whether the dispensing tip is completely coupled with the first portion of the dispensing chamber portion based on the sensed sound.

12. The liquid dispenser of claim 1, wherein the sound generator and the acoustic sensor are positioned to face each other or are positioned on a same side.

13. The liquid dispenser of claim 1, wherein the dispense chamber is enclosed except at the first opening and the second opening.

14. The liquid dispenser of claim 1, wherein the first cavity and the first connector channel of the dispense chamber, and the second cavity and the second connector channel of the dispense chamber, are free from resonance within a frequency range of the sound sensed by the acoustic sensor.

15. The liquid dispenser of claim 1, further comprising an acoustic filter disposed between the dispense chamber and the piston chamber, wherein the acoustic filter is configured to acoustically decouple the dispense chamber from the piston chamber.

16. A liquid dispenser system, comprising:
a liquid dispenser including:
a dispenser body including:
a dispense chamber portion including a dispense chamber therein, the dispense chamber having a first opening at a first portion of the dispense chamber portion and a second opening at a second portion of the dispense chamber portion, wherein the first portion is configured to couple with a dispensing tip,
a piston chamber portion including a piston chamber therein, the piston chamber being connected to the dispense chamber via the second opening and configured to guide a piston in a linear motion within the piston chamber to draw liquid into the liquid dispenser and to dispense liquid out of the liquid dispenser;
a first cavity having a first cavity portion having a sound generator disposed therein and a first connector channel portion extending from the first cavity portion to the dispense chamber, the sound generator configured to generate a sound to induce acoustic resonance within the dispense chamber; and
a second cavity having a second cavity portion having an acoustic sensor disposed therein and a second connector channel portion extending from the second cavity portion to the dispense chamber, the acoustic sensor configured to sense a sound within the dispense chamber;
a control circuit configured to determine whether a contact of the dispensing tip with liquid has occurred based on the sensed sound,
wherein the first cavity portion and the first connector channel portion have substantially the same width along an entire length of the first connector channel portion, and
wherein the second cavity portion and the second connector channel portion have substantially the same width along an entire length of the second connector channel portion.

17. The liquid dispenser system of claim 16, wherein the first cavity and the second cavity are not connected.

18. The liquid dispenser system of claim 16, further comprising:
a first opening between the first connector channel portion and the dispense chamber, wherein the first opening has substantially the same width as the as first connector channel portion and the first cavity portion; and
a second opening between the second connector channel portion and the dispense chamber, wherein the second opening has substantially the same width as the as second connector channel portion and the second cavity portion.

19. The liquid dispenser system of claim 16, wherein the first cavity portion and the first connector channel portion have the same width along the entire length of the first connector channel portion, and
wherein the second cavity portion and the second connector channel portion have the same width along the entire length of the second connector channel portion.

20. The liquid dispenser system of claim 16, wherein the entire length of the first connector channel portion extends from the first cavity portion to a first opening at the dispense chamber and the entire length includes the first opening,
wherein the entire length of the second connector channel portion extends from the second cavity portion to a second opening at the dispense chamber and the entire length includes the second opening.

21. The liquid dispenser system of claim 16, further comprising:
a liquid dispenser transporter configured to move the liquid dispenser; and a piston mover configured to move the piston within the piston chamber.

22. The liquid dispenser system of claim 16, wherein the sound generator and the acoustic sensor are positioned to face each other or are positioned on a same side.

23. The liquid dispenser system of claim 16, wherein the dispense chamber is enclosed except at the first opening and the second opening.

24. The liquid dispenser system of claim 16, wherein the control circuit is further configured to:
identify information about the dispensing tip based on the sensed sound.

25. The liquid dispenser system of claim 24, wherein the sensed sound includes a sound pressure sensed within the dispense chamber, and the information about the dispensing tip is identified based on the sensed sound pressure.

26. The liquid dispenser system of claim 16, wherein the control circuit is further configured to:
determine whether the dispensing tip is completely coupled with the first portion of the dispensing chamber portion based on the sensed sound.

27. The liquid dispenser system of claim 16, wherein the control circuit is further configured to determine a volume of dispensing liquid in the dispensing tip based on the sensed sound.

28. The liquid dispenser system of claim 16, further comprising a sound- reflective filter configured to isolate a length of air column resonance in the dispense chamber from a length of air column resonance in the piston chamber.

29. A liquid dispenser, comprising:
a dispenser body including:
a dispense chamber portion including a dispense chamber therein, the dispense chamber having a first opening at a first portion of the dispense chamber portion and a second opening at a second portion of the dispense chamber portion, wherein the first portion is configured to couple with a dispensing tip,
a piston chamber portion including a piston chamber therein, the piston chamber being connected to the dispense chamber via the second opening and configured to guide a piston in a linear motion within the piston chamber to draw liquid into the liquid dispenser and to dispense liquid out of the liquid dispenser;
a sound generator configured to generate a sound to induce acoustic resonance within the dispense chamber;
an acoustic sensor configured to sense a sound within the dispense chamber, wherein at least one of the sound generator or the acoustic sensor is disposed within the dispense chamber portion; and
an acoustic filter disposed between the dispense chamber and the piston chamber, wherein the acoustic filter is configured to acoustically decouple the dispense chamber from the piston chamber.

30. The liquid dispenser of claim 29, wherein the acoustic filter is a sound-reflective filter configured to isolate a length of air column resonance in the dispense chamber from a length of air column resonance in the piston chamber.

31. The liquid dispenser of claim 29, wherein the acoustic filter is a sound-absorbent filter configured to muffle sound from the piston chamber.

32. The liquid dispenser of claim 29, wherein the acoustic filter is made of polyethylene (PE).

33. The liquid dispenser of claim 29, wherein the acoustic filter is made of polyurethane (PU).

34. The liquid dispenser of claim 29, wherein a thickness of the acoustic filter is approximately 5 mm.

35. The liquid dispenser of claim 29, wherein a thickness of the acoustic filter is approximately 10 mm.

* * * * *